US012627480B1

(12) United States Patent
Grover et al.

(10) Patent No.: US 12,627,480 B1
(45) Date of Patent: May 12, 2026

(54) SYSTEMS FOR QUANTUM CYBER RESILIENCE OF DIGITAL ASSETS IN TRANSIT

(71) Applicant: VoiceIt Technologies, LLC, Minneapolis, MN (US)

(72) Inventors: Noel J. Grover, Chanhassen, MN (US); Eric J. Mencke, Fairfax, VA (US); William Austin, Herndon, VA (US); Joseph J. Helwig, Winter Garden, FL (US); Clifford F. Cruz, Huntington Beach, CA (US); Bradley D. Pedersen, Hayward, WI (US); Konrad J. Grutzmacher, Berkeley, CA (US)

(73) Assignee: VoiceIt Technologies, LLC, Eden Prairie, MN (US)

( * ) Notice: Subject to any disclaimer, the term of this patent is extended or adjusted under 35 U.S.C. 154(b) by 92 days.

(21) Appl. No.: 18/429,349

(22) Filed: Jan. 31, 2024

Related U.S. Application Data

(60) Provisional application No. 63/627,664, filed on Jan. 31, 2024, provisional application No. 63/627,513, filed on Jan. 31, 2024, provisional application No. 63/627,588, filed on Jan. 31, 2024, provisional application No. 63/627,638, filed on Jan. 31, 2024, provisional application No. 63/592,354, filed on Oct. 23, 2023, provisional application No. 63/590,714, filed on Oct. 16, 2023, provisional application No. 63/482,468, filed on Jan. 31, 2023.

(51) Int. Cl.
*H04L 9/08* (2006.01)

(52) U.S. Cl.
CPC .................................. *H04L 9/0852* (2013.01)

(58) Field of Classification Search
CPC ...................................................... H04L 9/0852
See application file for complete search history.

(56) References Cited

U.S. PATENT DOCUMENTS

| | | | |
|---|---|---|---|
| 8,468,244 B2 | 6/2013 | Redlich et al. | |
| 8,473,754 B2 | 6/2013 | Jones et al. | |
| 8,782,436 B2 | 7/2014 | Koifman et al. | |
| 8,819,309 B1 | 8/2014 | Bruce et al. | |
| 9,419,796 B2 | 8/2016 | Konig | |
| 9,575,903 B2 | 2/2017 | Glew et al. | |
| 9,634,836 B1 | 4/2017 | Butzer | |
| 9,767,306 B2 | 9/2017 | Klum | |
| 9,785,801 B2 | 10/2017 | Zimmer et al. | |

(Continued)

FOREIGN PATENT DOCUMENTS

| | | |
|---|---|---|
| CN | 114218597 A | 3/2022 |
| CN | 114978496 A | 8/2022 |
| CN | 116366232 A | 6/2023 |

OTHER PUBLICATIONS

Campbell, D. R.; Diffie, D. W.; Robinson, C. Advancements in Quantum Computing and AI May Impact PQC Migration Timelines. Preprints 2024, 2024021299. (Feb. 22, 2024), 12 pages.

(Continued)

*Primary Examiner* — Baotran N To
(74) *Attorney, Agent, or Firm* — Barnes & Thornburg LLP

(57) ABSTRACT

Embodiments of systems providing quantum cyber resilience protection of digital assets of a computer system in transit from tampering and/or decrypting including quantum computer cryptographic attacks.

20 Claims, 21 Drawing Sheets

(56) References Cited

U.S. PATENT DOCUMENTS

| | | | |
|---|---|---|---|
| 9,887,834 | B1 | 2/2018 | Molaro |
| 9,934,400 | B2 | 4/2018 | Gilbert |
| 9,996,479 | B2 | 6/2018 | Lea |
| 10,057,269 | B1 | 8/2018 | Ellingson |
| 10,103,886 | B1 | 10/2018 | Gutoski et al. |
| 10,122,699 | B1 | 11/2018 | Ellingson et al. |
| 10,291,393 | B1 | 5/2019 | Molaro et al. |
| 10,360,395 | B2 | 7/2019 | Fiske |
| 10,476,664 | B2 | 11/2019 | Kuang |
| 10,691,837 | B1 | 6/2020 | Martel et al. |
| 10,735,137 | B2 | 8/2020 | Yanovsky et al. |
| 10,860,744 | B2 | 12/2020 | Norem |
| 10,860,745 | B2 | 12/2020 | Perone et al. |
| 10,873,458 | B2 | 12/2020 | Reinhold |
| 10,992,453 | B2 | 4/2021 | Geagan et al. |
| 11,057,193 | B2 | 7/2021 | Kuang et al. |
| 11,243,893 | B2 | 2/2022 | Lutz et al. |
| 11,256,477 | B2 | 2/2022 | Brandao et al. |
| 11,281,660 | B1 | 3/2022 | Pike et al. |
| 11,281,790 | B2 | 3/2022 | Chung |
| 11,297,166 | B2 | 4/2022 | Lapushkin et al. |
| 11,323,247 | B2 | 5/2022 | Kuang |
| 11,483,140 | B2 | 10/2022 | Prisco et al. |
| 11,516,201 | B2 | 11/2022 | Wu et al. |
| 11,550,883 | B2 | 1/2023 | Meily |
| 11,641,347 | B2 * | 5/2023 | Kuang ................. H04L 9/0825 713/171 |
| 11,750,394 | B2 | 9/2023 | Firestone et al. |
| 11,777,724 | B2 * | 10/2023 | Low ...................... H04L 9/3226 713/193 |
| 11,936,778 | B2 | 3/2024 | Krauthammer et al. |
| 11,979,394 | B2 | 5/2024 | Arneson et al. |
| 11,991,275 | B2 | 5/2024 | Newton et al. |
| 11,997,200 | B2 | 5/2024 | Mandich et al. |
| 12,072,994 | B2 | 8/2024 | Chung |
| 12,174,971 | B1 | 12/2024 | Kovac |
| 12,238,202 | B2 | 2/2025 | Pecen et al. |
| 2017/0012949 | A1 | 1/2017 | Boren et al. |
| 2020/0117810 | A1 | 4/2020 | Kouvanis et al. |
| 2020/0159888 | A1 | 5/2020 | Ghose |
| 2020/0195446 | A1 | 6/2020 | Lepoint et al. |
| 2021/0152347 | A1 | 5/2021 | Cambou |
| 2021/0234682 | A1 | 7/2021 | Lane et al. |
| 2021/0306145 | A1 * | 9/2021 | Krauthamer .......... H04L 9/0852 |
| 2022/0103533 | A1 | 3/2022 | Srinivasan |
| 2023/0267054 | A1 | 8/2023 | McAuliffe et al. |
| 2023/0274023 | A1 | 8/2023 | Yoon |
| 2023/0291545 | A1 | 9/2023 | Cap et al. |
| 2023/0291555 | A1 | 9/2023 | Berta et al. |
| 2023/0308267 | A1 | 9/2023 | Futami |
| 2024/0303042 | A1 | 9/2024 | Nakamura |
| 2025/0047476 | A1 | 2/2025 | Krauthammer et al. |

OTHER PUBLICATIONS

Celesti, A., "Adding long-term availability, obfuscation, and encryption to multi-cloud storage systems" Science Direct, vol. 59 (Jan. 2016), p. 208-218.

Chen, L., Jordan, S., Liu, Y., Peralta, R., Perlner, R., Smith-Tone, D., Report on Post-Quantum Cryptography Standards, NIST Internal Report, Nist IR 8105 ipd (Apr. 21, 2016). 15 pages.

Daemen et al., The Design of Rijndael: AES—The Advanced Encryption Standard, New York: Springer, 2002, Preface and Table of Contents, 16 pages.

International Search Report and Written Opinion in PCT/US2025/014221 dated May 22, 2025, 12 pages.

National Institute of Standards and Technology, "Cryptographic Standards and Guidelines", Dec. 18, 2021, accessed at https://csrc.nist.gov/projects/cryptographic-standards-and-guidelines/archived-crypto-projects/aes-development on Aug. 8, 2025, 5 pages.

National Institute of Standards and Technology, "Module-Lattice-Based Digital Signature Standard", FIPS 204, Aug. 13, 2024, 65 pages.

National Institute of Standards and Technology, "Module-Lattice-Based Key-Encapsulation Mechanism Standard", FIPS 203, Aug. 13, 2024, 56 pages.

National Institute of Standards and Technology, "Stateless Hash-Based Digital Signature Standard", FIPS 205, Aug. 13, 2024, 61 pages.

National Institute of Standards and Technology, Submission Requirements and Evaluation Criteria for the Post-Quantum Cryptography Standardization Process, NIST Call for Proposals (Dec. 2016). Section 4. 25 pages.

Quantinuum, "Quantum Origin" Technical White Paper, 2024, 12 pages.

Wikipedia, "Transmission Control Protocol," accessed at https://en.wikipedia.org/wiki/Transmission_Control_Protocol on Aug. 8, 2025, 17 pages.

Yakobu, et al., "An Enhanced Secure, Robust and Efficient Crypto Scheme for Ensuring Data Privacy in Public Cloud Using Obfuscation & Encryption," Journal homepage: http://iieta. org/ journals/ isi. Dec. 2019;24(6):603-9.

Underhill et al., "Towards post-quantum symmetric cryptography", accessed at https://eprint.iacr.org/2019/553.pdf on Aug. 8, 2025, 10 pages.

* cited by examiner

Typical AES Data Transaction

152 — User Interface

158 — Secure/Unsecure Channel(s)

130 — System (If equipped with encryption)

136 — Public/Private Key

132 — Encryption/Decryption Methods

134 — Encrypted Data in Memory

Vault Data Transaction

150 — User Interface

110

106 — QRNG

108 — QHCs

126 — QuantaKey™ + QuantaPack™ (QCU+)

156 — Secure Channel(s)

140 — EnQuanta™ Vault System

117 — QuantaStub unPack App Stub

124 — QuantaSafe™ QuID

QuantaPack™ Incryption Process

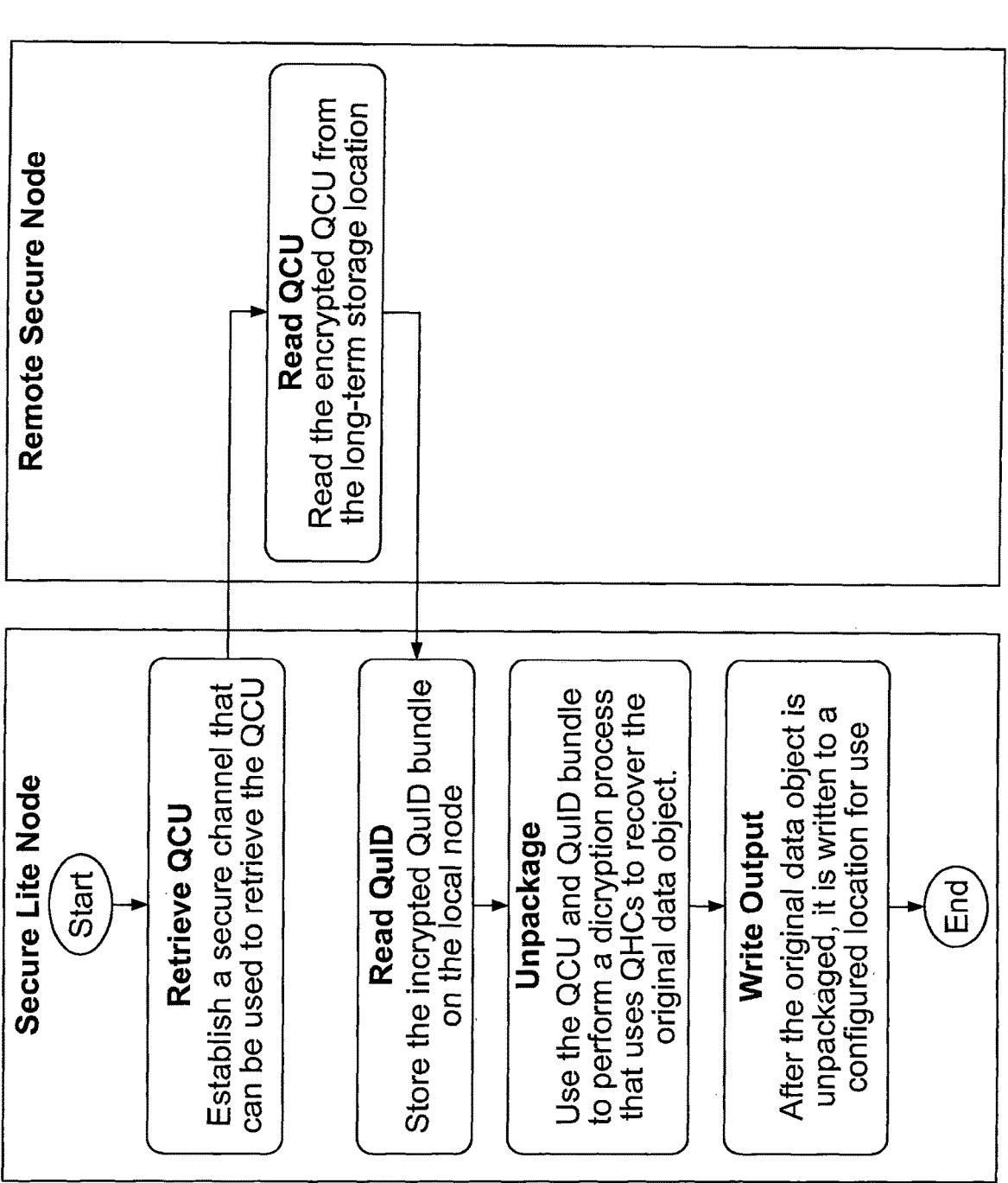

FIG. 16B

Remote Secure Node

Read QCU
Read the encrypted QCU from the long-term storage location

Secure Lite Node

Start

Retrieve QCU
Establish a secure channel that can be used to retrieve the QCU

Read QuID
Store the incrypted QuID bundle on the local node

Unpackage
Use the QCU and QuID bundle to perform a dicryption process that uses QHCs to recover the original data object.

Write Output
After the original data object is unpackaged, it is written to a configured location for use End

SYSTEMS FOR QUANTUM CYBER RESILIENCE OF DIGITAL ASSETS IN TRANSIT

REFERENCE TO RELATED APPLICATIONS

This application claims the benefit of:
U.S. Provisional Application Ser. No. 63/482,468 (filed Jan. 31, 2023),
U.S. Provisional Application Ser. No. 63/590,714 (filed Oct. 16, 2023),
U.S. Provisional Application Ser. No. 63/592,354 (filed Oct. 23, 2023),
U.S. Provisional Application Ser. No. 63/627,513 (filed Jan. 31, 2024),
U.S. Provisional Application Ser. No. 63/627,588 (filed Jan. 31, 2024),
U.S. Provisional Application Ser. No. 63/627,638 (filed Jan. 31, 2024), and
U.S. Provisional Application Ser. No. 63/627,664 (filed Jan. 31, 2024).

The disclosure of each of the prior applications is considered part of and is incorporated by reference in the disclosure of this application.

TECHNICAL FIELD

The present disclosure relates generally to protecting data at rest to assure secure storage of data. More particularly, the present disclosure relates to providing quantum cyber resilience protection of digital assets to be stored at cold rest in non-volatile memory of a computer system from tampering and/or decrypting including by quantum computer cryptographic attacks.

BACKGROUND

Cryptography is used to protect the secrecy, integrity and authenticity of messages and information. In modern computer and information technology (IT) systems, numerous cryptographic standards and techniques have been developed for digital information (data and/or code) that employ digital encryption, signatures, and authentication to secure and protect this information. See, Schneier, B., *Applied Cryptography* (1993); Wong, D., *Real World Cryptography*, (2021).

Most cryptography techniques are used to protect digital messages and information in transit, typically by using an encryption key protocol. One of the critical challenges with use of encryption key protocols is that the level of security for such protocols is directly related to both the length of the message and the length of the encryption key. As computing power has increased, brute force attacks to crack encryption keys have resulted in the need to increase the length of encryption keys to increase the number of possible key combinations. Current encryption protocols are referred to as standard ciphers because they are vetted by organizations or agencies such as the National Institute of Standards and Technology (NIST). Examples of current standard encryption algorithms are the Advanced Encryption Standard (AES) protocols which typically use keys with either 128 bits ($2^{128}=3.4e^{+38}$ possibilities) or 256 bits ($2^{256}=1.2e^{+77}$ possibilities). The total time needed to try all such possibilities for AES 128-bit keys would require at least tens to thousands of years using conventional computer systems, thereby making such protocols well-suited for protecting relatively shorter messages and data in transit from attacks by classical computers.

Digital assets such as data/code that is stored at cold rest in non-volatile memory/cold storage systems such as a hard disk drive or solid-state drive present additional security challenges. Such data/code in cold storage can include the operating systems and certain application programs that are loaded at startup and then used to boot up and run a computer system. The data/code in these files are often referred to as a boot image.

Various cryptographic solutions have been developed to protect data at cold rest from tampering including the boot image and the entire non-volatile cold storage system for a computer system. Hardware approaches for encrypting the entire cold storage system are described, for example, in U.S. Pat. Nos. 8,473,754, 9,575,903, 9,785,801, 9,996,479, 10,691,837, 10,992,453 and 11,243,893, as well as U.S. Publ. Nos. 2020/0159888 and 2020/0117810. Other approaches for protecting data at rest in cold storage are described, for example, in U.S. Pat. Nos. 8,782,436, 9,419, 796, 9,767,306, 10,360,395, 10,476,664, 10,860,744, 10,860,745, 11,297,166, 11,641,347, 11,777,724, and 11,550,883, as well as U.S. Publ. No. 2020/0195446, 2021/0306145, and 2023/0291545.

Over the last fifty years as the performance and power of computer systems has continued to increase, the size of a typical boot image and of cold storage systems has increased from kilobytes to gigabytes or even terabytes. This increase in size can present security challenges when using conventional cryptographic techniques as the larger the size of an encrypted file, the easier it can be to attack or hack such a file. Such attacks are often based on finding patterns and relationships in such large files when an encryption key is not truly random or when arrangements of data can be inferred.

In recent years, a different kind of challenge to conventional encryption techniques has arisen based on the potential use of quantum computing and artificial intelligence powered attacks. The potential power of quantum decryption is encouraging hackers to employ a harvest-now-decrypt-later tactic to steal sensitive conventionally encrypted data today using classical computers and wait until Cryptoanaltically Relevant Quantum Computers (CRQCs) coupled with Artificial Intelligence (AI) soon will be able to successfully hack encrypted data stolen today. Both Congress and the White House have recognized the significant cyber threats posed by the rapid advance of CRQCs and AI. See, "Quantum Computing Cybersecurity Preparedness Act," Publ. Law 117-220 (Dec. 21, 2022); "National Cybersecurity Strategy," White House (Mar. 1, 2023); and "National Cybersecurity Strategy Implementation Plan" (Jul. 13, 2023). Quantum-based attacks could dramatically reduce the time and resources needed for brute force attacks to succeed in hacking data at cold rest. This potential vulnerability is especially problematic in situations where the data/code at cold rest is used in computer systems such as used in military equipment that could be vulnerable to capture and physical breach by an adversary. See, "Understanding Quantum Computing White-Paper," ID Quantique SA (May 2020); and "Post-Quantum Cryptography for Engineers," IETF (Aug. 30, 2023).

Traditional cybersecurity approaches have focused on preventing and deterring unauthorized access to digital systems by using standard cryptography encryption algorithms to encrypt data. New encryption standards for the algorithms that may be used in post-quantum or quantum-resistant encryption are being evaluated by NIST. See, "Post-Quantum Cryptography," NIST (Aug. 24, 2023). However, these standards focus on encryption for data in transit and will require years to be fully tested and evaluated for potential weaknesses and exploits. Even then, the challenges of protecting data/code at cold rest in the face of hacking efforts using CRQC and AI will remain. There is a recognized need to develop complementary mitigation strategies to provide cryptographic agility in the face of unknown future risks with new systems that can provide quantum cyber resilience for protection and security of digital assets that are more efficient and effective in protecting such digital assets from prolonged and well-resourced brute force attacks, including quantum computing attacks.

SUMMARY OF THE DISCLOSURE

Embodiments of the present disclosure provide computer-implemented digital asset protection systems configured to generate packages of digital assets that are quantum cyber resilient at cold rest. Instead of using just improved quantum encryption algorithms to protect digital assets, disclosed embodiments augment the effectiveness of such enhanced quantum encryption algorithms by utilizing both a truly random quantum entropy source and unique combinations of intrinsic invisibility protocols and techniques for Packagers and unPackagers that together are referred to as "incryption."

In various embodiments of incryption, intrinsic information derivable from the encrypted data that may have discernable patterns or properties is rendered effectively invisible by obfuscating any patterns or organizations of potentially meaningful information content which could be used to facilitate brute force attacks against the quantum cyber resilient packages of digital assets, especially larger digital assets such as boot images of data/code stored at cold rest. The results of such quantum cyber resilient protection systems that employ incryption are packages of digital assets that appear as a sea of nothingness produced by enhancing the noise and entropy of such quantum cyber resilient packages to make prolonged and well-resourced brute force hacking, reverse engineering, and even quantum computing attacks effectively unfeasible.

Unlike the current NIST initiatives to improve quantum encryption algorithms, the present disclosure assumes that encryption alone, even using post quantum keys (PQK), will not result in truly quantum resilient protection of digital information, especially larger amounts of digital information stored at cold rest. Instead, embodiments of the present disclosure effectively increase security strength by using combinations of randomization techniques and quantum random noise to break the digital information into protected puzzle pieces where none of the puzzle pieces make sense and where there are no boxes or locations that differentiate different puzzle pieces so that it is effectively impossible to reassemble the puzzle or even know which puzzle pieces are valid pieces. In addition, the present disclosure recognizes that there is a threshold number of puzzle pieces and threshold amount of uncertainty in the form of truly random noise and decoy values that should be utilized in order to effectively ensure that the total number of possible decryptions and reconstructions options is large enough to be reasonably unattackable based on a given amount and time of computing resources used in any such attack, regardless of whether those resources are in the form of conventional and/or quantum computing attacks.

For purposes of the present disclosure, "incryption" is defined as a set of computer-implemented processes, protocols and/or techniques used to construct and/or deconstruct a representation of digital assets by encrypting/decrypting the digital assets as encrypted data using at least one protection/encryption algorithm and by using multiple obfuscation/invisibility processes, protocols and techniques to make any intrinsic information derivable from the encrypted data that may have discernable patterns or properties effectively invisible. In various embodiments, different protection/encryption algorithms and obfuscation/invisibility protocols and techniques may be utilized depending upon different desired levels of resilience and threat protection. In some embodiments, quantum resilience is provided for digital assets by utilizing a quantum entropy random source to generate a quantum key used with a quantum-resistant encryption algorithm. In other embodiments, brute force hacking protection is provided for digital assets by utilizing either a conventional or quantum key and either a conventional or quantum-resistant encryption algorithm together with obfuscation/invisibility protocols and techniques that will generate an incrypted representation of the digital assets that effectively ensures that a total number of possible decryptions and reconstructions is significantly larger than a given amount of computing resources projected to be used by a particular brute force attack. In various embodiments, a level of cyber protection of a given size of digital assets can be achieved with differing levels of incryption such that the digital assets are sufficiently protected even if the media on which such assets are stored is stolen or hacked because there is no value in such stolen digital assets as the incrypted digital assets cannot be recovered.

In various embodiments of the present disclosure, a computer-implemented digital asset protection system is configured to protect a set of original files/data of the digital assets as quantum incrypted data that is quantum cyber resilient at cold rest. The system comprises a quantum entropy source configured to generate a quantum random seed/key, and a Packager system operably connected to the quantum entropy source and configured to protect the set of original files as quantum incrypted data by a set of protocols. In some embodiments, the Packager system is configured to generate a protected package to be securely delivered to and stored by a storage system of a target computing system, and the digital asset protection system further comprises an unPackager system configured to be installed in a secure computer node of the target computing environment to unpackage the protected package. In embodiments, the protected package includes a set of quantum incrypted data and a corresponding set of quantum containment units uniquely generated for the original digital assets.

In embodiments, the set of protocols and techniques used by the Packager system to protect the set of original files as quantum incrypted data uses the quantum entropy source to seed a set of Quantum Hybrid Ciphers (QHCs) to generate a set of quantum elements (QEs) as a quantum incrypted data (QUID) representation for the set of original digital assets. Unlike conventional encryption techniques that include only a single standard encryption algorithm or a limited and fixed number and order of non-standard cipher techniques, the QHCs in various embodiments are a stack of multiple different ciphers that used in an order and number which is randomized to at least some degree to further enhance the strength and cryptographic agility of the quantum cyber resilient security. In various embodiments, the QHC stack can include multiple non-standard cryptographic techniques. In some embodiments, the non-standard cryptographic techniques can include obfuscation ciphers for fragmenting each digital asset into fragments each being a quantum element, injecting each quantum element with a set of quantum random noise, manipulating the bits in each quantum element using masking, substitution, shifting, permutation, and/or positional translation, shuffling the set of quantum elements into a random order, and/or introducing a set of decoy digital assets. In some embodiments, the non-standard cryptographic techniques can include protection ciphers for protecting portions of the digital assets using various publicly known or unknown non-standard cryptographic protection ciphers. In embodiments, the QHC stack can include a selectively one or more optional standard ciphers based on standard algorithms that have been publicly vetted and approved as current NIST encryption standards to meet applicable cryptographic compliance requirements.

In various embodiments, the output of the QHC stack is a paired Quantum Containment Unit (QCU) and QuID package. The term "incryption" is somewhat analogous to "encryption," but encompasses an expanded cryptographic process that can include one or more standard encryption algorithms plus non-standard QHC processes. A QCU is an amalgamated codex, of various incryption-related information, data, and/or metadata to be used by the unPackager for the "dicryption" process that reverses the methodology and sequencing of the paired QCU/QuID package. The non-standard QHC processes are used to protect and/or obfuscate the data such that any intrinsic information, patterns, or properties derivable from the incrypted data are effectively rendered useless to adversaries. The QuID is the collection of digital assets (e.g., data, message, and/or code) that has been protected and is maintained in an incryption state either as data at rest or data in transit. In some embodiments, the QCU and QuID pairs are tightly coupled to their associated unique Packager/unPackager methodology.

In some embodiments, the QHC stack includes fragmenting each file into fragments each being a QE, injecting each QE with a set of quantum random noise, encrypting each QE using an encryption protocol and a random key, and shuffling a set of QEs into a random order such that the set of QEs is configured to be stored in a non-volatile memory as a QuID for the set of one or more original files. In various embodiments, each QE has a random size that exceeds a threshold size with a total number of QEs for each file exceeding a threshold number. In various embodiments, the set of quantum random noise for each QE is a set of random sizes of noise at a set of random locations in the QE whereby decryption of the QE would produce corrupted data if the set of quantum random noise is not correctly removed before decryption. In various embodiments, each QE has an element name that is a random string of alphanumeric characters having a common length. In some embodiments, some of the non-standard ciphers have a controllable Cipher Efficacy (CE) from a minimum $CE_{MIN}$ to a maximum $CE_{MAX}$. In various embodiments, this CE can be tuned to dictate the overall latency, file size, and QHC efficacy.

In embodiments, the Packager system creates a QCU for the QuID having a quantum element map and a quantum cryptography map. In some embodiments, the quantum element map and the quantum cryptography map are separate files generated as part of the QCU. In other embodiment, the quantum element map and the quantum cryptography map are represented not as separate files, but rather as a single merged file of manipulated strings of information that protect and hide the encryption-related information, data and/or metadata relating to the incryption/dicryption processes and methodologies.

In some embodiments, the QCU is created as an amalgamated codex of various incryption-related information, data, and/or metadata combined into a single encrypted data object that serves as a metakey for each plain text package to be protected. An advantage of these embodiments is that the QCU can provide a package uniqueness level of protection unmatched by AES even in a situation where unique symmetric AES keys are used for each encryption of different plain text packages. In embodiments, not only are the QHC protection and obfuscation ciphers different for each package to be protected, the QHC protection and obfuscation ciphers order and efficacy can also vary on a per package basis.

In some embodiments, the quantum element map includes for each QE the corresponding quantum element name together with the random order and random size of that QE and the set of random sizes and the set of random locations of the set of quantum random noise in that QE. The quantum cryptography map includes the quantum random key and a nonce value and for each file of the set of original files a set of element names of the QEs that correspond to each of the fragments of that file together with an original file name and a set of metadata for that file. In some embodiments, the quantum cryptography map includes a variable and/or random order of the set of protocols, including at least some of the QHCs, including an order of at least some of the QHCs, used by the Packager system to incrypt and create the QuID. In some embodiments, the quantum cryptography map further includes meta data for a set of decoy digital assets in the set of original digital assets. In some embodiments, the quantum element map and the quantum cryptography map are created as separate files or data objects within the QCU. In other embodiments, the information for mapping elements and correlating element names to file names is being integrated into the QCU as one or more sets of manipulated strings of information that may be merged or integrated into a single data object.

In some embodiments, the set of protocols used by the Packager system to incrypt and create the QuID further includes a protocol order for the set of protocols that is variable. In other embodiments, the set of protocols further includes adding a set of decoy files to the set of original files. In some embodiments, the unPackager system is configured to access the protected package stored and for each computing node of the target computing system, unpackage one of the set of QuIDs to be accessed by that computing node and use a corresponding one of the set of QCUs to recover one or more of the set of original files. In embodiments, the unPackager system unpackages each file of the set of original files by reconstructing the file from the QuID using the quantum element map, removing the set of quantum random noise from the file using the quantum element map, and configuring the file using the quantum cryptography map to be dicrypted and stored in a volatile memory of the computing node as the corresponding original file under the corresponding original file name.

In some embodiments, at least the set of QCUs are stored in a secure removable storage system such as a biometric access protected removable drive. In various embodiments, storing the set of original files in volatile memory of the computing node further protects the original files as they are effectively erased when the computing node is powered off.

In some embodiments, the Packager/unPackager system includes a separate Quantum Symmetric Secret (QSS) produced by the quantum random number generator. The QSS bears resemblance to a symmetric encryption key, yet it differs from conventional cryptographic symmetric keys by the way it is applied and used by one or more of the QHCs. In some embodiments, the QSS is used to provide an additional element of security for the Packager/unPackager system. In some embodiments, the QSS is in injected at locations into the binary executable of the Packager system and the string of QSS bits is extracted and used to confirm the proper relationship of a QCU/QuID pair and/or the proper relationship of the unPackager to the secondary node.

In some embodiments, the target computing environment for the digital asset protection system is an embedded system securely connected to a secure computer node and isolated from any external connections. In various embodiments, the embedded device includes a primary microcontroller having a volatile memory, a non-volatile memory, and a secure internal communication channel to the secure computer node, and at least one secondary microcontroller having at least a volatile memory and a secure internal communication channel to the primary microcontroller. In embodiments, the unPackager system utilizes at least the secure node to authorize and unpackage the unique one of the set of QuIDs generated for each of the primary microcontroller and the at least one secondary microcontroller to be loaded over the secure internal communication channels into the volatile memory of that microcontroller.

In some embodiments, the target computing environment for the digital asset protection system is a networked device securely connected to the secure computer node via an external network. In various embodiments, the networked device includes as computing nodes of the target computing environment at least one set of servers, each server having a volatile memory, a non-volatile memory, and a secure external communication channel to the secure computer node. In embodiments, the unPackager system utilizes at least the secure node to authorize and unpackage the unique one of the set of QuIDs generated for each of the server to be loaded into the volatile memory of that server utilizing double ratchet transmission control protocol communications over the external network.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 16B is a process flow diagram of the Unpackage process of an embodiment of the Lite configuration embodiment shown in FIG. 15.

Figure 1:
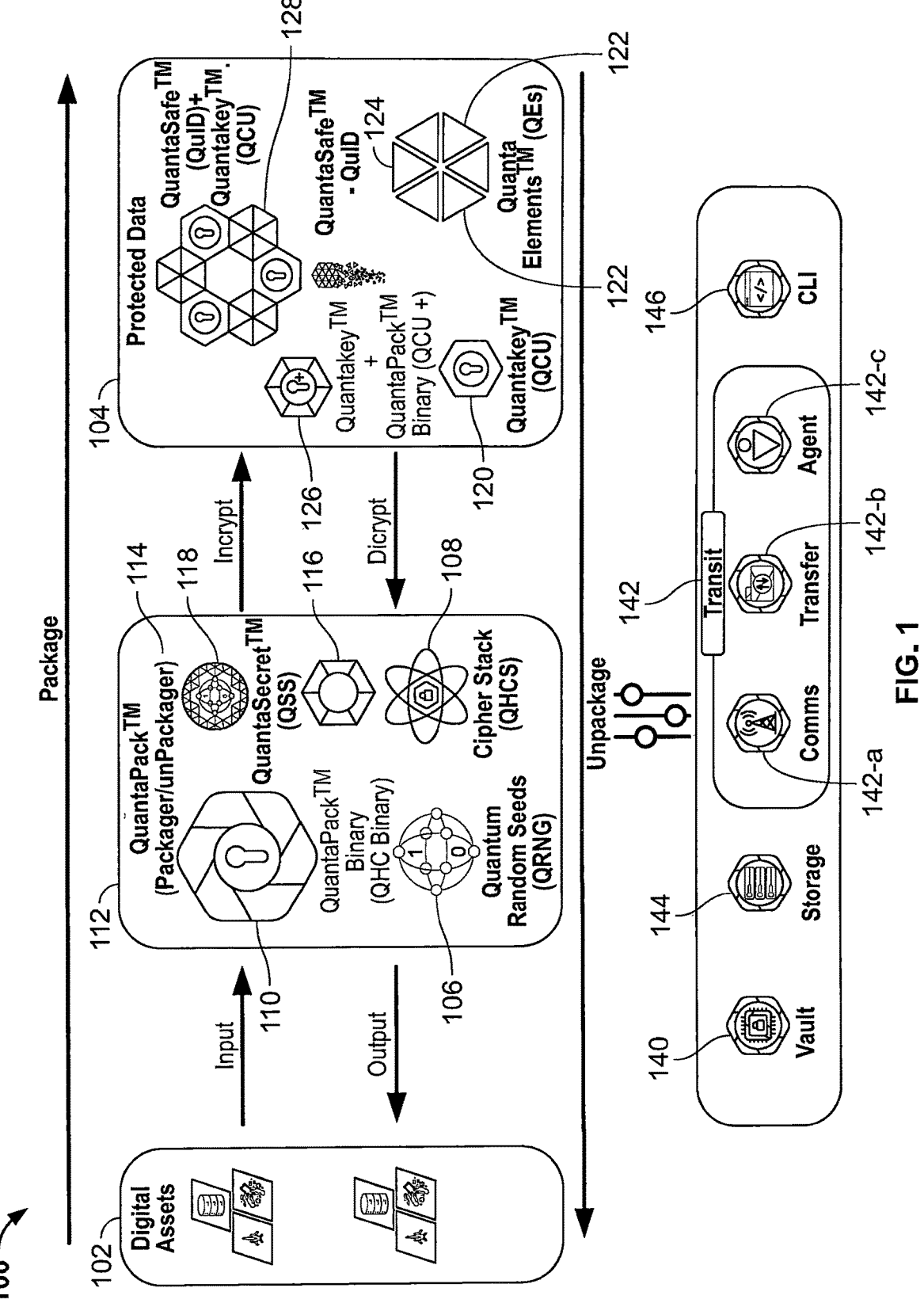
FIG. 1 is a high-level schematic of an embodiment of a technology architecture for a quantum cyber resilient digital asset protection system.

While embodiments of the disclosure are amenable to various modifications and alternative forms, specifics thereof shown by way of example in the drawings will be described in detail. It should be understood, however, that the intention is not to limit the disclosure to just the embodiments described. On the contrary, the intention is to cover all modifications, equivalents, and alternatives falling within the spirit and scope of the subject matter as defined by the claims.

DETAILED DESCRIPTION

For purposes of this specification, the following terms and acronyms are specifically defined as follows:

Amalgamated Codex or Cryptex refers to a collection of various information, data and/or metadata elements that are combined into a single data object. The term "amalgamated" suggests a fusion of different elements, while "codex" is a collection of information. So, an amalgamated codex refers to a unified data object that brings together diverse pieces of information, typically in a structured or organized manner. In the context of quantum cyber resilience and incryption, this data object would include incryption-related information and may be protected or encrypted.

Anti-Tampering (AT) includes engineering and human activities and capabilities that are intended to prevent or delay access to or exploitation of critical program information.

Ciphertext refers to encrypted/incrypted text/data transformed from plain text/data using a cryptographic process.

Critical Program Information (CPI) refers to the cyber capabilities and elements of a device or system that contribute to technical advantage, including military advantage, of such devices or systems.

Cyber is a term that indicates relationship or relatedness to the field of computer science, including computers, information technology and virtual reality.

Cyber Resilience is the ability to anticipate, withstand, recover from, and adapt to adverse conditions, stresses, attacks, or compromises on cyber systems that use or are enabled by cyber resources.

Cybersecurity is a field of computer science focused on protecting computer and information technology networks, systems, and data from unauthorized access and cyber-attacks.

Digital Assets includes data, code, databases, text, training sets and/or weighting sets for neural networks, ciphertext that is hardware and/or software encrypted data, digital content, or digitally personal identifiable information, or any electronic or optical information in the form of a file, a record, or an element as one of a set of digital assets that is at rest, in use or in transit. Digital Assets are sometimes referred to as intellectual property.

Double Ratchet Encryption is a kind of algorithm used to exchange encrypted messages based on an asymmetric secret key.

Encrypt/Decrypt/Encryption generally refers to use of a single Standard (NIST approved and/or publicly available) ciphers (ex: AES-256).

Incryption/Incrypt/Dicrypt refers to a set of computer-implemented processes, protocols and/or techniques used to construct and/or deconstruct an object of digital assets by encrypting/decrypting the digital assets as encrypted data using at least one Standard protection/encryption algorithm, and using one or more non-Standard protection/encryption ciphers and multiple invisibility/obfuscation processes, protocols, and techniques to make any intrinsic information derivable from the encrypted data that may have discernable patterns or properties effectively invisible.

Obfuscate/Deobfuscate refers to the cryptographic processes performed by the Non-standard obfuscation ciphers in the QHC Stack.

Package/Unpackage refers to the execution of the QuID/QCU Packager/Unpackager.

Protect/Restore refers to the cryptographic processes performed by the Non-standard protection ciphers in the QHC stack.

Processor is used in this disclosure to represent specific hardware computing structures and is synonymous with terms like controller and computer and should be understood to encompass not only computers having different architectures such as single/multi-processor architectures and sequential/parallel architectures as well as quantum computers, but also specialized circuits such as field-programmable gate arrays (FPGA), application specific circuits (ASIC), graphic processing units (GPU), signal processing devices and other devices.

Quantum Computer: refers to a type of advanced computational device that makes use of the principles of quantum mechanics, a fundamental theory in physics that describes the behavior of energy and material on atomic and subatomic levels. Unlike classical computers, which use bits as the basic unit of information (represented as either 0 or 1), quantum computers use quantum bits, or qubits.

Quantum Computing is a field of computer science focused on the development of computer and information technologies based on the principles of quantum theory that uses the unique properties of quantum physics to solve problems that are too complex and/or too massive for solution by classical computing.

Quantum Containment Unit (QCU) is a protected package that contains an amalgamated codex of various incryption-related information, data, and/or metadata combined in a single data object for a data asset package to be protected.

Quantum Cryptography Map (QCM) is a digital map/file/data object/structured object associated with a QuID that contains information about cryptography key, nonce, and associated information, and metadata for the set of digital assets that are protected as ciphertext in the QuID.

Quantum Cyber Resilience or Quantum Resilience are cyber resilience solutions and techniques applicable to adverse conditions, stresses, attacks, or compromises on cyber systems where the cyber resources used include quantum-computing.

Quantum Element (QE) is a single quantum incrypted piece or shard that corresponds to a fragment of a file, a record, or an element in a set of original digital assets.

Quantum Element Map (QEM) is a digital map/file/data object/structured object that contains information and associated metadata about the quantum elements (QEs) in a QuID including relationships and correlations to the original set of digital assets.

Quantum Element (QE) is a single quantum incrypted piece or shard that corresponds to a fragment of a file, a record, or an element in a set of original digital assets.

Quantum Hybrid Cipher (QHC) is a set of different protection and obfuscation ciphers applied in a random order and/or at a variable efficacy.

Quantum Incrypted Data (QuID) is an incrypted package of a set of digital assets protected as ciphertext quantum elements for a computing node in a target computing system.

Quantum Incryption is incryption that utilizes a quantum-resistant encryption algorithm and a quantum entropy source for random values.

Representational State Transfer Application Programming Interface (RESTful API) is a web service implementation that adheres to the principles of REST, a software architectural style used for creating scalable web services. RESTful APIs are used for building web services that are lightweight, maintainable, and scalable, often used for internet applications.

Software Anti-Tampering (SAT) includes anti-tampering designed or intended to prevent reverse engineering and exploitation of critical software and firmware technologies to deter technology transfer, alteration of system capability, or the development of countermeasures.

Symmetric Security Strength Bits (k) is a value used to estimate an end-to-end security strength represented in effective key length bits of security strength.

Tape Archive (TAR) command refers to the Tape Archive tool in Unix and Linux used for creating and manipulating archive files. The basic function of tar is to bundle a collection of files and directories into a single archive file (commonly known as a tarball), which can be easier to transport and store.

Transmission Control Protocol (TCP) is one of the main protocols of TCP/IP networks that enables two nodes to establish a connection and exchange streams of data.

As the field of quantum computing continues to advance at a rapid pace, the encryption standards that were once considered unbreakable and have long been endorsed by NIST may soon be vulnerable to new forms of cryptographic attack. This vulnerability presents the risk of sensitive data being exposed and/or compromised, a risk that was previously thought to be nearly impossible.

In addition to the need to shift to post-quantum cryptography (PQC) as the standard for encryption algorithms, there is a pressing need for the adoption of more advanced cryptanalytic agile processes and technologies that can keep up with the accelerating advances of CRQCs. Embodiments of the present disclosure provides a quantum resilience solution that is engineered to specifically address and neutralize the heightened threats posed to symmetric encryption by the exponentially exploding computational capabilities inherent in AI-enhanced CRQCs.

Unlike standard encryption algorithms which have relied on linearly increasing key size as the way to make the algorithms stronger, the incryption security framework for a quantum cyber resilient digital asset protection system can be designed for cryptanalytic agility by using randomized processes that allow for an exponential increase in a theoretical maximum symmetric security strength as an average estimated number of bits of security (k). The value of k for various embodiments uses an estimated effective key size per cipher as part of the basis for calculating the effectiveness of various embodiments as described. In embodiments, k may be designated in an equivalent key size in bits to permit a comparison to both the AES key sizes and the current export license key size reporting threshold for a symmetric non-standard encryption cipher.

In embodiments, the analysis of estimating k is broken out by ciphers that are categorized as either obfuscation ciphers, which are non-standard, and protection ciphers, which are either standard encryption or non-standard encryption. It will be understood that the obfuscation ciphers will have less individual effective key size impact as the power of the obfuscation derives from the lack of knowledge of whether/how the cipher is being used. Likewise, the non-standard encryption ciphers also have some effective key length benefit, especially if the non-standard encryption cipher is not publicly known. In addition to an evaluation of the individual ciphers, this analysis includes the important factorial/exponential impact of the random order and cipher efficacy of the ciphers in a QHC stack. In various embodiments, a new QCU is created as an amalgamated codex of various incryption-related information, data, and/or metadata combined into a single encrypted data object representing a metakey for each plain text package to be protected. In such embodiments, the QCU provides a package uniqueness level of protection unmatched by AES even if unique symmetric AES keys are used for each encryption; and not only is the QHC stack different for different packages, the incryption protection process also varies per protected package.

In some embodiments, one of the objectives of the incryption scheme of the digital asset protection system is to generate random puzzle pieces that simply do not make sense and cannot be reassembled without the information in the QCU. When none of the puzzle pieces make sense, it is impossible to reassemble the puzzle. In various embodiments, the incryption schemes as disclosed have too many non-algorithmic options and configurations that cannot be evaluated using brute force attacks. Because the number of permutations of a given QuID is so unimaginably large there are no known mathematical curves that could be determined to represent the QuID.

In some embodiments, an estimate can be performed of how much truly random noise and obfuscation needs to be added to each puzzle piece to ensure that it doesn't make any sense. Using Shannon Information Theorem that given a noisy channel with channel capacity C and information transmitted at a rate R, then if R<C there exist codes that allow the probability of error to be made arbitrarily small. The converse is that if R>C, an arbitrarily small probability of error is not achievable. For attempts to hack cold storage, the information transmission rate R can be assumed to be the sum of processing speed of the hacking system over the time available to conduct the attack, and C is the size of the data in cold storage. This relationship is similar to encryption theory that increases the size of the key to increase security. Thus, the use of quantum computing and machine learning as parts of the processing system greatly increase R for a given attack time T.

Referring now to FIG. 1, a computer-implemented digital asset protection system 100 is shown, that is configured to protect a set of original files of digital assets 102 as protected packages 104 of quantum incrypted data that is quantum cyber resilient. In various embodiments, the set of original files of the digital assets 102 can include a set of files having a single original file for a single computing node in a target computing environment, a set of multiple original files for a single computing node, or multiple sets of original files each set for a different computing node in a target computing environment. Each original file of the digital assets can include, digital information in the form of a file of data or code, for example, or a record or an element of a database, for example, as one of a set of digital assets that is at rest, in use, or in transit.

In embodiments, the EnQuanta™ digital asset protection system 100 includes a QuantaPack™ Packager/unPackager system 110 configured to protect the set of original digital assets 102 as protected packages 104 by incryption and recover the set of original digital assets 102 by dicryption. In some embodiments, the functionality of the Packager/unPackager system 110 may be divided into separate programs/binaries for a Packager 112 and an unPackager 114.

In some embodiments, aspects of the Packager system 110 are within a secure computing environment that is isolated and/or secured for both physical and network access. In some embodiments, the Packager system 112 is configured to generate a protected package 104 to be securely delivered to and stored by a storage system of a target computing environment. In some embodiments, the unPackager 114 includes a QHC binary 116 to be downloaded into the target computing environment. In other embodiments, the functionality of the Packager/unPackager system 110 is a combined program/binary that is executed in a secure development or factory computing environment. In other embodiments, the unPackager 114 is configured to be installed in a secure computing node of the target computing environment to unpackage the protected package 104. In other embodiments, the combined program/binary for the Packager/unPackager system 110 is installed at each of a plurality of nodes connected by a secure/unsecure network in the computing environment. In these embodiments, the Packager/unPackager system 110 takes in the digital assets 102 that are to be protected and creates protected package 104 that is safe to be sent from one node as a transmit node over an unsecure/secured network to one or more other nodes as a receive node that is also equipped with a Packager/unPackager system 110 to unpackage the protected package 104 and recover the original digital assets 102.

In embodiments, aspects of Packager/unPackager system 110 are securely connected to a quantum entropy source such as a quantum random number generator (QRNG) 106. In some embodiments, QRNG 106 of the digital asset protection system 100 is configured to generate a quantum random seed and/or key to be used by the Packager/unPackager system 110 and in some embodiments by other software binaries that are part of the digital asset protection system 100. In some embodiments, QRNG also provides a seed to a QuantaSecret™ quantum symmetric secret (QSS) 118 that is integrated into various data objects as a further layer of protection as will be described.

In embodiments, the set of protocols and techniques used by the Packager 112 to protect the set of original files as quantum incrypted data uses the quantum entropy source to seed different variable and randomized aspects of a set of Quantum Hybrid Ciphers (QHCs) 108 to generate a set of QuantaElements™ quantum elements (QEs) 122 that are combined together as a QuantaSafe™ quantum incrypted data (QuID) 124 representation for the set of original digital assets 102. Unlike conventional encryption techniques that include only a single standard encryption algorithm or a limited and fixed number and order of non-standard cipher techniques, the QHCs 108 in various embodiments are a stack of multiple different ciphers that used in an order and number which is variable to at least some degree to further enhance the strength and cryptographic agility of the quantum cyber resilient security.

In various embodiments, the output of the QHC stack 108 is a paired QuantaKey™ Quantum Containment Unit (QCU) 120 and QuantaSafe™ QuID 124 as a protected package 104. The term "incryption" is somewhat analogous to "encryption," but encompasses an expanded cryptographic process that can include one or more standard encryption algorithms plus non-standard QHC processes. A QCU 120 is an amalgamated codex of various incryption-related information, data, and/or metadata to be used by the unPackager for the "dicryption" process that reverses the methodology and sequencing of the paired QCU 120 and QuID 124 as a protected package 104. The QuID 124 is the collection of digital assets (e.g., data, message, and/or code) that has been protected and is maintained in an incryption state either as data at rest or data in transit. In some embodiments, the QCU 120 and QuID 124 pairs are tightly coupled to their associated unique Packager/unPackager methodology. In some embodiments, the QHC binary 116 and the QCU 120 are merged together as a QCU+ 126 that provides both the amalgamated codex and the QHC binaries needed to decrypt the QuID 124. In some embodiments, a single pair of the QCU 120 and QuID 124 form the protected package 104. In other embodiments, a set of multiple pairs of QCUs 120 and QuIDs 124 are merged together into a QuID/QCU stack 128.

In some embodiments, there is a one-to-one relationship of a protected package 104 of the quantum incryption protected QEs 122 bundled together in a QuID 124 and a corresponding QCU 120 as the amalgamated codex of incryption-related information that serves as a kind of key ring that is itself locked in a lock box to securely hold the multiple, randomly ordered cipher keys and associated meta information for the QHCs 108 used to incrypt a QuID 124. In other embodiments there can be a one-to-many relationship or a many-to-one relationship between a single QCU 120 or a set of QCUs 120 and a set of QuIDs 124 or a single QuID 124 in the incryption protected packages 104.

In some embodiments, the QCU 120 includes information and meta data representing a set of quantum random keys, nonces, and/or values is used for all randomization in the encryption and incryption by a random order and/or a selective cipher efficacy of a QHC stack 108 used for quantum resilience protection of a given protected package 104. In other embodiments, some randomization values in the encryption and incryption of a given protected package may use a pseudo random value instead of a quantum random key. In some embodiments, the QCUs 120 are encrypted with the same or a different encryption key for one of a set of standard protection ciphers or encrypted using a different encryption key or a different cryptographic approach than the standard encryption ciphers used on the QuIDs 124.

In embodiments, the QCU 120 is used by a computing node in a target computing system to dicrypt the corresponding QuID 124. In various embodiments, the QCU 120 can be an obfuscated JSON file containing all metadata related to a single associated QuID 124 or, in alternate embodiments, a set of associated QuIDs 124. The metadata consists of information about the incryption process used by the Packager system 112 to generate the QuID and enables a corresponding unPackager system 114 to unpackage the QuID 124. In embodiments, a unique "fingerprint" may be generated based on the QCU 124, and this fingerprint is injected into the unPackager binary of the unPackager system 114 or the QHC binary 116 to prevent other binaries besides the intended one from using the QCU 120 associated with that fingerprint. In some embodiments, the QCU 120 is optionally protected using information inherent to the QHC process to provide encryption, incryption, and/or additional security without having to separately store/share a unique key.

Figures 2A, 2B:
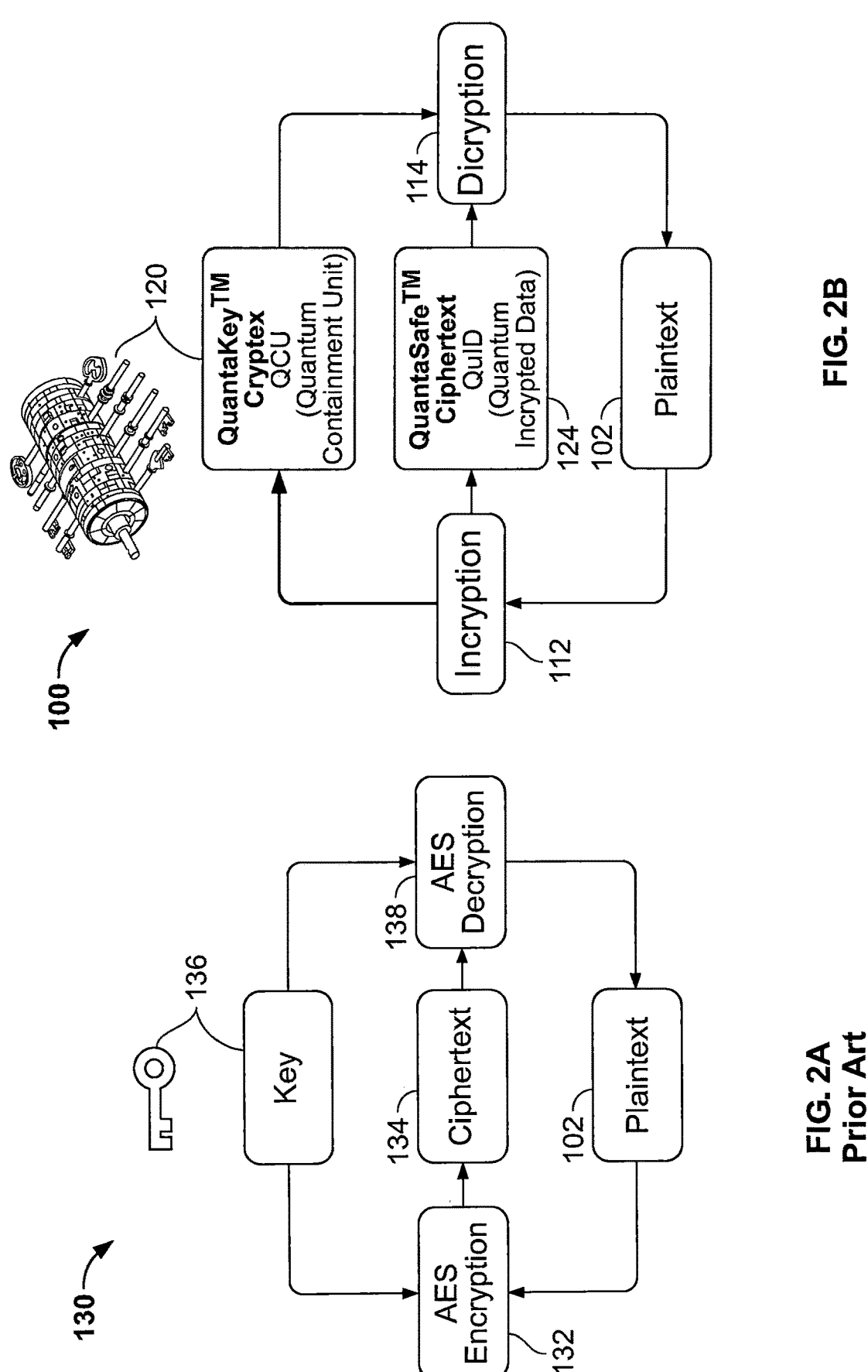
FIGS. 2A and 2B are simplified high-level flow charts showing a comparison of the prior art process for standard AES encryption/decryption with the process for incryption/dicryption using an embodiment of the quantum cyber resilient digital asset protection system.

FIGS. 2A and 2B show a high-level comparison of the prior art process for standard AES encryption/decryption with the process for incryption/dicryption using the quantum cyber resilient digital asset protection system. In embodiments of the quantum cyber resilient digital asset protection system 100 shown in FIG. 2B, the Packager system 112 is configured to use incryption to generate the QCU 120 and the corresponding QuID 124 that are packaged to form the incryption protected package 104. The unPackager system 114 is configured to unpackage the protected package 104 using the QCU 120 to dicrypt the QuID 124 to reconstitute the original digital assets 102 as plaintext data. This process is somewhat like the high-level process for standard AES encryption 130 as shown in FIG. 2A where the plaintext data 102 is fed into the AES encryption algorithm 132 along with the AES key 136 (e.g. AES256 bit key) to generate the ciphertext 134. The AES decryption algorithm 138 can decrypt the ciphertext 134.

There are numerous differences, however, in these two processes. Foremost among these differences, the incryption process of the digital asset protection system 100 is a non-deterministic process in which the QCU as a variable metakey cryptex is an output of the incryption process and an input to the decryption process. In contrast, the standard AES process 130 is a deterministic process in which the same externally provided fixed key 136 is used as an input to the same algorithm used in both encryption 132 and decryption 138. Other differences in AES encryption versus embodiments of the digital asset protection system 100 include:

Quantum protection is enabled by using true quantum entropy randomization throughout the QHC processes, instead of relying only on antiquated pseudo-random number generators and widely published ciphers, such as AES.

The QCUs are exponentially more complex and obscure than current symmetric encryption keys.

QCUs can be selectively separated from the QuIDs but remain matched sets.

The QHC processes are cryptographically agile as they are not static; compare this to static keys that are stored with the encrypted data and algorithmically never change.

Table 1 below shows a side-by-side comparison of various features of each of these processes.

TABLE 1

| Comparison of Incryption/Dicryption vs. AES Encryption/Decryption | | |
|---|---|---|
| Feature | Incryption/Dicryption | AES Encryption/Decryption |
| Ciphertext | Incrypted Data (i.e. QuID) A QuID is produced by a randomized cipher stack of QHCs consisting of standard and non-standard ciphers that provide encryption capabilities along with alternative data transformations. Embodiments combine the QHCs into a dynamic incryption process utilizing QRNG that produces a QuID and a generated QCU used as a metakey. | Encrypted Data (i.e. ciphertext) AES ciphertext is produced by repeated application of a one-way mathematical function based on a constant-length key as input. Full diffusion in AES takes 2 rounds, meaning that after 2 rounds every bit in the output is dependent on every bit in the input. AES256 runs for 14 rounds. |
| Unpackaged Data | Dicrypted QuID is written to a RAMFS volatile memory mounted drive, from which it is automatically cleared if power is lost or other kill parameters are met, leaving no trace of its existence on the system. | Decrypted ciphertext is typically written directly to persistent memory (RAMFS by default is not provided to AES). Even if sensitive decrypted information is deleted from the system, it may still be recoverable by system forensics tools. |
| Process | Non-deterministic Randomized process that is easily reversible given access to the QCU and dicryption algorithm. The process changes every time incryption is performed. Multiple ciphers (both standard and non-standard) ordered with true quantum randomization. Additional security framework processes are typically needed to properly use the incryption/dicryption core capabilities. | Deterministic Well-defined process that is easily reversible given access to the key and decryption algorithm. The process is the same every time encryption is performed. 14 rounds with 3 operations/round: SubBytes, ShiftRows, MixColumns. No additional framework processes are needed to use AES; the encryption/decryption algorithm is public knowledge. |
| Key | The QCU is an amalgamated codex generated by the incryption process, using a QRNG entropy source that is effectively a metakey larger than the AES key. The QCU is an output from the incryption process. Because the QHCs use a QRNG, all random processes can be seeded properly and without the possibility of weak keys. QCU size is variable, directly related to input data size. Example: 1.3 Mb protected data → 12 Kb QCU 20.6 Mb protected data → 150 Kb QCU | An external source provides the AES key to the encryption algorithm. The initialization vector sizes used by AES are typically generated from a pseudo-random entropy source. The key is an input to the encryption process. If the key was not properly generated, it could undermine the AES encryption security. Using password-based keys or low quality pseudo-random keys can lead to this issue. Key size is predetermined, not related to input data size. Example: 1.3 Mb protected data → 0.032 Kb key 20.6 Mb protected data → 0.032 Kb key |
| Comparison Results | k is in a range dependent on the Specification (Base or Pro) and number of data objects. k (Base): ≅ $256 \leq k \leq 512$ Δk (Base): ≅ $1 \leq \Delta k \leq 256$ | k for AES is a fixed value equal to the number of bits in the AES key, which for AES256 is 256. k AES256: = 256 Δk AES256: = 1 |

55

Figures 5A, 5B:
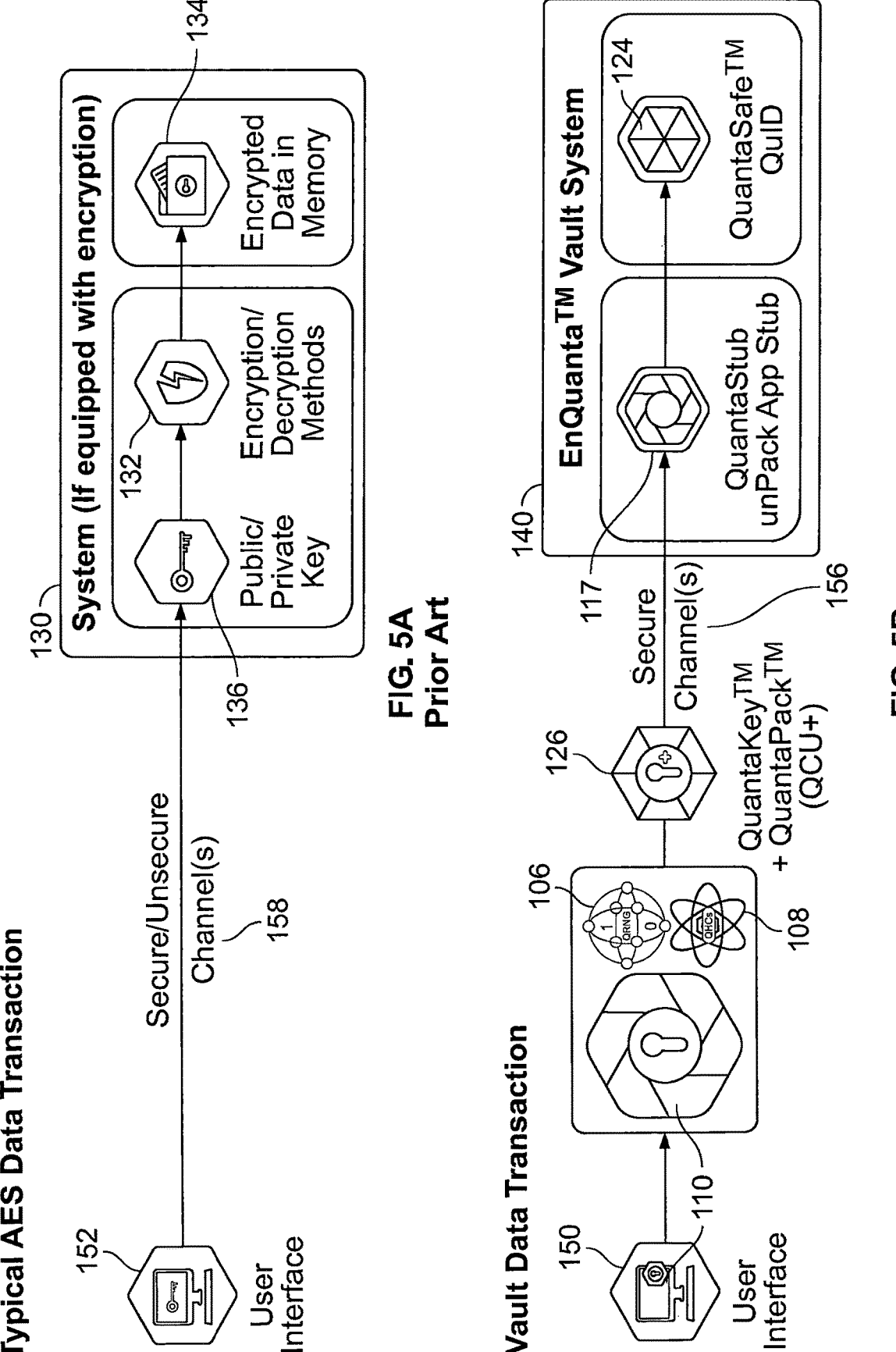
FIGS. 5A and 5B are simplified block diagrams showing a comparison of the prior art process for standard AES encryption with the incryption process of an embodiment of the Vault.

FIGS. 5A and 5B show a comparison of the prior art process for standard AES encryption with the incryption process of an embodiment of the Vault. As described with respect to FIGS. 2A and 2B, for example, standard AES encryption is a deterministic process in which a same fixed key is used an input to a same algorithm used in encryption and decryption, whereas an incryption process used when performing a secure vault data transaction is a non-deterministic process that employs a variable metakey and a variable set of algorithms. Further distinctions between the standard AES encryption and the incryption process and additional details of the processes will now be discussed.

Referring now to FIG. 5A, a typical AES data transaction is shown. To initiate the AES data transaction, for example, a system user can interact with a user interface of computing device 152 to specify the key 136 (e.g., a public (asymmetric)/private (symmetric) key to be used for encrypting and/or decrypting data. The computing device 152, for example, can transmit the key 136 to a system that is configured to perform standard AES encryption 130, over secure/unsecure channel(s) 158. After receiving the key 136, for example, the encryption-enabled system can use the key 136 as an input to the encryption/decryption method 132 (e.g., an AES encryption/decryption method), which can operate on plaintext data to generate encrypted data 134 (e.g., ciphertext), which can be stored in memory. Similarly, the same key 136 that was used to encrypt the plaintext data can be used as an input to the encryption/decryption method 132, which can operate on the encrypted data 134 (e.g., ciphertext) to decrypt and restore the plaintext data.

Figure 6:
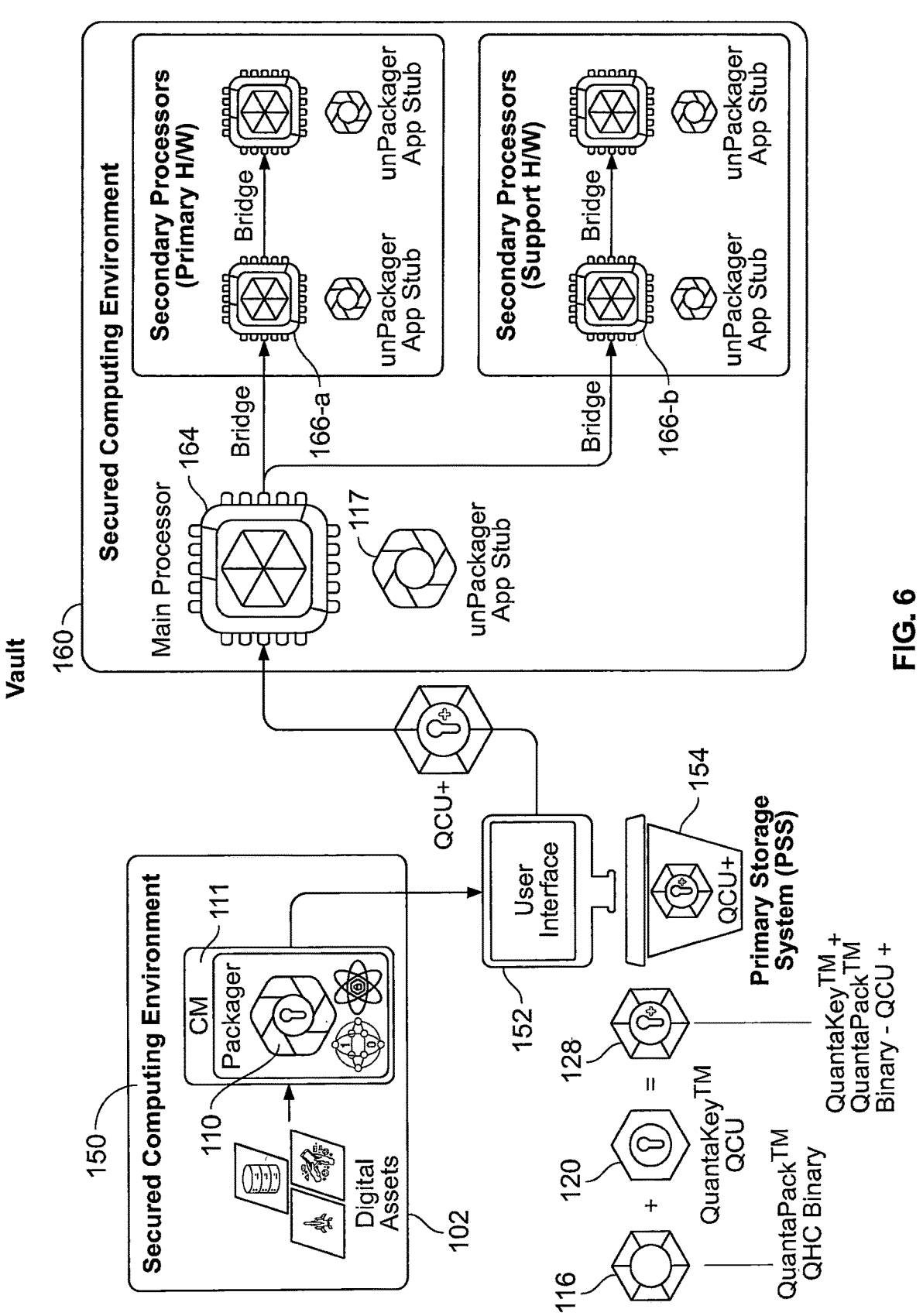
FIG. 6 is a block diagram of the Vault embodiment of the quantum cyber resilient digital asset protection system.

Referring now to FIG. 5B, a Vault data transaction is shown. To initiate the Vault data transaction, for example, a system user can interact with a user interface of computing device 150 to provide commands to a Packager/unPackager system 110 that is in communication with the computing device 150. In the present example, the Packager/unPackager system 110 includes a QRNG 106 that can generate a seed for various aspects of the cipher and other protection processes of the Packager/unPackager system 110, including the various QHCs 108 that are to be randomly selected from and randomly sequenced when incrypting data (e.g., plaintext data). As part of an incryption process, for example, a QHC stack 108 can be generated by the Packager/unPackager system 110 and can be used to create QEs 122 from the plaintext data. As shown in FIG. 6, a Quantum Containment Unit bundle (QCU+) 126 that includes a QHC binary 116 and a QCU 120 can also be generated and packaged together. The QCU+ 126 and the QuID 124 can be provided, together or separately, over secure channel(s) 156 to a Vault system 140. After receiving the QCU+ 126 and the QuID 124, for example, the Vault system 140 can employ an unPackager App Stub 117 that extracts the QHC binary 116 from the QCU+ 126 to operate on the QuID 124 according to the information included in the QCU 120 that is also included in the QCU+ 126 to restore the plaintext data. Rather than merely being an input to an encryption process like the key 136 for decryption in the AES process 130, the QCU 120 is generated as one of the outputs of the incryption process. Thus, the format, size, and content of the QCU is variable, adding another layer of complexity and security.

Figure 3:
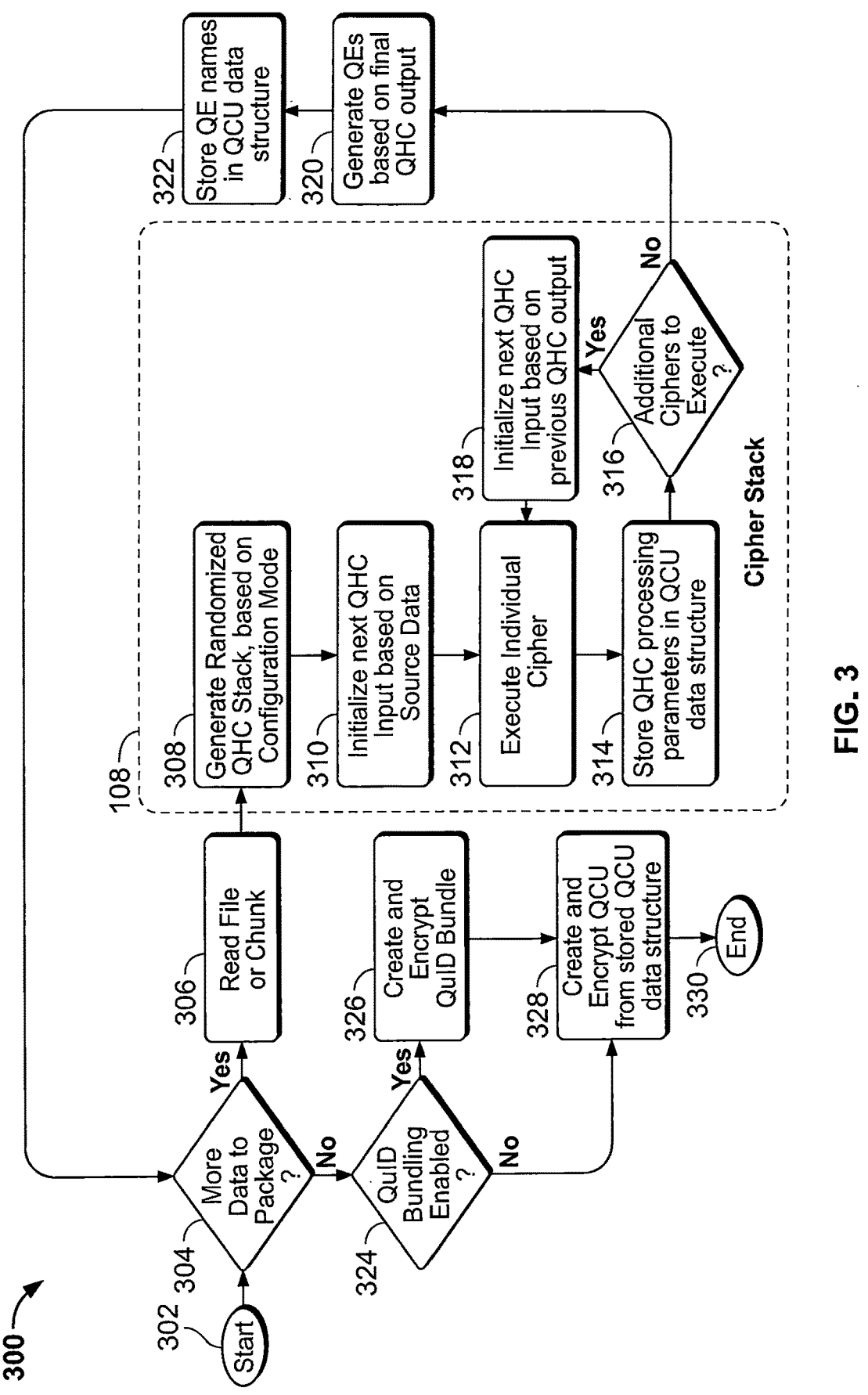
FIG. 3 is a flow chart of embodiments of the incryption process of the quantum cyber resilient digital asset protection system.
Figure 4:
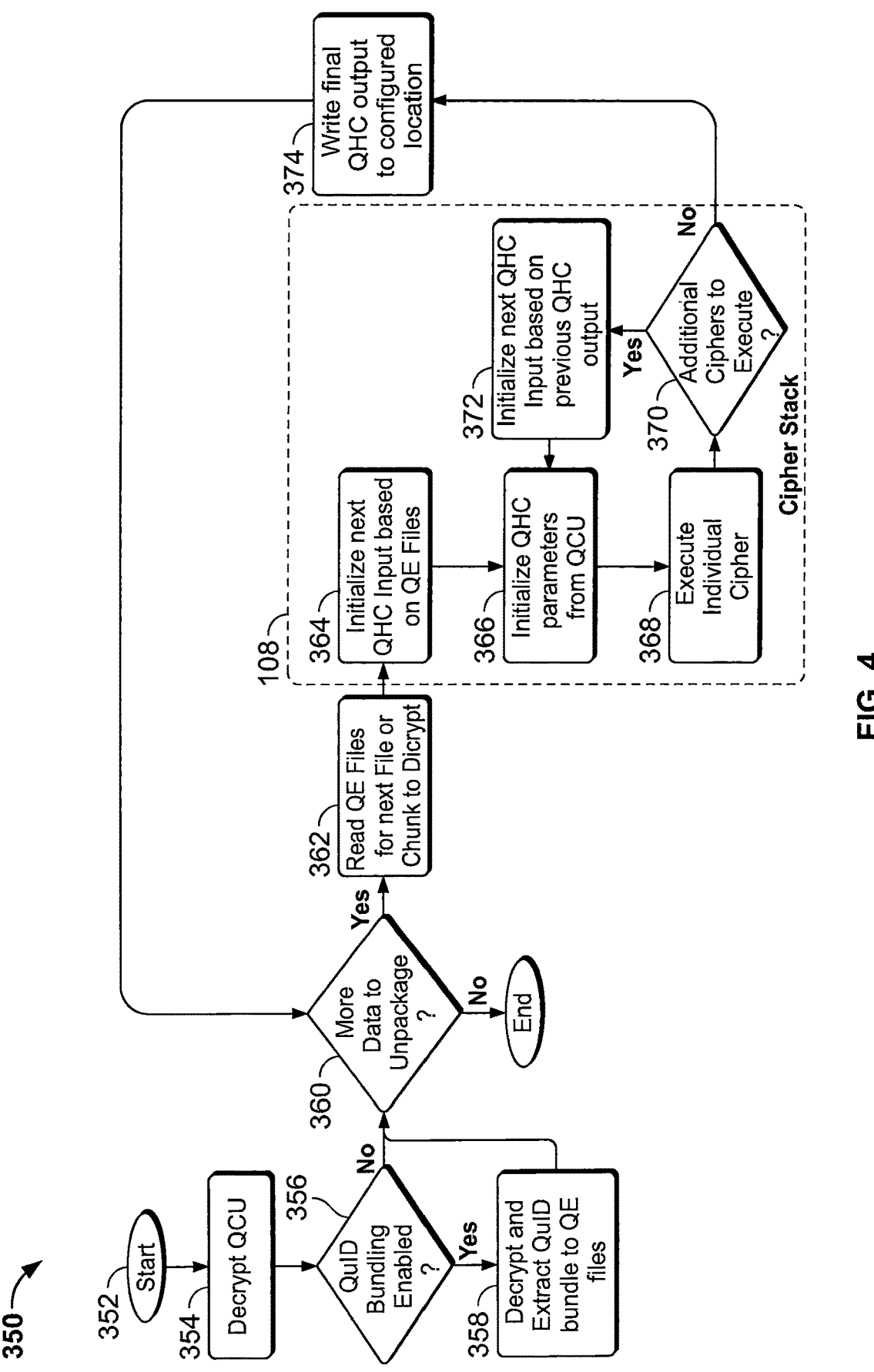
FIG. 4 is a flow chart of embodiments of the dicryption process of the quantum cyber resilient digital asset protection system.

FIGS. 3 and 4 are more detailed flow charts of embodiments of an incryption process 300 (shown in FIG. 3) and a dicryption process 350 (shown in FIG. 4) of the quantum cyber resilient digital asset protection system 100. The processes 300, 350 can be performed by components of the digital asset protection system 100, for example, and will be described with reference to FIG. 1. However, other systems may be used to perform the same process or a similar process. Operations of the processes 300, 350, for example, may occur in the illustrated sequence, or may occur in a sequence that is different than in the illustrated sequence. In some embodiments, two or more operations of the processes 300, 350 may be concurrent.

Referring now to FIG. 3A, at 302, the incryption process 300 starts. For example, the packager/unpackager system 110 of the digital asset protection system 100 (shown in FIG. 1) can receive as input the set of original digital assets 102 (also shown in FIG. 1), and a command to incrypt the original digital assets 102. The original digital assets 102, for example, can represent one or more data units, including files, records, application code, or other sorts of digital information.

At 304, a determination is performed of whether there is more data to package. During the incryption process 300, for example, the packager 112 of the packager/unpackager system 110 can track a current status of the process 300 over time, including an indication of which portions (e.g., files or file chunks) of the original digital assets 102 have already been incrypted, and an indication of which portions of the original digital assets 102 have yet to be incrypted. In the present example, as the process 300 has just started, the original digital assets 102 have yet to be incrypted.

At 306, a portion of the data (e.g., a file or file chunk) is read. For example, the packager 112 of the packager/unpackager system 110 can reference its internal tracking of the current status of the incryption process 300 for the digital assets and can select and read the next portion of the data for incryption. In general, the incryption process 300 can proceed iteratively through the original digital assets 102, with a first portion of the original digital assets 102 being incrypted first, with a second portion of the assets 102 being incrypted second, and so forth, until all portions of the assets 102 have been incrypted. In some embodiments, the data portions can be of a uniform size. In some embodiments, the data portions can be of a variable size. For example, each file of a set of data files can be of a different size, and each data file can be separately read and incrypted. As another example, a single data file can be partitioned into a set of differently sized chunks, which are separately read and incrypted.

At 308, a randomized Quantum Hybrid Cipher (QHC) stack (e.g., selected from the QHCs 108, shown in FIG. 1) is generated, based on a configuration mode. For example, the packager 112 of the packager/unpackager system 110 can reference random data generated by the quantum entropy source 106 (or another source of random data) to randomly select from a set of possible ciphers (e.g., including both NIST-based ciphers and non-standard protection/obfuscation ciphers), and to randomly sequence the selected ciphers. In general, the QHC stack includes at least two different ciphers, and can possibly include many ciphers. In some embodiments, all of the ciphers in the generated QHC stack can be different ciphers. In some embodiments, some of the ciphers in the generated QHC stack can be the same cipher, repeated at different positions in the stack, and optionally with different configuration parameters. Further details related to the ciphers and their configurations are provided below with respect to FIGS. 9 and 10, as well as elsewhere in this document and the supporting documentation.

At 310, a next QHC input is initialized, based on source data. For example, the packager 112 of the packager/unpackager system 110 can provide the portion of the data that was previously read (at 306) as the next QHC input to a process that executes the QHC stack 108. In general, to execute the QHC stack 108, the packager 112 can sequentially execute each cipher according to the determined (at 308) random order of ciphers, with the first cipher operating on the portion of the data that was read, with a second cipher operating on the output of the first cipher, and so forth, until each of the ciphers in the QHC stack 108 have been executed.

At 312, an individual cipher is executed. For example, the packager 112 of the packager/unpackager system 110 can track a progress of an incryption process for the previously read data (e.g., the portion of data that was read at 306), including a reference to a position in the QHC stack 108 of a currently executed cipher. In the present example, the first cipher in the QHC stack 108 can be executed on the portion of the data that was previously read. Executing the individual cipher, for example, can include executing the cipher code for the cipher according to the processing parameters that have been defined for the cipher (e.g., during a previously performed configuration operation, during a randomized parameter selection process, or at another time).

At 314, QHC processing parameters are stored in a Quantum Containment Unit (QCU) data structure 120. For example, the packager 112 of the packager/unpackager system 110 can store the QHC processing parameters for the executed individual cipher in the QCU data structure 120, along with an identifier of the executed cipher. As the incryption process 300 progresses, for example, the identi- fier of each executed cipher and its corresponding process- ing parameters can be sequentially appended to the QCU data structure 120, such that a conceptual map is generated for use in later dicrypting the incrypted data.

At 316, a determination is performed of whether there are additional ciphers to execute. For example, the packager 112 of the packager/unpackager system 110 can reference the position of the previously executed cipher in the QHC stack 108 and can determine whether any subsequent ciphers exist in the QHC stack 108 (e.g., ciphers that have yet to be executed), according to the current position and the previ- ously determined random order of ciphers. In the present example, the packager 112 determines that several addi- tional ciphers exist in the QHC stack 108 after the first executed cipher.

At 318, if there are additional ciphers to execute, the next QHC input is initialized based on previous QHC output. In the present example, the packager 112 of the packager/ unpackager system 110 can initialize the next QHC input based on the output of the previously executed cipher (e.g., the first cipher). Operations for incrypting the portion of the data can iteratively continue, with the next individual cipher in the QHC stack (according to its sequential position in the QHC stack 108) being selected and then executed (at 312), the QHC processing parameters for the next individual cipher being stored in the QCU data structure 120 along with an identifier of the next individual cipher (at 314), and the determination of whether additional ciphers exist in the QHC stack 108 being performed (at 316), until all of the ciphers in the QHC stack 108 have been executed, and all of the QHC processing parameters for the executed ciphers have been stored in the QCU data structure 120 along with the corresponding cipher identifiers. As the output of an executed cipher is being provided as an input to a next cipher in the QHC stack 108, it will be appreciated how the resulting incrypted data becomes more and more indecipher- able with each iteration.

At 320, if there are no additional ciphers to execute, a set of quantum elements (QEs) 122 is generated based on the final output of execution of the QHC stack 108. For example, the packager 112 of the packager/unpackager system 110 can generate the set of QEs 122 (e.g., data fragments), from the output of the last executed cipher in the QHC stack 108 and can optionally shuffle the QEs in a random order. In the present example, the packager 112 can also generate a unique identifier (e.g., a QE name) for each QE in the set of QEs.

At 322, the unique identifiers (e.g., the QE names) are stored in the QCU data structure 120. In some embodiments, the QE names are standardized and obfuscated to remove any discernible metadata information. For example, the packager 112 of the packager/unpackager system 110 can store, for each QE 122 in the set of QEs, the unique identifier (e.g., the QE name) that had been generated for the QE 122, in the QCU data structure 120, along with the optional information that indicates its sequence among the set of QEs 122. The information pertaining to the QEs 120 can be stored in the QCU data structure 120 along with the infor- mation that pertains to the executed ciphers in the QHC stack 108 (e.g., the cipher identifiers and associated con- figuration parameters).

In the present example, the incryption process 300 loops back to 304, where another determination is made of whether there is more data to package. If so (e.g., one or more files remain unpackaged, one or more data chunks remain unpackaged, etc.), the next portion of the data (e.g., file or file chunk) can be read (at 306) and can be indepen- dently incrypted. Incryption of the next portion of the data, for example, can be performed according to a new random- ized QHC stack 108 that is different from the previously executed QHC stack 108, and which results in an additional set of QEs 122 and an additional QCU data structure 120 for the next portion of data. The process 300 iterates thusly, until all the data has been incrypted.

At 324, if no more data is to be packaged (e.g., all of the data files or chunks have been packaged), a determination is performed of whether Quantum Incrypted Data (QuID) 124 bundling is enabled (e.g., based on a configuration setting of the packager/unpackager system 110). If so, at 326, a QuID bundle 126 of incrypted QEs 122 is created and then encrypted. For example, the packager 112 of the packager/ unpackager system 110 can bundle all of the previously generated QEs for all of the incrypted portions of data into a single data package for secure storage and/or transmission.

At 328, a QCU 120 is generated and encrypted from the stored QCU data structure(s) (e.g., either in response to determining that QuID bundling is not enabled, or in response to determining that QuID bundling is enabled and upon creating and encrypting the QuID bundle). For example, the packager 112 of the packager/unpackager system 110 can create and encrypt the QCU 120 (shown in FIG. 1), using one or more standard and/or non-standard encryption techniques. At 330, after creating and encrypting the QCU 120, the incryption process 300 ends.

Referring now to FIG. 4, at 352, the dicryption process 350 starts. For example, the packager/unpackager system 110 of the digital asset protection system 100 (shown in FIG. 1) can receive the QCU 120 (also shown in FIG. 1) as input, along with the QEs 122 (also shown in FIG. 1), which can optionally be bundled in a QuID bundle 124. The QCU 120 and the QEs 122, for example, can together be used to restore one or more data units (e.g., including files, records, application code, or other sorts of digital information) that have previously been incrypted (e.g., using the incryption process 300, shown in FIG. 3).

At 354, a QCU 120 is decrypted. For example, the unpackager 114 of the packager/unpackager system 110 can decrypt the QCU 120 (shown in FIG. 1), using one or more standard and/or non-standard decryption techniques. The unpackager 114, for example, can receive information that pertains to the encryption technique(s) that were previously used to encrypt the QCU 120, and can decrypt the QCU 120 based on the received information.

At 356, a determination is performed of whether Quantum Incrypted Data (QuID) bundling is enabled (e.g., based on a configuration setting of the packager/unpackager system 110 and/or information included in the QCU 120). If QuID bundling is enabled, at 358, a QuID bundle is decrypted and a set of quantum elements (QEs) is extracted. For example, the unpackager 114 of the packager/unpackager system 110 can decrypt the QuID bundle and extract the QEs 122 (e.g., a batch of files or other data elements).

At 360, a determination is performed of whether there is more data to unpackage (e.g., either in response to deter- mining that QuID bundling is not enabled, or in response to determining that QuID bundling is enabled and upon decrypting the QuID bundle 124 and extracting the QEs 122). During the dicryption process 350, for example, the unpackager 114 of the packager/unpackager system 110 can track a current status of the process 350 over time, including an indication of which batches of QEs 122 (e.g., files or other data elements) have already been dicrypted, and an indication of which batches of QEs 122 have yet to be dicrypted. In the present example, as none of the batches of QEs 122 have yet been dicrypted, the process 350 can proceed.

At 362, a batch of QEs 122 is read for a next file or chunk to dicrypt. For example, the unpackager 114 of the packager/unpackager system 110 can reference its internal tracking of the current status of the decryption process 350 and can select and read a next batch of QEs 122 (e.g., a batch of QEs for a next file or chunk) for dicryption. In general, the dicryption process 350 can proceed iteratively through batches of the QEs 122, with a first batch of the QEs 122 being dicrypted first, with a second batch of the QEs 122 being dicrypted second, and so forth, until all batches of the QEs 122 have been dicrypted. The batches of QEs, for example, can correspond to the sets of QEs 122 that were previously generated through incrypting the original data assets 102, and can be identified by the unpackager 144 from information included in the corresponding QCU 120 (e.g., the unique identifiers that have been maintained for each QE 122 in association which each incrypted file or chunk).

At 364, a next QHC 120 input is initialized, based on the QEs 122. For example, the unpackager 114 of the packager/unpackager system 110 can provide the batch of QEs 122 for the next file or chunk that was previously read (at 362) as the next QHC input to a process that reverses the operations specified in the QHC stack 108. In general, to reverse the operations of the QHC stack, the unpackager 114 can, in reverse sequential order according to the random order of ciphers in which a portion of data was incrypted, perform operations that reverse the effect of each cipher in the QHC stack. For example, the effect of a last cipher on the QEs 122 can be reversed first, with an output of the last cipher reversal being passed to an operation for reversing the second to last cipher, and so forth, until the effect of each of the ciphers in the QHC stack has been reversed and the data file or chunk is dicrypted.

At 366, QHC parameters are initialized from a QCU data structure 120. For example, the unpackager 114 of the packager/unpackager system 110 can reference information in the QCU 120 that pertains to the QHC stack 108 that was used to incrypt the file or chunk (e.g., including the ordered list of ciphers and parameters for each cipher), and can identify the processing parameters that were used when incrypting data using each of the ciphers). As the dicryption process 350 progresses, for example, the unpackager 114 can apply the parameters that were previously used for executing each cipher, when performing a reversal of the cipher.

At 368, an individual cipher is executed in a way such that its effect is reversed. For example, the unpackager 114 of the packager/unpackager system 110 can perform operations that reverse the individual cipher and can track a progress of a dicryption process for the previously read QEs (e.g., the QEs that were read at 362), including a reference to a position in the QHC stack of a cipher that is currently being reversed. In the present example, the effect of the last cipher in the QHC stack on the QEs can be reversed first, by executing a reversal cipher that corresponds to the last cipher. Executing the reversal cipher, for example, can include executing the reversal cipher code according to the processing parameters that were used when previously applying the cipher during incryption.

At 370, a determination is performed of whether there are additional ciphers to execute (such that the effects are reversed). For example, the unpackager 114 of the packager/unpackager system 110 can reference the position of the previously reversed cipher in the QHC stack 108, and can determine whether any preceding ciphers exist in the QHC stack 108 (e.g., ciphers that were applied during incryption before the cipher that has just been reversed), according to the current position and the order of ciphers in the QHC stack 108. In the present example, the unpackager 114 determines that several preceding ciphers exist in the QHC stack 108.

At 372, if there are additional ciphers to execute (reverse), a next QHC input is initialized, based on previous QHC output. In the present example, the unpackager 114 of the packager/unpackager system 110 can initialize the next QHC input based on the output that results from the reversal of the last cipher in the QHC stack 108. Operations for decrypting the QEs 122 can iteratively continue, with the QHC parameters for the next individual cipher in the QHC stack 108 according to a reversed order of the stack being initialized (at 366), the next individual cipher being executed in a way such that the effect of the cipher is reversed (at 368), and the determination of whether additional ciphers exist being performed (at 370), until all of the ciphers in the QHC stack 108 have been reversed, starting from the last cipher and ending with the first cipher that were originally used to incrypt the file or chunk.

At 374, if there are no additional ciphers to execute, a final output is written to a configured location. For example, the unpackager 114 of the packager/unpackager system 110 can write the dicrypted file or chunk to a volatile memory location where additional files are appended as the dicryption process 350 continues. In the present example, the dicryption process 350 loops back to 360, where another determination is made of whether there is more data to unpackage. If so (e.g., one or more batches of QEs remain packaged), the next batch of QEs 122 can be read (at 362) and can be independently 30 encrypted. Dicryption of the next batch of QEs 122, for example, can be performed by reversing the effect of the randomized QHC stack 108 that was used to incrypt the QEs 122, which can be different from the previously reversed QHC stack 108. The process 350 iterates thusly, until all of the batches of QEs 122 have been dicrypted.

At 376, if there is not more data to unpackage, the dicryption process 350 ends. For example, the unpackager 114 of the packager/unpackager system 110 can assemble the results of decrypting each batch of QEs and can provide the final result of the process 350 as a restored copy of the set of original digital assets 102.

Configurations

Referring again to FIG. 1, the computer-implemented digital asset protection system 100 can be implemented in various configurations and/or instantiations. Some of these are shown in FIG. 1 for Vault 140, Transit 142, including different modes for Comms 142-a, Transfer 142-b, and Agent 142-c, Storage 144, and Lite 146. These different configurations can include different features and options directed to different computer systems and digital asset configurations and/or instantiations. In general, these configurations and/or instantiations include the core features of the digital asset protection system 100 and may also have add or drop features or have variations. It will be understood that various hybrid or combinations of these configurations and/or instantiations may also be implemented or utilized.

Vault 140 is generally directed to hardened quantum cyber resilience protection of static digital assets stored in long-term non-volatile memory that may not be secure where the digital assets are only periodically updated or changed (e.g., embedded microcode for computer systems potentially susceptible to capture and reverse engineering of the microcode). Transit 142 is generally directed to quantum cyber resilience of digital assets in transit where the digital assets are potentially subject to snooping or capture on computer network channels that may be unsecure (e.g., transmissions of wireless or internet networks). Storage 146 is generally directed to quantum cyber resilience protection of dynamic digital assets in non-volatile memory in a presumably secure facility where the digital assets are frequently or continually updated or changed (e.g., networked server storage or RAID servers). Lite 148 is generally directed to quantum cyber resilience protection of selected digital assets in a custom computer system environment where only user-selected higher-value digital assets need quantum cyber resilience protection.

Vault

The Vault configuration 140 is a digital data storage product that can be used to protect data objects/assets such as firmware, dataset(s), and other CPI. Vault offers exceptional cyber resilience against data theft by storing sensitive information in an incrypted state that cannot be hacked. The Vault technology uses the power of true quantum entropy randomization, combined with proprietary processes and QHC stacks to provide state-of-the-art quantum cyber resilience protection of static digital assets stored in long-term non-volatile memory that may not be secure where the digital assets are only periodically updated or changed.

Electronic information in the form of digital data/assets can be protected and deployed to remote nodes securely. A QCU as the unique amalgamated codex is used to incypt a corresponding QuID and both are packaged to create the set of incrypted data objects being protected. The set of one or more QCUs and the corresponding set of one or more QuIDs are then physically separated once deployed to a target server (node) of a system. The incrypted data in the QuIDs is stored in a non-volatile memory and is protected through 'render useless' tactics at cold rest, ensuring the security and integrity of the information even if the system is compromised. The amalgamated codex in the QCUs is stored in a secured computer storage or a secured removable drive and only distributed nodes in the system to enable access and/or installation of the incrypted data in the QuIDs. Incrypted data is unpackaged only into volatile memory and used for specific operations before being discarded. In the event a system is captured or compromised, Vault features a Software Anti-Tamper (SAT) solution that guarantees all data stored in volatile memory is lost and/or purged to prevent unauthorized access to the sensitive information.

Features of Vault

Quantum resilience data protection in cold storage.

Physical separation between QuID (locked/incrypted data) and QCU (locked key ring/amalgamated codex).

Transmission of the QCU is performed over encrypted TCP to unlock the QuID.

Versatile software-only design allows Vault to operate within various network topologies.

Could be used in conjunction with Storage.

Quantum Resilience

Randomized QHC stack and processes unique to each Packager execution.

Volatile memory working area for unpackaged sensitive information; cleared when power is removed.

Unpackager binaries that control the QHCs dicryption process are stored in a physically separate location from the corresponding QuIDs and transferred to any secondary nodes at unpackaging time. This sensitive code is stored only in volatile memory and immediately discarded after unpackaging.

Anti-Tamper

The QCU is tightly coupled to the associated unPackager binaries via a unique fingerprint, resulting in unpackaging failure if an invalid QCU fingerprint is detected in the unPackager binaries.

Attempts to modify or tamper with the QuIDs, QCUs, or Unpackager binaries will be detected and cause subsequent unpackaging attempts to fail.

Option to have QuIDs and QCUs "shuffled" after each execution so stale copies of QuIDs and/or QCUs are invalidated, making replay attacks infeasible and providing extra security for boot operations.

Use Cases for Vault

Standalone Primary: Any data can be protected with Vault if separation is maintained between a QuID and the corresponding QCU, and the QCU is kept secure. The simplest use case is a standalone primary node that has a QuID in non-volatile memory, and a QCU on a secure external device acting as Primary System Storage (PSS). The secure device is plugged into the primary node, the QuID is dicrypted using the QCU and unpackaged into volatile memory, then the system continues to boot and/or use the sensitive data as needed.

Primary-Secondary: A distribution package (containing a QuID) is deployed to non-volatile memory on a secondary node. Additional distribution packages can be deployed to as many secondary nodes as needed. The corresponding QCU or QCUs are deployed to a PSS (ideally some form of removable media that can be stored securely when not in use). The primary node acts as the "head of the snake"—without the primary node, none of the secondary nodes can unpackage their QuIDs. As secondary nodes boot, each retrieves its QCU from PSS via secure TCP, each uses the retrieved QCU to dicrypt and unpackage the corresponding QuID into volatile memory, then each continues to boot and/or use the sensitive data as needed.

Bridging: Systems that do not allow direct communication between secondary and primary nodes can use bridge node(s) to facilitate QCU/unPackager binary retrieval.

Storage

The Storage configuration 144 provides secure network storage for data-at-rest and fortified network communications for data-in-transit. The system's primary server/node is responsible for incrypting sensitive data, which is then broken into pieces and distributed across multiple secondary servers/nodes in the Storage network. Distributing incrypted data to the networked servers/nodes results in random pieces of the full dataset being physically separated and stored on random servers/nodes, so sensitive information remains safe even if a hacker manages to gain access to or hijacks some of the servers/nodes. The Storage system includes a software-only RAID capability specifically designed to provide resilience against ransomware. Notably, the system has a quantum cyber resilience capable of maintaining operations even if up to 40% of the network servers/nodes are compromised by ransomware attacks.

Features of Storage

Fortified network communications for data-in-transit to networked data-at-rest servers/nodes.

Adjustable system resilience based on network server/ node configuration.

Software-only RAID10 capability with per-distribution dynamic mirrors.

Hardware fault tolerance via data redundancy.

Stored information is protected against ransomware attacks, data breaches, insider threats, and other forms of malicious cyber activities.

Data-at-rest protection with physical separation between QuID and QCU data objects.

Memory-only primary node avoids writing QuID or QCU to disk before distribution, improving both security and performance characteristics.

Simple software installation via an Application Program Interface (API) that supports Distribute (create), Retrieve (read), and Purge (delete) operations to manage incrypted data stored in Storage.

Keys and metadata are managed automatically, so the user only needs to specify the correct Global Universal Identification (GUID) when making API requests.

Use Cases

Alternative to traditional long-term persistent storage solutions.

Can be used in conjunction with Vault.

Can be used to store/maintain any database that contains sensitive information.

Can be installed to support a variety of access levels, including:

Public-facing cloud storage service.

VPN/Firewall restricted service, accessible only to users within a specific organization.

Installed on a local network (LAN) and only available to users with physical access to the network.

Transit

Comms

The Comms configuration mode 142-*a* provides a secure real time communication channel between two or more parties. Every message is protected to provide state-of-the-art quantum cyber resilience protection for real time digital communications using an optimized set of QHCs that combine exceptional performance with industry leading security capabilities. Digital data is protected by incryption with a unique amalgamated codex, referred to as a QCU, and a corresponding QuID created as a protected package for the incrypted data. Data is also protected in transit with fortified network communication. Comms also uses a Packager/ UnPackager system that incorporates a unique Quantum Symmetric Secret (QSS) generated by a QRNG to bolster security and defend against man-in-the-middle attacks.

This configuration mode facilitates low-latency Point-to-Point or Point-to-Multipoint communications. It is designed to be impervious to any tools or brute force methods that hackers might use to decipher or unlock the QCU/QuID, which are available on the dark web. Offering double-layered protection, it secures the transfer of classified data over unsecured channels, including so-called 'Black-Net-works.' This system is especially effective in providing real-time protection for conversations, messages, and emails. In cases where data is intercepted, the incrypted data remains incomprehensible, appearing as a 'sea of nothing-ness' to unauthorized interceptors.

Features

Protection for real time data in transit.

Low-latency secure communications.

Scalable bandwidth via multi-socket capability.

Versatile design allowing centralized or point-to-point communication.

Multi-layer security provided by a non-deterministic incryption process operating within state-of-the-art public key cryptography.

QSS ensures only related nodes (same QSS) can communicate with each other and also provides interception security.

QuID is processed and transmitted without ever needing to be written to non-volatile memory.

Use Cases

Email.

Audio streaming.

Sensor logging updates.

Text messaging, including small media attachments.

Real-time communications of relatively small datasets (<1 Mb).

Transfer

The Transfer configuration mode 142-*b* facilitates the transfer of large datasets for non-real time scenarios. It is designed to be resilient against data interception, ensuring that even the most sophisticated brute force methods or tools available on the dark web are ineffective. Every transfer is protected by state-of-the-art quantum cyber resilience protection for real time digital communications using an optimized set of QHCs that combine exceptional performance with industry leading security capabilities. Digital data is protected by incryption with a unique amalgamated codex, referred to as a QCU, and a corresponding QuID created as a protected package for the incrypted data. Transfer features a Packager/UnPackager system that employs a unique Quantum Symmetric Secret (QSS) generated by a QRNG for enhanced security. Both Point-to-Point and Point-to-Multi-point file sharing are supported.

This configuration mode offers a dual layer of protection for the transfer of classified data. The first layer of protection packages all sensitive data into a QuID/QCU pair and blends them together to achieve a single bundle only separable by a party's privy to the QSS. In the event of interception, the combined pair appears as an indecipherable "sea of noth-ingness". The second layer of security uses state-of-the-art public key cryptography to guarantee privacy while the combined pair is in transit. This allows Transfer to be used in a wide range of operating environments, including over unsecured networks, including so-called 'Black Networks'. This deployment flexibility coupled with bulletproof security effectively eliminates the need for physical hand couriers.

Features

Protection for non-real time data in transit.

Large dataset support.

Scalable bandwidth via multi-socket capability.

Versatile design allowing centralized or point-to-point transfers.

QSS ensures only related nodes (same QSS) can communicate with each other and provides interception security.

Multi-layer security provided by a non-deterministic incryption process operating within state-of-the-art public key cryptography.

Non-volatile memory only QCU.

QuID is processed and transmitted without ever needing to be written to non-volatile memory, although QuID can be unpackaged to non-volatile memory by the receiver, depending on data size and intended use.

Non-rea-time, allowing more sophisticated QHCs to be used for maximum security.

Use Cases

Video streaming.

Transfer database dump file.

Send media from a drone to a base station upon returning to origin.

Non-real-time communications of relatively large data-sets (>5 Mb).

Agent

The Agent configuration mode 142-*c* is designed to execute commands on target devices remotely and securely. This technology offers a range of capabilities and is well-suited for remotely controlling various types of hardware. Commands to execute software updates can also be distributed to remote target nodes. A feature of Agent is its software/firmware anti-tamper functionality, which ensures that all commands/binaries pushed to remote nodes reside in volatile memory and only for the length of time required to execute the desired operations, keeping sensitive information safe both while in use and before/after use. This comprehensive approach to device management and security makes Agent a robust tool in the realm of remote device control and protection.

Features

Protection for control and command data in transit.

Scalable bandwidth via multi-socket capability.

Versatile design allowing centralized or point-to-point communication.

Remote control or execution of commands/binaries on target devices

Multi-layer security provided by incryption process operating within state-of-the-art public key cryptography.

QSS ensures only related nodes (same QSS) can communicate with each other and provides interception security.

QuID is processed and transmitted without ever needing to be written to non-volatile memory, although QuID can also be unpackaged to non-volatile within memory by the receiver, depending on data size and intended use.

Use Cases

Send commands to execute on a target device. Examples:

Securely distribute software updates to a set of target nodes

A sensor node, such as video feed can be sent a remote command to change the parameters of operation (e.g. change direction).

Software/firmware Anti-Tamper: install executable software only when needed to operate the device.

Lite

The Lite configuration 146 features a core Command Line Interface (CLI), is a streamlined version of QHC incryption/decryption process designed for ease of use in command-line environments. This configuration is particularly suitable for custom integration into different computer system workflows, especially in cases where the computer system architecture differs from the architectures supported by Vault or Storage.

The CLI is a minimalistic yet powerful tool, offering all the security advantages, of the digital asset protection system in a single, easy-to-use binary. This binary is capable of both packaging and unpackaging data. As a standalone application, it doesn't rely on network connectivity or a separate configuration application for packaging, enhancing its versatility and user-friendliness. The CLI provides sensible runtime defaults but allows a user to override these values using command line options or an optional JSON configuration file.

Despite the ease of use, the CLI still incorporates a full QHC stack and QRNG to deliver cutting edge security and quantum cyber resilience. The output of this incryption process is a protected package of a QuID and a QCU. Although the CLI can be configured to write this data object to any location, they should be stored in physically separated locations until they are needed for unpackaging. For example, some recommended options that provide the best security are to store the QCU on an encrypted removable drive, a RAMFS location, or in a cloud storage service.

Features

Versatile, easy to configure and use.

Can be used without config file or configuration manager.

Single binary for both packaging and unpackaging.

Includes the full QHC stack that drives the randomized incryption process.

Can be run with or without a config file.

If a config file is present, options that are specified on the command line take precedence over the values from in a default json.

Use Cases

Sensitive documents can be packaged with the CLI and the QCUs can be stored on an encrypted removable drive. If the QuIDs are compromised, the data cannot be recovered without access to the QCUs, which requires physical access to the removable drive, along with the drive's access code.

The CLI, can be called from automated scripts to package and unpackage data on the fly. In this case, the CLI is a symmetric encryption provider and could easily replace other traditional encryption techniques to provide the customer with advanced quantum cyber resilience capabilities.

Table 2 below shows a side-by-side comparison of differences among these configurations/instantiations with respect to the data objects and binary executables generated, used, and consumed by the different configurations—Vault 140, Storage 146, and Transit 142.

TABLE 2

| Comparison of Data Objects for Different Configurations | | | |
| --- | --- | --- | --- |
| Data Object Matrix | Vault | Storage | Transit |
| QCU - Contains the incryption-related information, such as QEM, QCMs, and metadata and/or data object format (e.g. JSON) | 1 File Stored on primary node and pushed to secondary to unlock QuID | 1 File distributed to QSRC (Raid 10) Nodes | 1 File QCU/QuID transmit to receiver OR QCU/QUID bundled before transmission |
| QE - Single piece of a quantum incrypted ciphertext | All QEs are placed into one QuID File OR All QEs transmitted to receiver | All QEs are distributed to QSRC (Raid 10) Nodes | All QEs transmitted to receiver OR All QEs put in QuID and bundled with QCU to transmit |

TABLE 2-continued

| Comparison of Data Objects for Different Configurations | | | |
| --- | --- | --- | --- |
| Data Object Matrix | Vault | Storage | Transit |
| QuID - Contains the set of all incrypted QEs | 1 File Contains N QE Files bundled into a single package N > 1 OR 1 Non-VM has QE Files OR | 1 folder contains N QE Files temporarily until distribution | 1 Non-VM has QE Files OR Put in QuID and bundled with QCU to transmit |

Table 3 below shows a side-by-side comparison of differences among these configurations with respect to the aspects of a computer environment in which binary executables for these different configurations of the digital asset protection system 100 may be instantiated.

TABLE 3

| Comparison of Binary Executables for Different Configurations | | | |
| --- | --- | --- | --- |
| Physical Devices | Vault | Storage | Transit |
| Factory | Packager/ unPackager Original Digital Assets that need to be protected | RESTful API | Pair Packager/ unPackager binary together with pre-configured QSS |
| Primary node | QHC+ - Bin QCU | Packager/ unPackager - Bin Original Digital Assets are transmitted and never stored in Non-VM QCU and QuID are not stored here | |
| Secondary Node | App Stub - Bin QuID | QSRC - Bin QCU and QuID | |
| Transceiver Node Each has Transmit/Receive Capabilities | | | Packager/ unPackager - Bin QCU, QUID, QSS Original Digital Assets are created in memory and never stored in Non-VM |

In some embodiments, a minimal set of incription protocols and techniques representing the ciphers in the QHC stack 108 used by the Packager system 112 to protect the set of original digital assets 102 as a QuID 124 includes:

An obfuscation cipher that fragments each file into fragments each being a QE 122, injecting each QE 122 with a set of quantum random noise, A plurality of protection cipher that encrypts each QE 122 using a standard encryption protocol protection cipher and a quantum random key, and at least one non-standard encryption protection cipher, and An obfuscation cipher that shuffles the set of QEs 122 into a random order such that the set of QEs 122 is configured to be stored in a non-volatile memory as a QuID 124 for the set of original digital assets 102.

In some embodiments, the set of protocols used by the Packager system 112 to create the QuID 124 further include a protocol order for the set of protocols that is variable. In other embodiments, the set of protocols further includes adding a set of decoy files to the set of original digital assets 102.

In embodiments, the incription process of the Packager/unPackager system 110 uses a random set of ciphers that are executed in random sequence, which is referred to as the "cipher stack" of QHCs 108. Security of the cipher stack is primarily based on the security of each cipher in the stack, referred to as CE. The QHC ciphers are analyzed individually so that the security contribution of each can be quantified. In embodiments, the available QHC ciphers provide a variety of different operations that are combined in a cipher stack to protect digital assets 102. There are two main cipher types:

Protection Ciphers: These ciphers are designed to directly protect (i.e. encrypt) the input data. Various embodiments can use standard ciphers such as AES256, as well as non-standard ciphers that apply various data transformations.

Obfuscation Ciphers: These ciphers are designed to add complexity to the packaged data by injecting decoy data or chunks of noise. There are also ciphers that can blend data together or split data apart to allow protected packages 104 to appear as a "sea of nothing" to an attacker. Note that many of these ciphers do not individually contribute a large number of bits of security, but they provide desirable properties when combined.

An embodiment of the stack of QHCs 108 can include the following ciphers:

Protection—Standard Encryption Ciphers: An encryption cipher configured to encrypt the set of incrypted data.

AES256-GCM

ChaCha20-Poly1305

Protection Non-standard Ciphers

Permutation: a permutation cipher configured to transform bits in the set of incrypted data.

Bit Shift/Mask cipher: a cipher configured to rotate 4 byte blocks and applies an XOR operation using a randomly chosen value.

Substitution cipher configured to substitute bits in the set of incrypted data.

Obfuscation Ciphers

Sprinkling: Packager applies each character of a QSS to random locations within a QuID ciphertext (injection locations are dynamically determined to avoid having to store in the QCU). Unpackager collects QSS characters from the QuID ciphertext, compares against configured QSS value, and only reconstitutes protected data if extracted and configured QSS match.

Fragmentation: a fragmentation cipher configured to fragment the set of incrypted data.

Noise

Padding: an augmentation cipher configured to pad the set of incrypted data to the random size.

Decoys: a fabrication cipher configured to add a set of decoy data to the set of incrypted data.

Injection: an injection cipher configured to inject a set of random noise into the set of incrypted data.

Multi-Chunk Noise (larger pieces of random noise)

Multi-Character Noise (smaller pieces of random noise)

Shuffle: a randomization cipher configured to shuffle the set of QE incrypted data.

In other embodiments, the stack of QHCs 108 can include subsets of randomly or quasi-randomly selected and ordered of the following protection ciphers as listed in Table 4 and obfuscation ciphers as listed in Table 5—Noise Ciphers that are included in the random ordering of the QHC stack 108 and Table 6—Chunk Ciphers that are not included in the random ordering of the QHC stack 108:

TABLE 4

Protection Cipher Types Summary

| Cipher Type | Description |
| --- | --- |
| AES256 | AES256 is a well-known encryption algorithm. For details, refer to: https://nvlpubs.nist.gov/nistpubs/FIPS/NIST.FIPS.197-upd1.pdf |
| Bitmask and Shift | The Bitmask & Shift cipher obfuscates data by creating an obfuscated mask based on the block index, combining that obfuscated mask with a private mask (the key), and then combining the final mask with the input data and performing a rotate operation, based on the block index.<br>Break the plaintext data into 4 byte blocks. For each block:<br>Create an obfuscated block mask using a custom obfuscation routine<br>Combine the block mask with the key (also 4 bytes) using an XOR<br>XOR input data for the block with the final mask from the previous step<br>Rotate the 4 byte output by a variable amount, based on the block index<br>The output from the previous step is the ciphertext for the 4 byte block |
| Permutation | The Permutation cipher shuffles data at the bit level. It operates on 4 byte blocks of the input data. It uses three separate shuffle operations (A, B, and C), based on the three different 8 byte keys stored in the QCU. Each of these values represents a random 16 element permutation:<br>Shuffle the higher 16 bits of the 4 byte block, according to permutation A<br>Shuffle the lower 16 bits of the 4 byte block, according to permutation B<br>Shuffle all 32 bits of block in 2-bit chunks, according to permutation C |
| Ring | The Ring cipher is based on modulo multiplication for GF(2^ 8), which allows obfuscation of the data in a reversible way. A randomly selected mask is also applied for additional security:<br>Protect:<br>Combine the input block with the mask, using xor<br>Multiply the resulting value by the multiplication factor and use the result (mod 256) as the ciphertext<br>Restore:<br>The restore process must calculate the multiplicative inverse to reverse the protect operation |
| Feistel | The Feistel uses a typical Feistel network, described here: en.wikipedia.org/wiki/Feistel cipher. An implementation uses 6 rounds. The F(X, Y) function is a hash function (SHA or Blake2b), using part of the encryption key as well as an obfuscated block index as the hash key. |
| One-time Pad | The One-Time Pad cipher generates a binary pad value that is XORed with the input message to create the ciphertext. Note that an implementation uses a QRNG to generate the pad, so it will be truly random. |
| Chained Bitmask | The Chained Bitmask cipher introduces the concept of a key stream to protect data. This method produces a sequence of key values that are dependent on both the original key stream seed, but also all subsequent protected data. This improves security by preventing partial, random access decryption. |

TABLE 5

Obfuscation Noise Cipher Types Summary

| Cipher Type | Description |
| --- | --- |
| Default Noise | The Default Noise cipher generates a random amount of noise and adds it to the beginning or end of the input element. The noise is typically 1-1024 bytes. The location and noise length are stored in the QCU. |
| Shuffle Noise | The Shuffle Noise cipher adds a random number of bytes of noise into the source element. Obfuscate:<br>Generates a random length noise chunk that is at least one byte and at least 1% of the input length (configurable)<br>Generate a shuffle key of 21 bytes (configurable)<br>Merge the noise into the input string, according to the shuffle pattern<br>Store the shuffle key + metadata in the QCU |
| Multi-chunk Noise | The Multi-Chunk Noise cipher adds a random number of bytes of noise into the source element. Obfuscate:<br>Number of noise chunks (typically 1-5)<br>Location of noise (anywhere in the file)<br>Size of Noise chunks (typically 1-1024) |
| Sprinkle Noise | The Sprinkle cipher generates a 32 byte string as the "sprinkle" and interleaves it into the message using a custom Sprinkled Strings functionality. Both the sprinkle and the merge header section are stored in the QCU.<br>After restoring the data, the extracted sprinkle is compared to the stored value from the QCU, and if a mismatch is detected, assume the data may have been tampered with and fail. |

TABLE 5-continued

| Cipher Type | Description |
| --- | --- |
| Periodic XOR | Corrupt ciphertext data by dividing it into blocks and XORing each block with a byte randomly chosen (based on key) from within that block. The Periodic XOR cipher iterates over the data in 16 byte blocks and chooses a random byte (based on the key) to xor with the original data. |

Obfuscation Noise Cipher Types Summary

TABLE 6

Obfuscation Chunk Cipher Types Summary

| Cipher Type | Description |
| --- | --- |
| Decoy | The Decoy cipher generates new elements and is intended to obfuscate the data by preventing an attacker from knowing which data is real and which is a decoy. |
| Fragmentation | The Fragmentation cipher attempts to create a 20% fragment count, based on the input size. It uses a 10-fragment minimum. After determining the fragment count, it randomly chooses the next element to break into 2 pieces, based on a randomly weighted size. This process is repeated until the fragment count is reached. The output fragments are stored in order and linked back to the parent element via the custom stealthy strings functionality. |
| Shuffle | The Shuffle cipher simply rearranges the input elements in a random order. A key for the updated order is stored to allow the transformation to be reversed. Accept 1-n elements as input. Rearranges the element(s) in random order, stores the information in the QCU, then outputs the rearranged elements. |

In some embodiments as indicated in the table below, quantum encryption includes a variable combination and order of encryptions and ciphers, together with a static combination and order of quantum protection. In some embodiments, the stack of QHCs 108 can include a subset of quasi-randomly selected and ordered of the following protection and obfuscation ciphers for both a real-time embodiment and a non-real-time embodiment as listed in Table 7 below. Note that the random selection of available ciphers is made as a selection of a subset of the indicated ciphers, with the order as indicated in the table and with the Decoy Cipher and the Fragmentation Cipher not being a randomly selected cipher:

TABLE 7

QHC Process Ordering

| (Real-time Embodiment) | (Non-Real-time Embodiments) |
| --- | --- |
| AES256 and 1 Protection Cipher | AES256 and 1-2 Protection Ciphers |
| Decoy Cipher | |
| | Shuffle Cipher |
| Fragmentation Cipher | |
| 1 Noise Cipher | 1-2 Protection Ciphers 1-2 Noise Ciphers Shuffle Cipher |

Digital Asset Protection Features

In various embodiments, each QE 122 has a random size that exceeds a threshold size with a total number of QEs 122 for each QuID 124 exceeding a threshold number. In various embodiments, each QE 122 has an element name that is a random string of alphanumeric characters having a common length. In various embodiments, the set of quantum random noise for each QE 122 is a set of random sizes of noise at a set of random locations in the QE 122 whereby decryption of the QE 122 would produce corrupted data if the set of quantum random noise is not correctly removed before dicryption/decryption. In certain embodiments, the quantity of quantum random noise added is determined by a randomly selected amount within a range of noise sizes, or as a proportion of the overall size of the protected package 104, the QuID 124, or the given QE 122.

In embodiments, the Packager system 112 creates a QCU 120 for the QuID 124 having a quantum element map (QEM) and a quantum cryptography map (QCM). The QEM includes for each QE 122 and the corresponding quantum element name for a QE 122 together with the random order and random size of that QE 122 and the set of random sizes and the set of random locations of the set of quantum random noise in that QE 122. The QCM includes the quantum random key and a nonce value and for each file of the set of original digital assets 102 a set of element names of the QEs 122 that correspond to each of the fragments of that file together with an original file name and a set of metadata for that file. In some embodiments, the QEM and the QCM are created as separate files or data objects within the QCU 120. In other embodiments, the information for mapping elements and correlating element names to file names represented by the QEM and QCM is integrated into the QCU 120 as one or more sets of manipulated strings of information that may be merged or integrated into a single data object.

In some embodiments, an element name is a File Name Length (i.e. length of the original file stem+extension) that is used to extract the original file name from the decrypted ciphertext. A file name (ex: test.txt) is a concatenation of a file stem (ex: test) and a file extension (ex: .txt). An Output File Stem is a set of random alpha-numeric characters used to name the generated ciphertext and key/metadata files for each original file being protected. The original file name is prepended to the original file data before encrypting/incrypting (and extracted after dicrypting/decrypting) to avoid including the original file name in human readable format. The ciphertext file stems generated during encryption (i.e. Output File Stem) are reflected in the QEM as the File Stem.

In various embodiments, a QCM may include one or more of the following:

Key

Nonce

File name length

Key length

Nonce length

Message length

Additional data

Ciphertext length

Output file stem

Additional data length

File decoy flag

In various embodiments, a QEM may include one or more of the following for each file in an original set of files:

File stem

File decoy flag

File noise length

File noise location

File size

Array of QE metadata, with each QE metadata containing:

QE identifier

QE order

QE noise length

QE noise location

QE decoy flag

Array of QE locations

In various embodiments the digital asset protection system 100 utilizes the quantum entropy source 106 to provide true quantum entropy randomization. In some embodiments, the quantum entropy source 106 is a software-only quantum entropy source as discussed herein with respect to FIG. 9. In other embodiments, the quantum entropy source 106 captures photons as quantum particles and translates a quantum event into a binary code that is used to create a quantum random key. In some embodiments, the quantum entropy source 106 is physically within a secure computing environment or is connected to the secure computing environment by a secure network connection. In some embodiments, the secure network connection uses transmission control protocol and a double ratchet encryption.

In some embodiments of the digital asset protection system 100, the secure computing environment and/or the secure computing nodes may be protected by biometric access protection that may be used alone or in addition to secure physical protection in accordance with the security and access protocols of the operator of a secure computing environment. In some embodiments, the biometric access protection utilizes a voice/video biometric protection scheme as an integrated multi-engine voice identification and verification solution that provides a first and/or second factor of authentication security in a simple-to-use format with minimal friction, such as described in U.S. Pat. No. 9,799,338, the disclosure of which is hereby incorporated by reference. In various embodiments, the biometric access protection can be implemented using a software development kit for mobile devices or web browsers to allow users to access voice biometrics without the need for specialized hardware. In some embodiments, biometric access protection can be provided as part of one or more different biometric engines covering both facial and voice recognition in which each biometric engine can be configured to utilize unique data for different users. Further information and description of the embodiments of a voice/video biometric is available at api.voiceit.io.

Figure 9:
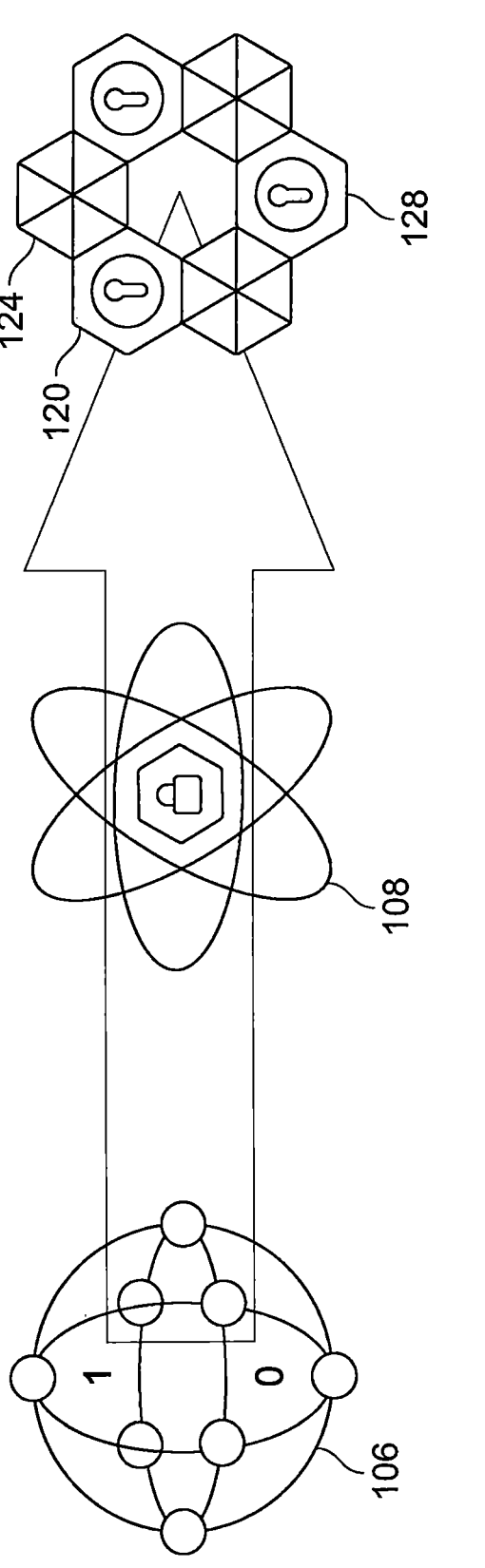
FIG. 9 is a high-level schematic diagram of an embodiment of the digital asset protection system.

FIG. 9 shows a high-level schematic diagram of an embodiment of the digital asset protection system. At this high level, the system starts with a true quantum random seed from QRNG 106 that is paired with an entropy extractor. In one embodiment, the quantum entropy source for the QRNG is a software-only quantum random seed source such as the Quantinum™ Origin Onboard seed licensed from Quantinuumn Ltd, as generally described at www.quantinuum.com/cybersecurity/quantumoriginonboard and in U.S. Pat. No. 11,256,477 and U.S. Publ. Patent Appl. No 2023/0291555, each of which is hereby incorporated by reference. The Quantum Origin software-only approach provides a randomness source that has been mathematically shown to be equivalent to a true quantum source. It provides an unparalleled level of verifiable randomness, eliminates any hardware tether, and enables embodiments of the digital asset protections system of the present disclosure to be installed on any computer system with no hardware or external reach back needed.

In another embodiment, the QRNG 106 is sourced from a quantum random generator photon card that is either directed connected to a computer system executing the Packager/unPackager system 110, or network connected to the computer system executing the Packager/unPackager system 110 over a secure network, or sent to the computer system executing the Packager/unPackager system 110 with double ratchet encryption or using a secure comms embodiment of the digital asset protection system 100 of the present disclosure. In some embodiments the quantum random seeds/key are also fed into some or all the QHC processes in a QHC stack 108. In embodiments utilizing the software-only QRNG 112 compared to a hardware tethered photon noise QRNG 112, the software-only QRNG 112 can significantly reduce latency for the packaging/unpackaging system while increasing overall efficacy. In some embodiments the QRNQ seeds are also fed into some or all the QHC processes in a QHC stack 108.

In embodiments, the digital asset protection system 100 as disclosed herein is entropy-agile, meaning that one or more active entropy source providers can be specified at compile time. In embodiments, entropy source providers can either be QRNG or pseudo random number generator. True random number generation is important in cryptography applications (specifically in the area of key generation) to avoid exposing predictable patterns to attackers. Some of the best available random number generators are QRNGs based on quantum technology. Available QRNG entropy sources include Quantis™, Quintessence Labs™, and Quantinuum®. Quantis is a PCIe hardware cards solution, Qunitessence Labs offers both a PCIe hardware cards solution and qStream™ a Entropy-as-a-Service (EAAS) web call, while Quantinuum Quantum Origin™ is a software-only solution.

In embodiments, Pseudo Random Number Generators and pseudo random entropy may be used as a fallback for QRNG failure, or for certain cases where QRNG is not strictly necessary or where potentially cheaper options are desirable. There are numerous pseudo random generators available, including several being built into modern operating systems. In embodiments, the digital asset protection system 100 as disclosed herein may leverage pseudo random generation available from the cryptography libraries discussed below:

Quantis—The Quantis dependency consists of a single static precompiled header file, in addition to a Dynamic Linked Library (DLL) or Shared Object (SO) file. More information about this QRNG is available at www.id-quantique.com/random-number-generation/products/quantis-random-number-generator/.

Quintessence Labs—The Quintessence dependency consists of static header files, as well as separate so-called "stream services" that must be installed on the system and started to allow access to random data from the PCIe hardware card. More information about this QRNG is available at www.quintessencelabs.com/news/quintessencelabs-qstream-entropy-as-a-service-eaas-solution-delivers-truly-random-numbers-for-encryption-keys.

Quantinuum—the Quantinuum dependency can be either Command Line Interface (CLI) or static header. To access entropy from the CLI, code for embodiment of system 100 must make a system call to the CLI and retrieve the process output. More information about this QRNG is available at www.quantinuum.com/cybersecurity/quantumorigin.

Figure 10:
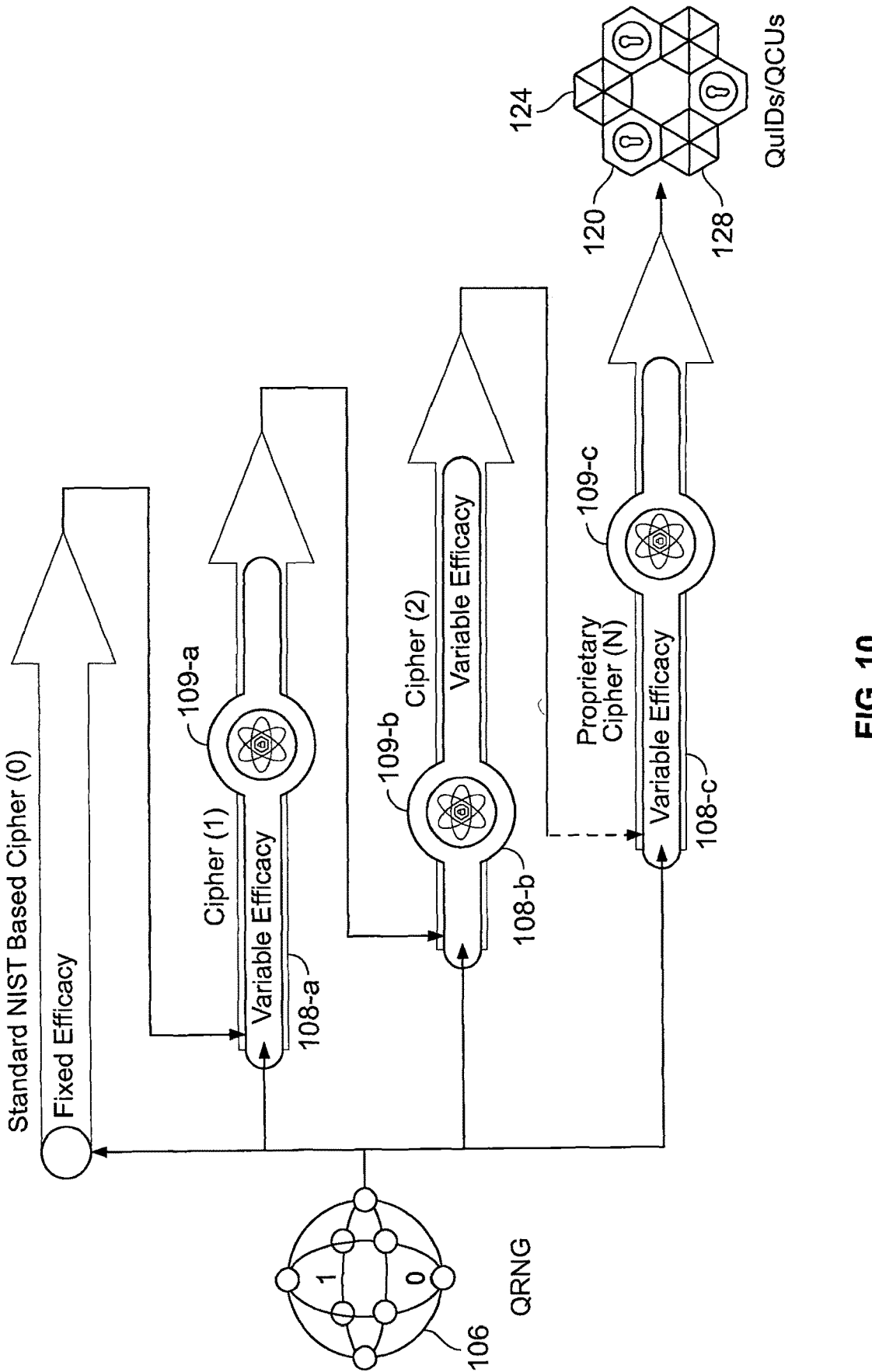
FIG. 10 is a schematic diagram of one embodiment of a Quantum Hybrid Cipher (QHC) stack in accordance with an embodiment of the digital asset protection system.

FIG. 10 shows a schematic diagram of one embodiment of a randomized stack QHCs 108 that provides cryptographic agility. In this instance of randomly ordered ciphers $cipher_0$ is shown as a standard NIST-based cipher within the QHC stack. This optional standard NIST-based cipher relies on standard algorithms in line with NIST encryption standards, such as AES. Because $cipher_0$ adheres to NIST standards, the complete QHC process meets all cryptographic compliance requirements. Unlike $cipher_0$ which has a fixed efficacy, some of the other QHC non-standard protection/obfuscation ciphers 1-N (108-*a*, 108-*b*, to 108-*c*) have a respective 'slider-bar' that controls a variable cipher efficacy (CE) from a minimum $CE_{MIN}$ to a maximum $CE_{MAX}$. This CE can be tuned to dictate the overall latency, file size, and combined security strength efficacy of an embodiment of the QHC stack 108.

In various embodiments, baseline latency testing for a given network configuration via ping tests at the Presentation Layer (OSI 6) can be utilized to identify an average latency to be used for variable CE tuning. In various embodiments, the average latency can represent a one-time measurement, a single average over a period, or a dynamic average over one or more periods. In some embodiments, an automated process included, for example, as a selectively callable routine in the Packager/unPackager system 110 can be provided for tuning each of 'slider-bars' (109-*a*, 109-*b*, and 109-*c*) from −CE to +CE. In other embodiments, a one-time or recurring process can be utilized to manually adjust the QHC non-standard protection/obfuscation ciphers 1-N 'slider-bars' (109-*a*, 109-*b*, and 109-*c*) like the way an equalizer for a sound system is balanced for a given environment and type of music, with the optimized settings then hardcoded into the code for the Packager/unPackager system 110. In some embodiments, an automatic process can be utilized to dynamically adjust the slider-bars (109-*a*, 109-*b*, and 109-*c*) to target certain selective parameters, such as a target effective k or a target latency for incryption/dicryption, or a target network bandwidth for a desired set of digital assets in a given computing environment.

In embodiments, in addition to a tunable variable CE for one or more of the QHCs 108, the total number (N) of all the QHCs 108 in a stack and an order in which some or all of the ciphers are applied is randomized to further enhance the strength and cryptographic agility of the QHC stack 108.

In embodiments, the QCU 120 and QuID 124 pairs are tightly coupled to their associated unique Packager/unPackager system 110. In various embodiments, the Packager/unPackager 110 can be installed and executed as part of the operating system kernel or as part of a boot process, as a separate application program stored in the non-volatile memory of a given computer system under control of the operating system, or as an executable program that can be periodically downloaded to and non-volatile memory and then executed by the given computer system. In embodiments, the Packager/unPackager 110 can be fingerprinted to a given computer system or computer network such that the Packager/unPackager 110 is effectively tied to a given hardware, processor or network environment. In embodiments, the Packager/unPackager 110 is a compiled binary executable code program that includes the code for each of QHC of the stack of QHCs 108 as a separably callable software routine executed in a sequence determined by a control routine. In embodiments, a random sequence of the control routine is hard-coded into a control routine in the Packager 112 and unPackager 114 system(s). In other embodiments, the random sequence is dictated by parameters and/or meta data that may be included in the QCU 120 and/or in some embodiments may be randomized based on the QRNG 106.

In embodiments, the Packager/unPackager 110 can also utilize a separate Quantum Symmetric Secret (QSS) 118. In some embodiments, the QSS 118 is produced based on the QRNG 106. The QSS 118 bears resemblance to a symmetric encryption key, yet it differs from conventional cryptographic symmetric keys by the way it is conveyed, applied and/or used by the QHCs 108 and the Packager/unPackager 110. In some embodiments, a QSS 118 is added to reduce the risk of transmitting a QCU 120 simultaneously with an associated QuID 124. If the communications are intercepted by a nefarious actor, and the reconstitution algorithm becomes known, the QuID 124 would potentially be at risk if AES encryption on the QCU is broken. Having an additional layer of security (i.e. the QSS 118) leaves the QuID 124 corrupted even if an AES encryption is broken if the QSS 118 is unknown.

Figure 11:
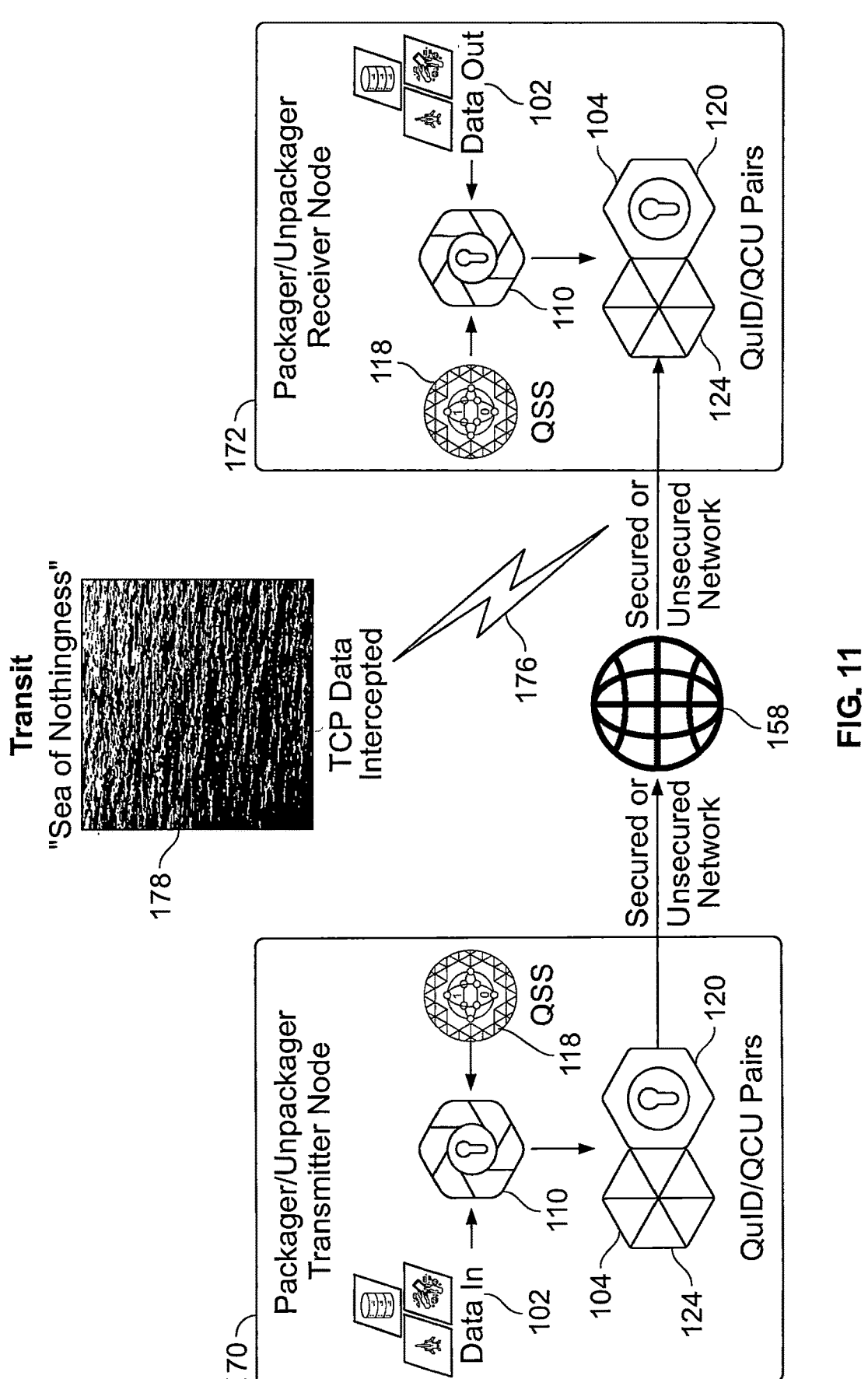
FIG. 11 is a schematic diagram of an embodiment of a Secured Transit configuration of the quantum cyber resilient digital asset protection system.

In some embodiments such as Comms 142-*a* as described in FIG. 11, the QSS is implemented by updating the Packager 112 to apply each character of QSS 118 to random locations within the QuID 124. In various embodiments, the Packager/unPackager system 110 can dynamically calculate injection locations to avoid having to store the QSS 118 in the QCU 120. The unPackager 114 can be updated to collect QSS 118 characters from the QuID 124, compare against injected QSS 118 values, and only reconstitute protected data if the extracted and injected QSS's 118 match. If the Receiver node 172 corresponding to the Transmitter node 170 that protected the intercepted data is stolen, it could potentially be used to reconstitute the data despite using a QSS 118. However, compromise of a Receiver node 172 would only affect that particular set of nodes configured with the same QSS 118, and periodic updating of the Packager/unPackager system 110 on the Receiver nodes 172 can address this potential concern.

In other embodiments, such as Vault 140 as described in FIG. 6, the QSS 118 can be used to improve overall security by directly coupling a QuID 124 to a QSS 118 injected into the QHC binary file 116 for a given unPackager system 114. In various embodiments, this may be done in a manner similar to how the QCU fingerprint ties a QCU 120 to a QHC binary file 116 for a given unPackager system 114. In various embodiments, aspects of the Packager/unPackager system 110 can be fingerprinted to be executed only on a given target computer or node using system license keys, token keys or machine IDs, and/or system IDs injected into the executable binaries. Examples of fingerprinting techniques as used in the field of computers, see en.wikipedia.org/wiki/Fingerprint_(computing), which is hereby incorporated by reference.

Figure 8:
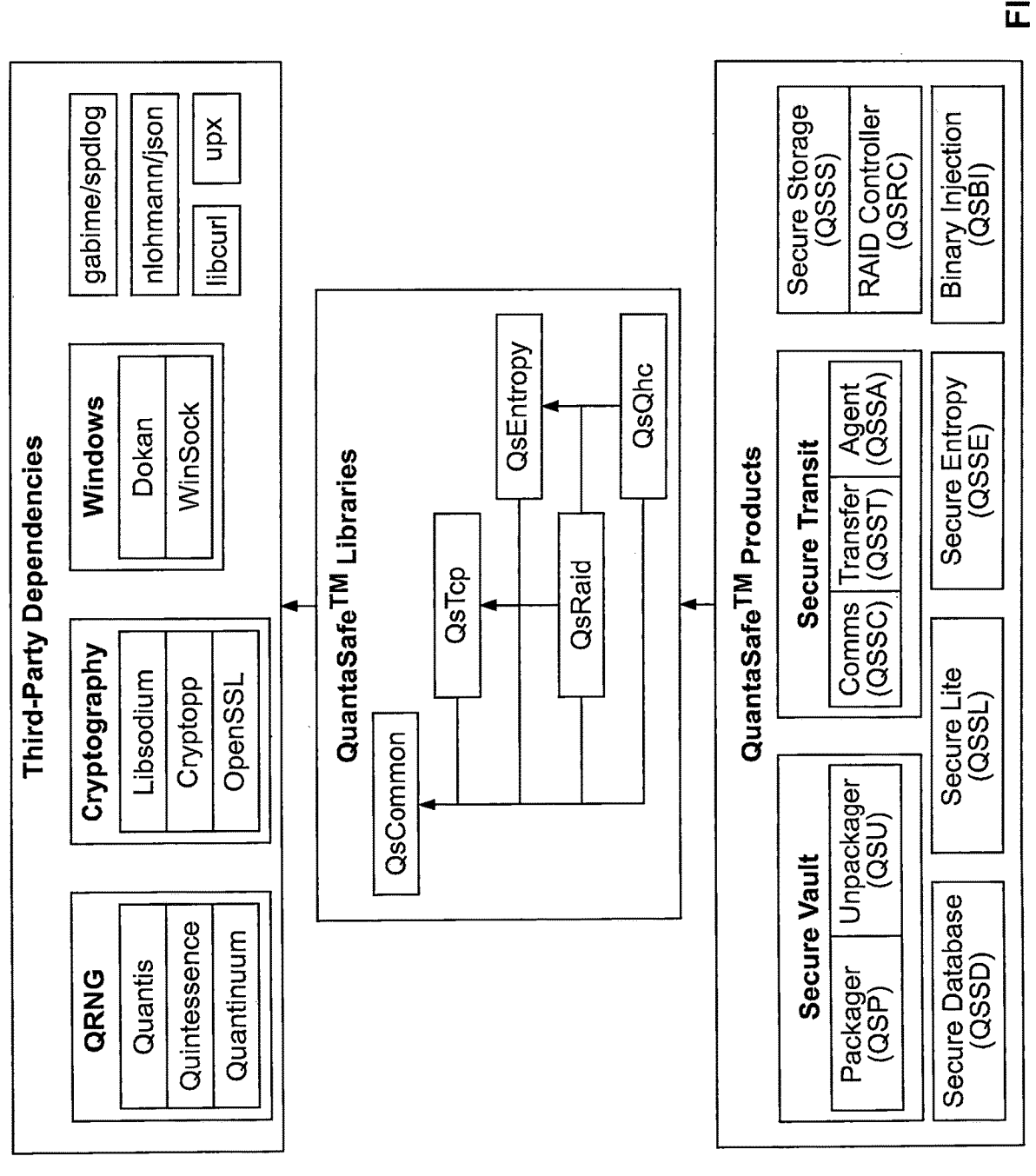
FIG. 8 is a dependency diagram of an embodiment of the digital asset protection system.

FIG. 8 is a dependency diagram of an embodiment of the digital asset protection system 100 as disclosed herein. In various embodiments, the code for the digital asset protection system is developed to have minimal third-party dependencies as security of code produced by third parties is more difficult to analyze and guarantee security compared to custom code, and custom code provides more complete control over design and implementation details, allowing for more precise control of features and capabilities. Even so, there may still several third-party dependencies such as those facilitating QRNG hardware/software interfacing, standard cryptographic capabilities, Windows-specific services such as WinSock TCP, and miscellaneous others for C++ logging, JSON, HTTP, and code packing support which may be useful to integrate.

In embodiments, some third-party software dependencies (e.g., Quantis, Libcurl) have dynamic linking requirements, which means that even if a particular library is not in use due to configuration variations, the dynamic linking must still take place during program initialization. Dynamic linking is one reason for requiring certain dependencies to be specified at compile time instead of run time. Another benefit of compile-time dependency specification is that only code actually in use is included in the compiled binary, which reduces the overall attack surface area.

In various embodiments, these dependencies provide Application Programming Interfaces (APIs) for access to standard encryption/decryption capabilities, as well as hashing, key derivation, and pseudo random number generation, among other things. In various embodiments, system 100 is crypto-agile, meaning that the active cryptography source provider can be specified at compile time.

Libsodium—Libsodium provides a static header and excellent documentation for relatively easy implementation and use. However, it is not currently FIPS140 compliant, so alternative cryptography source providers have also been implemented.

Cryptopp—Alternative to Libsodium, providing additional alternative encryption methods. This library is also currently not FIPS140 compliant.

OpenSSL—FIPS140-compliant library providing necessary cryptography capabilities described in the introduction to this section.

Windows Dependencies—Some capabilities such as TCP socket communications and pseudo random number generation depend on dynamic libraries available in the Windows operating system. These capabilities are available by default in Unix operating systems.

Dokan—This dependency is a Windows driver application facilitating mounting/unmounting a drive as a RAM filesystem (RAMFS). In embodiments, RAMFS is used to contain sensitive information that is cleared automatically or manually without residue remaining anywhere in non-volatile memory.

WinSock—Enables use of Windows TCP socket capabilities necessary for embodiment of system 100 internode and external stream service communications.

In various embodiments, certain Miscellaneous Dependencies may be utilized in the digital asset protection system 100 as disclosed herein:

Logging—The gabime/spdlog library is a static library providing basic C++ logging capabilities. In embodiments, system 100 provides logging to terminal and file, with different logging levels specific to the type of binary being generated (Debug or Release).

JSON—The nlohmann/json library is a static library providing basic C++ JSON capabilities. JSON format is used in embodiment of system 100 for configuration data, data objects in memory, and for data written to non-volatile memory.

Libcurl—This is a dynamically linked HTTP library that is specified for inclusion in the build at compile time. HTTP requests are used in embodiments of system 100 to facilitate requests to a licensing server.

In various embodiments, certain custom libraries may be utilized in the digital asset protection system 100 as disclosed herein. In various embodiments, common code is placed in reusable functions, classes, and libraries at the highest level. These libraries are designed to operate in an independent manner and provide necessary flexibility of use via configuration.

QsCommon—Static library containing all common/shared code used throughout the entirety of the core code of embodiment of system 100. This library houses numerous utility and data object classes with logic divided along functional capabilities.

QsTcp—Static library containing all TCP-related capabilities, including all multi-socket, bridging, and double ratchet capabilities. This library is used throughout the core code wherever network communications are required, including Vault QCU+retrieval from PSS, Storage distribution and retrieval, and Transit transmit and receive.

QsEntropy—Static library containing all entropy-related capabilities. In various embodiments, entropy retrieval can be performed from a local or remote source, so the entropy logic must be housed within this dedicated library that can then include QsTcp capability. In contrast, the cryptography capability is encapsulated within classes located in the QsCommon library.

QsQhc—Static library containing all Quantum Hybrid Cipher (QHC) capabilities. This library depends on entropy and cryptography capabilities, and indirectly on TCP if remote entropy source is in use. In embodiments, the Quantum Element (QE) and cipher stack logic used for packaging/unpackaging is located in this library.

QsRaid—Static library used only by the Storage product to manage RAID10 capabilities regarding stripe/mirror calculations, and distribution/retrieval of data to/from the Storage network of RAID nodes.

QuantaSafe™ Products—This code is implemented as CMake projects that depend on the static libraries and third-party dependencies, either directly or indirectly based on use case. For example, HTTP requests and/or JSON formatting are sometimes used directly within the CMake projects.

Vault

Referring now to FIG. 6, embodiments of the Vault configuration 140 are described. Unlike current encryption techniques that might use such a quantum random key for a known quantum-resistant encryption algorithm, embodiments of the present disclosure integrate variable and multifaceted incryption protocols in building a protected package 104 for the set of digital assets 102 such that there can be no reassembly of the QuIDs (e.g., QuIDs 124 or QCU/QuID stack 128) without the corresponding QCUs (e.g., QCU 120 or QCU/QuID stack 128).

In some embodiments, Vault 140 is configured to create, store, and distributed the digital assets 102 to each computing node of a target computing environment. In some embodiments, the Vault 140 runs as an executable set of files on the secure computing node(s). In other embodiments, Vault 140 is integrated into a BIOS of the secure computing node(s). In some embodiments, Vault 140 runs on an embedded computer system 160 with the digital assets 102 for each computing node protected as incrypted data in individual QuIDs 124 for a given computer node 164, 166.

In some embodiments, the separation between the QCU 120 and QuID 124 is further augmented by using an unPackager Stub App 117 that is configured to request an upload of a QHC binary 116 for a given order and selection of QHC ciphers in the QHC stack. In some of these embodiments, the QHC binary 116 is combined with the QCU 120 by a string merge operation to form a QCU+ 128 that contains both. In some embodiments (not shown in FIG. 4), the QHC binary 116 is separately transferred to and stored in the target computer systems 160 such that only the QCUs 120 are distributed to the main processors 164 and secondary processor 166 in the embedded computer system 160. In other embodiments, the target computer systems 160 may be servers/nodes on a networked computer system.

In embodiments, the unPackager system 114 for the primary microcontroller/secondary microcontrollers construct utilizes techniques in which a unique QuID 124 is unpackaged and distributed to each microcontroller device. For example, QuIDs 124 are unpackaged and installed as boot images in volatile memory in microcontrollers. In some embodiments, the unPackager system 114 has an embedded QEM/QCM as a fingerprint to link the unPackager 114 and the given microcontroller to the respective QuID files 124 protecting the original set of files as a boot image for that microcontroller. In some embodiments, the embedding of a fingerprint from the QCU 120 inside of the unPackager system 120 to coordinate distribution of protected packages individually to each of the nodes allows each node to be hot swappable capable. In some embodiments, this is facilitated by having a QCU 120 in the same non-volatile memory device as the QuID 124. In some embodiments, the unPackager system 124 is embedded in microcode.

In some embodiments of an embedded system, a post-boot shuffle may be provided that includes shuffling order, update element names in the QEMs and update all fields in the QCMs that are used to correlate element names to original file names. In some embodiments, the shuffle is a dynamic randomization shuffle. In some embodiments, the set of original file names are directly related to the element identifiers. In other embodiments, the set of original files 102 are indirectly related to corresponding ciphertext and corresponding QCMs. In some embodiments, a correlation of the set of original, file names is indirectly linked to/built based on key pairs of a file stem value and multi-step linking with other fields in the corresponding QCM.

Figure 7A:
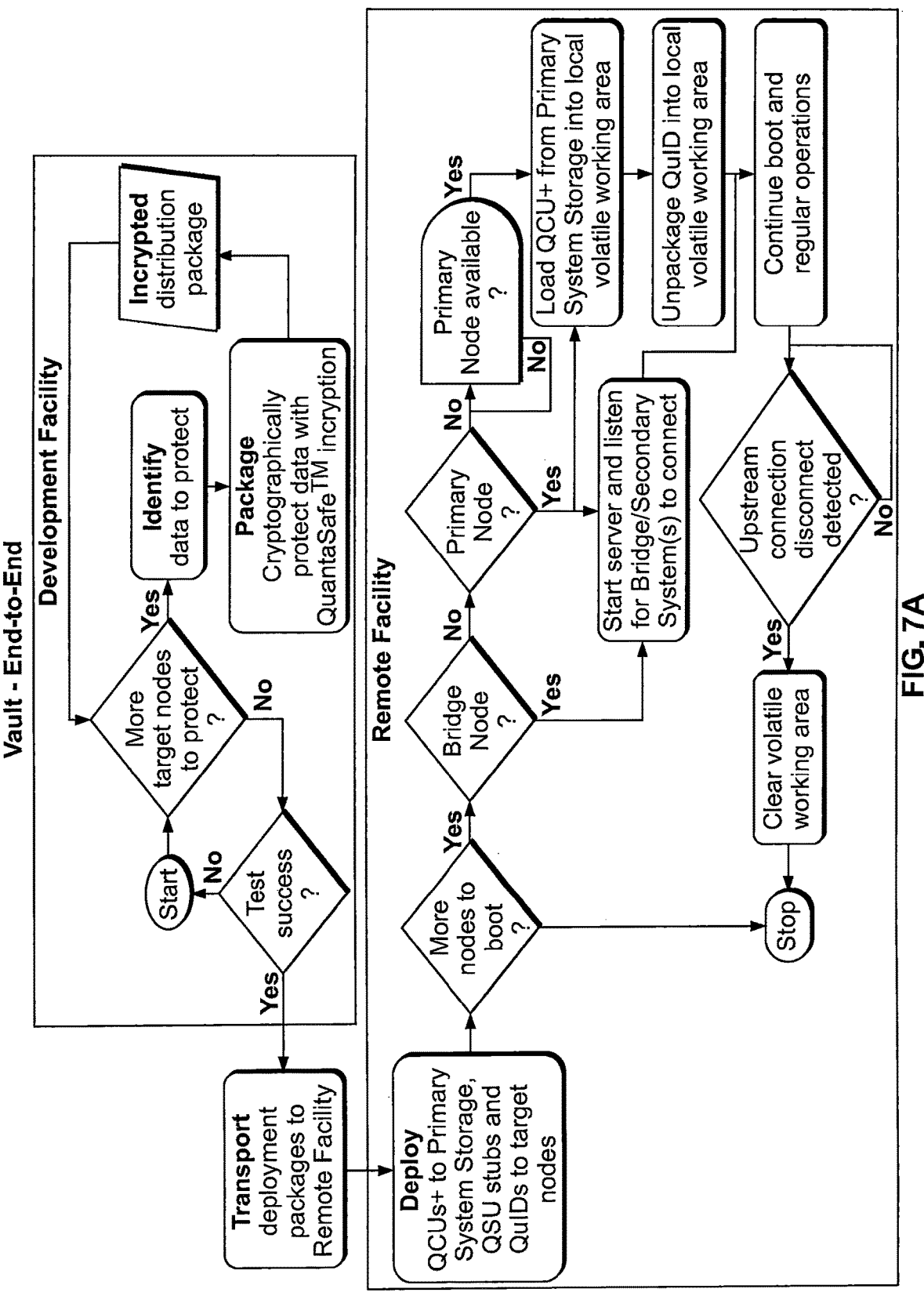
FIG. 7A is a process flow diagram of an embodiment of the configuration manager for the Vault embodiment shown in FIG. 6.

Referring now to the flowchart of FIG. 7A, an embodiment of the end-to-end process of the Vault configuration 140 will be described. In this embodiment, the secured computing facility 150 is a development facility where sensitive data identification and protection takes place. Sensitive information must be identified for each node in the target system 160, and a distribution package is subsequently generated for each target node.

In Vault, packaging is accomplished standalone or as additional steps in a traditional build process. Once configured, the packager binary can be called to transform input data into the protected package. The result of the Packager is one or more distribution packages depending on the use case. One distribution package is generated for each node in the target system. Generated files can be managed by external scripting as needed to prepare for deployment.

In embodiments, before placing distribution package(s) on portable secure storage device(s) for transport to the target computing system, testing should be performed at the Development Facility on a replica of the actual remote system 160 to ensure proper functionality.

In embodiments, a Primary System Storage (PSS) 154 can be either a secure removable storage device, or a Storage network. In these embodiments, the QSS 118 is transported to the remote facility, so in preparation for doing so the data must be placed on a secure storage device (could be the same device actually used at the remote facility if not using Storage). PSS is secured by way of password protection or other type of authentication mechanism (CAC card, biometrics, etc.)

In embodiments, the PSS 154 may be physically transported to a remote site and placed in secure storage (physical vault) in accordance with the security, access and/or secrecy protocols and standards of the user or entity operating the target computing system.

In embodiments, a protected package is placed on a portable storage device that can subsequently be used at the remote facility to deploy to the target device. In the Embedded Mode, for Existing Hardware (Firmware Update) protected data is placed on a portable secure storage device that can subsequently be used at the remote facility to deploy to the target device. For New Hardware, protected data is placed on disk images that are installed (EPROM'd) on the embedded device(s). These digital assets can subsequently be used at the remote facility to deploy to the target device.

In embodiments, after testing the development facility has a set of one or more distribution devices ready for transfer to the target node(s) at the remote facility. The devices, consisting of a secure PSS device, along with one or more target node devices must be physically transported to the remote facility. Confidentiality of the PSS device must be maintained to ensure security of the protected data on the target node devices. The PSS device must be stored in appropriate secure storage such as a vault or similar upon arrival at the remote facility.

In embodiments, deployment at a Remote Facility having the target computing system can be accomplished in various ways. As used in the context of Vault, the term "deployed" is equivalent to "transferred from a portable transport device to the target device". In some embodiments, for a Primary node the PSS is kept in a secure physical vault at the Remote Facility. Before each use of the Primary node, the PSS must be removed from a vault or secure location and physically installed into the Primary node. If any sensitive data was protected for use on the Primary node, the protected data must be deployed to the Primary node. For a Secondary node, the deployment will differ depending upon the device and process being performed:

Regular Device—Protected data is deployed to the target device.

Embedded Device

Existing Hardware (Firmware Update)—A firmware update is performed to deploy the protected data to the target device.

New Hardware—Same steps as for Existing Hardware, but the steps can be performed either at the Development Facility, or the Remote Facility if desired/necessary In embodiments, an unPackager operation follows a similar but reversed process. After successful User authentication, the protected package must be unpackaged into original file format to enable access to the sensitive information. To ensure system security, the sensitive information is only ever placed in volatile memory.

Primary node
    Single Node—Unpackager binary retrieves QCU from local PSS and unpackages protected data into volatile memory.
    Multi Node—Unpackager binary starts a TCP server and listens for connections from dependent nodes.
Secondary node
    Secondary node(s) wait for the primary system to become available. Once the Primary node is available, the Secondary node(s) are then able to retrieve their QCU(s) from remote PSS and unpackage protected data into volatile memory.
In some embodiments, Vault can be configured to perform a Post-Boot Shuffle. After a successful boot of a computing node, if configured to perform post-boot shuffle, the local QCU and QuID data is shuffled and the updated QCU is pushed to PSS, thereby invalidating stale copies of the QCU and QuID.

Embodiments as disclosed support both flat and hierarchical network architectures with one Primary node and 0-n Secondary nodes.
    Flat—A flat network is one where every node can communicate directly with every other node.
    Hierarchical—In a hierarchical network, in addition to Primary and Secondary nodes, there is also a third type of node called a Bridge node that forwards TCP message packets to the next node(s) in the hierarchy. For example, if a Secondary node needs to communicate with the Primary node, it sends a message to the closest upstream node; if this node is not the Primary node the message is forwarded to the closest upstream node until the Primary node is reached. If the Primary node must communicate with a Secondary node, the Bridge node(s) forward the message to the next downstream node until the Secondary node with system ID matching that of the message is found.
In some embodiments, a long-running connection to the upstream is maintained after successful unpackaging on all Secondary nodes. If upstream connection is lost and timeout threshold is enabled and reached, the volatile working area is automatically unmounted.

In various embodiments, features of Vault are provided to address potential Hardware Failure of one or more of the computing nodes.
    Primary node—The QCU in PSS houses all Primary and Secondary node QCUs. If it is destroyed or becomes unusable in some way, all Primary and Secondary nodes must be re-deployed. For the Primary node, this would first require transport of a new PSS device from Development to Remote Facility.
    Secondary nodes must also be re-deployed, as their QCU data was located on the PSS device. Transport and re-deploy new deployment packages for all Secondary nodes.
    Secondary/Bridge nodes—Transport and re-deploy Secondary node distribution package. Protected data is deployed to the target device, and the associated QCU is deployed to the secure PSS device.

Figure 7B:
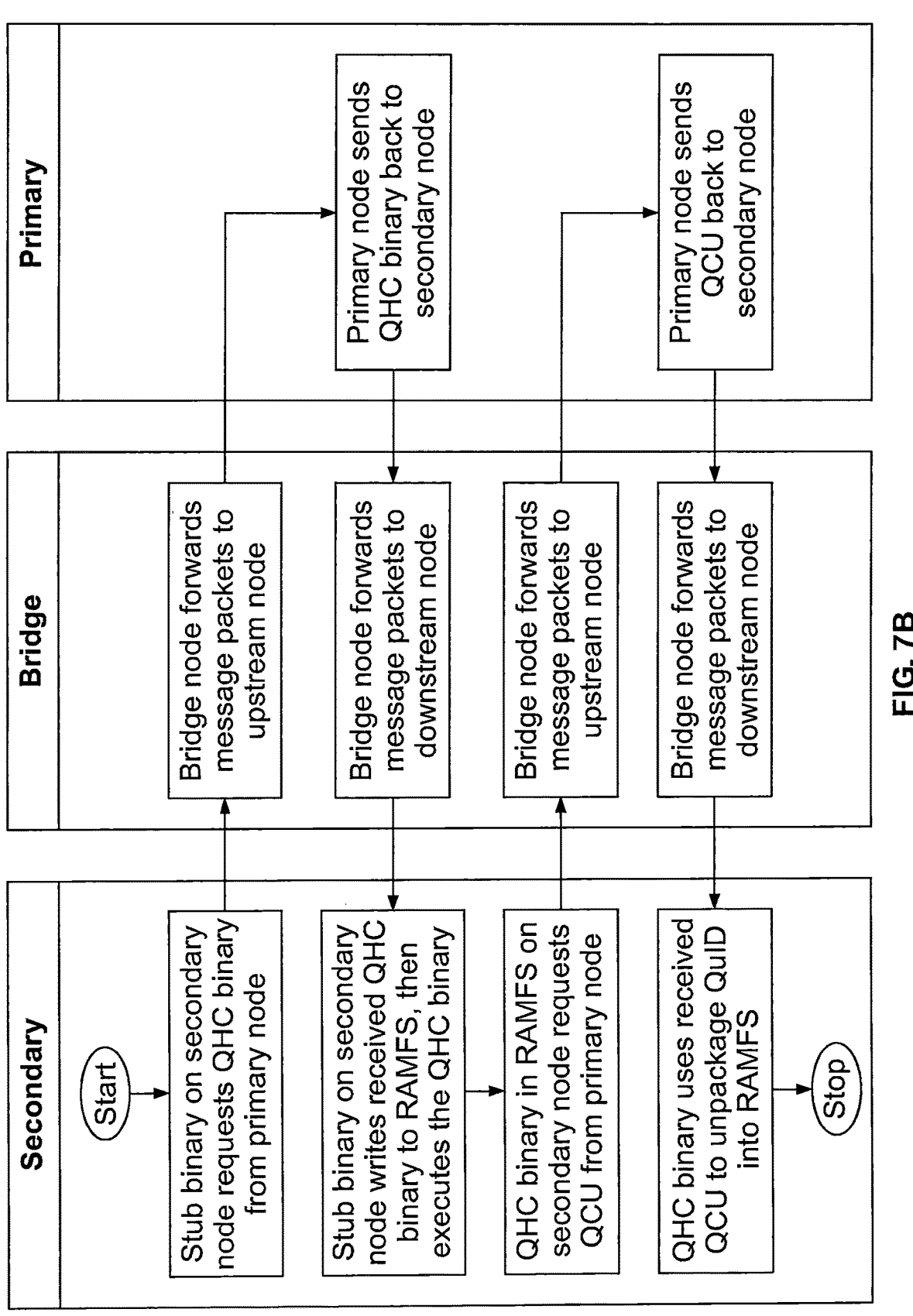
FIG. 7B is a flow diagram of an embodiment of TCP communications for the Vault embodiment shown in FIG. 6.

FIG. 7B shows a flow diagram of an embodiment of a TCP communication among Primary Nodes which generate/distribute protected packages, Bridging Nodes which convey or transfer but do not access a protected package, and Secondary Nodes which receive and utilize protected packages. In some embodiments, TCP/double ratchet encryption is used to transmit the QCU 120 from the primary node that has the RSD that stores the QCU 120 to the corresponding secondary node for that QCU. A description of how these kinds of encryptions operate can found at Perron, et al., "The Double Ratchet Algorithm," (Nov. 20, 2016), available at signal.org/docs/specifications/doubleratchet/doubleratchet.pdf, and "Transmission Control Protocol," available at en.wikipedia.org/wiki/Transmission_Control_Protocol, each of which is incorporated herein by reference.

Development Facility
    The development facility is where sensitive data identification and protection takes place. Sensitive information must be identified for each node in the target system, and a distribution package is subsequently generated for each target node.

Figure 7C:
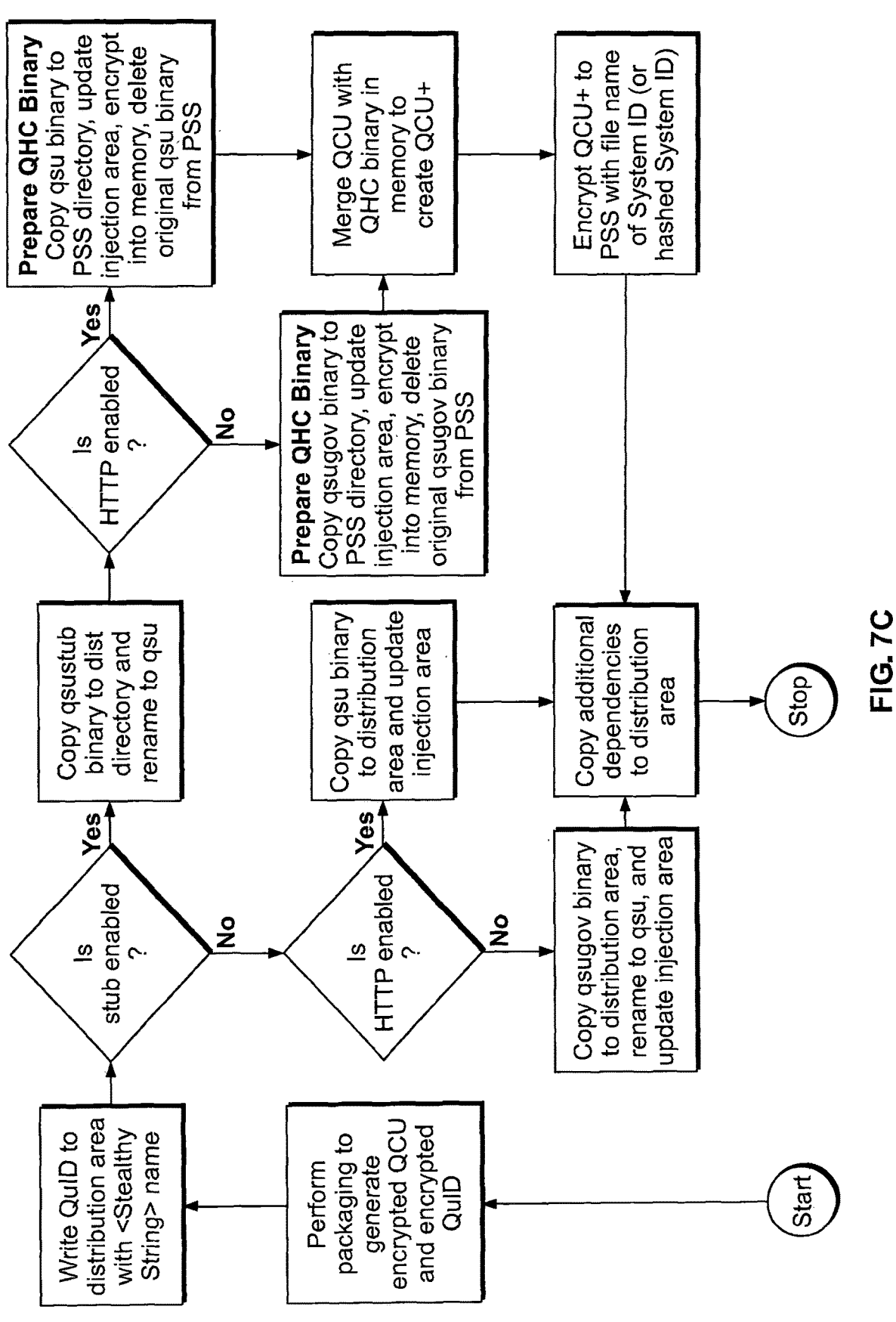
FIG. 7C is a flow diagram of an embodiment of a Packager for the Vault embodiment shown in FIG. 6.

FIG. 7C shows a flow diagram of an embodiment of a Packager for the Vault embodiment. Vault protects data by creating a distribution package that is later deployed to a secondary node. When creating this distribution, the Packager is run on a development machine that can access the digital assets to be protected. FIG. 7C shows the process flow for creating this distribution package.

The packaging process is controlled by a configuration manager that provides an easy way for the user to control how the Vault system will be configured. Several of the options are:
    Target OS/Architecture: This information is used so that the correct form of the Unpackager binary is included in the distribution.
    Use Stub: If the Use Stub option is true, two Unpackager binaries will be included in the distribution. The first binary is a stub application that will be deployed on the secondary node and does not contain any code for processing QHCs. The QHC logic is fully contained in the second binary that will be deployed to the PSS and transmitted to the secondary node when unpackaging occurs.
    Use HTTP: This option indicates whether secondary nodes have a communication link to the internet. For some clients, the secondary nodes exist in an air gapped system and do not have connectivity beyond direct links to the local network.
The initial Packaging step is to use a QRNG to randomly create a QHC stack that processes the original data object(s) to be protected. After the data has been incrypted by the QHC stack, the resulting set of QEs is bundled together, encrypted, and stored in the distribution area with a Stealthy String name that obfuscates the file type. In addition, the QCU is also encrypted at this point.

If the Stub option is enabled, a stub version of the Unpackager application for the correct OS and architecture is copied to the distribution area. This binary is renamed to simply qsu and then injected with a QCU fingerprint so that an integrity check can be performed at the time of Unpackaging to make sure that an attacker is not using an invalid binary for the target data assets. This injection area is protected by adding a checksum value that is also validated when the binary is executed.

The second binary in the Stub case is a version of Unpackager that includes functionality for QHCs. This binary is then injected with a fingerprint and checksum value and then encrypted. Next, Packager will combine the resulting encrypted binary with the encrypted QCU into a single file using the Blended Strings functionality. This file is again encrypted and written into a PSS location inside the distribution area, using the System ID as the file name. When the distribution is deployed to the target secondary node, the contents of this directory will instead be moved to the PSS location on the primary node. At runtime, the primary node will be responsible for decrypting, unblending, and decrypting the QCU and binary files to respond to requests from the secondary nodes.

If the Stub option is not enabled, the process is simplified because the full qsu binary can be added to the distribution area and deployed directly to the secondary node. In this case, the binary injection of the QCU fingerprint and checksum still occurs, but the resulting binary is not encrypted. To simplify the processing on the primary node; the encrypted QCU is still blended with an empty string, encrypted and named after the System ID.

In both the Stub and non-Stub options, separate binaries are available that do not include the dependencies for making external HTTP requests. Without these libraries being added, these alternative binaries are smaller. Because this option is often useful for government clients, the source binary is named qsugov, although it is always renamed to qsu before being added to a distribution. Note that the injection, encryption, and Blended Strings processing steps are identical to what occurs in the HTTP-enabled case.

The last step that Packager completes when building a distribution is to include additional dependencies that may need to be included. This may include assets such as dynamically linked library files, shared object files, executable files, driver files, or certificates. In some cases, these dependencies are conditional, based on the packaging options. For example, when HTTP is enabled, an OS-specific runtime library is included in the distribution area. In addition, when the target secondary node is configured for a Windows system, a set of dependencies are included that are needed to enable Vault to use a volatile memory for reading and writing data assets.

In some embodiments, the QCU 120 is stored a removable storage device (RSD) that is the only store for the QCU 120. In embodiments, the primary node can access the QCU 120 in the RSD and create a unique hash token for sending the QCU 120 to boot the QuID 124 based on the decrypted original set of files for that particular secondary node on the secondary node in response to a request from the secondary node.

The Vault product protects data at cold rest. Physical separation is maintained between protected data and the QCU required to unlock it. Without a QCU the protected data is rendered useless and impervious to brute force attacks, even from quantum computers. QCUs are retrieved from a Primary node by a Secondary node at runtime and used to reconstitute protected data into volatile memory. Bridging capability is also available to support hierarchical networks. The Vault can be used in any system composed of two or more nodes and is ideally suited for embedded systems where data residing on microcontrollers or other embedded devices must be protected in the field. Any environment where there is concern of attackers taking physical possession of a device housing sensitive data can benefit from pre-emptively securing vulnerable devices with the Vault.

Technical Summary

Consists of one Primary node, and zero (0) or more Secondary node(s). Each Secondary node contains a QuID and a QSU binary with associated dependencies. Each secondary node calls the QSU binary on boot. The binary retrieves the QCU from the Primary node's PSS and reconstitutes the QuID with reconstituted data residing in memory (RAMFS). The system can also be configured to shuffle the protected data and generate a new QCU after each boot, which prevents replay attacks. Communication between all primary, bridge and secondary nodes are protected using a double ratchet algorithm to encrypt all messages.

Key Features

Data Protection in cold storage

Physical separation between QuID (set of lock) and QCU (locked key ring)

Binary Injection

Accomplished via overlay area attached to end of binaries by build scripts.

Packager/Unpackager

Unpackager is injected with the following items by Packager:

SYSTEM_TYPE: Locks Unpackager binary into running as either Primary, Secondary, or Bridge node to prevent attacker from attempting to circumvent Secondary node QuID/QCU physical separation requirements by running as standalone Primary node FINGERPRINT_QCU: Used to guarantee that a particular Unpackager binary can only be used to unpackage the associated QuID/QCU; thus even if an attacker gains access to an Unpackager binary, it cannot be used to reconstitute protected data unless the attacker has gained access to the specific Unpackager binary associated with the compromised QuID/QCU AUTO_RAMFS_CLEANUP: If true, Secondary and Bridge nodes will continuously monitor connection to upstream for interruption. Upon interruption, auto-reconnect will be attempted until specified delay timeout is reached, after which RAMFS area will be cleaned up and Unpackager process terminated AUTO_RAMFS_CLEANUP_DELAY: Amount of time in milliseconds to delay cleaning up the RAMFS area; auto reconnect to upstream is attempted until delay is reached Obfuscation Configuration and QCU attribute keys are defined as arbitrary strings: attr-#

Binary sensitive strings are defined as hexadecimal char vectors

QCU values are encoded to base64

Sea of Nothing

All Quantum Element identifiers are randomly generated alphanumeric characters of predefined length Directory names within the PSS directory are 64 byte hashed System IDs The System ID is a 32 byte string (used as the hashing message), the QCU fingerprint (length can vary) is used as the hashing key, and the resulting hashed string is 64 bytes QCU file name is the same as the parent PSS directory name: hashed System ID Validation System Type Unpackager binary is injected with User-selected System Type (i.e. Primary, Secondary, or Bridge).

Unpackager terminates if the injected System Type does not match the System Type as determined based on configured ip/port. This prevents a Secondary node from being configured as a standalone Primary node in an attempt to circumvent the Secondary node QuID/QCU physical separation requirements.

QCU Fingerprint

QCU Fingerprint is unique to a given QCU

QCU Fingerprint is designed so that QuID/QCU Shuffle does not change the fingerprint Unpackager binary is injected with a QCU Fingerprint calculated from the QCU produced by Packager when protecting data Unpackager terminates if the injected QCU Fingerprint does not match the fingerprint of the QCU retrieved from PSS (this ensures a different, perhaps compromised, binary is not being used to reconstitute protected data)

Security Analysis

Before executing the unpackaging logic, the Unpackager first checks if the fingerprint calculated from the QCU matches that which was injected into the Unpackager at packaging time. If a mismatch is detected, the Unpackager process exits and does not unpackage the data. This prevents an attacker from attempting to unpackage a QuID using a Unpackager binary and/or QCU that was not originally packaged with the QuID.

QuID/QCU Shuffle

QuID/QCU Shuffle prevents replay attacks by guaranteeing that QuID and QCU data are scrambled after each successful execution of Unpackager Unpackager Stub The Unpackager Stub application is stored on secondary nodes, and does not contain any sensitive information about the incryption process The QHC binary application is stored in PSS and contains sensitive code to incrypt and dicrypt packages. When data must be unpackaged on the secondary node, the Stub application makes a request to the Primary node to retrieve this executable file.

QHC Binary Encryption

The QHC binary (the one with the "secret sauce") is encrypted by Packager and unencrypted by the Unpackager Stub prior to execution.

Auto-Cleanup

On Secondary nodes (including Bridge nodes), if Unpackager stub connection to Primary node is lost, reconstituted data (if any) is automatically removed and the RAMFS area is unmounted User can specify length of timeout before RAMFS working area is sanitized Versatile Packager Any file type can be protected Any file size can be processed Directories and nested directory structures are supported Versatile Unpackager Unpackager can run in single node (i.e. Primary without TCP connections) or multiple node configuration, and can function either with or without protection.

A single node Primary is useful for situations where the QCU is stored on a removable Key flash drive, and protected data resides on only one other device (standalone devices start TCP services; no associated Secondary or Bridge nodes)

A node with protection enabled will attempt to reconstitute protected data

Primary

Head of the snake; without this node running none of the Secondary or Bridge nodes can retrieve QCUs to reconstitute protected data Typically runs without incryption/dicryption enabled Secondary Must run with incryption/dicryption enabled (otherwise would not serve any purpose)

QCU is retrieved from secure storage area (PSS) via Primary node and used to reconstitute protected data into RAMFS working area Bridge Used in situations where direct connectivity to the Primary node is not possible from a Secondary node TCP message forwarding is used to pass message packets up/down the connection chain Typically runs without incryption/dicryption enabled Transit FIG. 11 is a schematic diagram of an embodiment of a Secured Comms mode 142-*a* of a Transit configuration 142 embodiment of the digital asset protection system 100 to provide quantum cyber resilience to a communication over an unsecured network 158. This diagram illustrates a simplified single data transaction using an embodiment of the digital asset protection technology to provide cyber resilience to hackers utilizing dark web tools and/or AI enabled CRQC to attempt to gain access to captured data during its transmission across unsecured/secured networks 158. Adversaries are going to capture data in transit over unsecured/secured networks, but the embodiments as disclosed herein effectively render useless any such captured data.

In embodiments, a Packager/unPackager system 110 takes in digital assets 102 that is to be protected and creates a unique QCU 120/QuID 124 pair as a quantum incrypted package 104 that is safe to be sent from a transmit node 170 over an unsecure/secured network 158 to a receive node 172 that is also equipped with a Packager/unPackager system 110. Once a quantum incrypted package 104 is received by the receive node, the Packager/unPackager system 110 uses the QCU 120 included in the package 104 and a local QSS 118 to de-incrypt the QuID 124. The QuID 124 is then reconstituted into the original data form 102 on the receive node 172. In some embodiments, the Packager/unPackager system 110, QCU 120 and QuId 124 are only stored and executed in volatile memory as a further cybersecurity protection. When the quantum incrypted package 102 is intercepted at some point 176 in transmission over the unsecured/secured network 158, both the QCU 120 and QuID 124 will appear as noise 178 to the hacker—effectively a "sea of nothingness." Furthermore, no tools or knowledge available on the dark web, or even AI enabled CRQC's can aid hackers in deciphering or unlocking either the QCU 120 or QuID 124 in quantum incrypted packages 104. The incryption produced by the various embodiments disclosed herein effectively leaves hackers with no idea of a starting point from which to begin hacking.

In embodiments of the digital asset protection system 100 referred to as Comms, a transmitter node protects data then sends it to a receiver where the protected data is converted back into original format. In these embodiments, Comms leverages core data protection capabilities to prevent an attacker from gaining any useful information by intercepting communication messages. Protected data if intercepted will appear to be noise, and even if collected would be impervious to brute force attacks. This capability is suitable for environments where sensitive data must be transmitted over communication channels that may be insecure.

In various embodiments, the digital asset protection system 100 utilizes a Packager binary, Unpackager binary, and generated QuID and QCU. To achieve secure communication, in an embodiment of Comms the Packager binary is run on a distributor node to protect a communication message, then the generated QuID (in encrypted tar archive/tape archive format) and QCU (in encrypted format) are sent to a receiver node via double ratchet TCP where Unpackager is run to reconstitute the secure message contents.

In various embodiments, Comms supports the following data input/output types:

Filesystem: Unprotected data is read in from transmitter filesystem and written out to receiver filesystem.

Standard Input/Output: Unprotected data is read in from transmitter terminal and written out to receiver terminal.

In various embodiments, Comms can operate in modes of BOTH, RECEIVE, or TRANSMIT, supporting the following directional capabilities:

Unidirectional: Data is Packaged on a transmitter and sent to a receiver where it is Unpackaged.

Bidirectional: A receiver also acts as a transmitter and sends packaged data back to the original transmitter.

Linked: A receiver also acts as a transmitter and sends data to a receiver other than the original transmitter (similar to the TCP message forwarding already implemented in the Communication library for the Vault Bridge no capability).

In various embodiments, each of the above communication types can be operated in either DISCRETE or STREAMING communication mode:

Discrete: A finite packet of data is packaged, transmitted, then unpackaged; both Packager and Unpackager processes exit at processing conclusion.

Streaming: A stream of data packets is packaged, transmitted, then unpackaged continuously as data is read from the stream; both Packager and Unpackager remain running until the communication stream is terminated.

In various embodiments, Use Case Examples for Comms can include:

A sensor device can periodically send collected information back to a controller over unsecured communication channels using Comms. This method will allow the data to be reconstituted by the receiver but is protected against attackers that may be intercepting data from the intermediate channel.

Streamed data such as audio can be exchanged between two entities in a secure way. Because separate channels are used for sending and receiving, full duplex communication is also possible.

In some embodiments, Comms 142-a also supports transmitting executable commands and having them executed on a target device. This capability could be used in environments where remote controls must be transmitted to target devices over communication channels that may be insecure. In embodiments, the QuID 124 and QCU 120 are transmitted to a target device as needed (and over separate ratchets) to execute specific task(s) on the target device (e.g., transmit QuID of an executable to a target device, unpackage on the target device, then execute the binary). In embodiments, the QuID 124, QCU 120, and unpackaged data may be removed from volatile memory (ramfs) upon successful completion of task so that dicrypted data is never on the target device outside of the time needed to perform the task. Benefits of this executable embodiment include:

Dicrypted data is only on the target device for the duration of time needed to execute command(s).

A user can execute any command on any binary on any target device at any time while the device is running (assuming there is network connectivity to the device).

Dynamic execution can be combined with any of the other three embodiments to provide additional capability.

In various embodiments, Use Case Examples for Comms can include:

A sensor node, such as video feed can be sent a remote command to change the parameters of operation (e.g. change direction).

Securely distribute software updates to a set of target nodes.

Software/firmware Anti-Tamper: install executable software only when needed to operate the device.

Remotely control vehicles and other hardware, while keeping the binary and resources needed to perform the remote operations safe in the event of target device theft.

In embodiments, Transit 142 supports different modes for communications (Comms 142-a), data transfer (Transfer 142-b), and remote control of target device(s) (Agent 142-c). All variants implement the same underlying design described with respect to FIG. 12, with slight differences in configuration.

In embodiments, all Transit nodes can operate as a Transmitter 402, a Receiver 404, or a Transceiver 402/404 which allows for concurrent bi-directional transmissions.

In embodiments, Transmitter 402 uses embodiments of the incryption processes for quantum cyber resilient digital asset protection with double-ratchet cryptography to protect data being transmitted. The output of incryption processes for quantum cyber resilient digital asset protection is a QCU 120/QuID 124 pair, which is equivalent to a locked key ring/set of locks. Because both QCU 120/QuID 124 are transmitted together, additional security measures are taken to protect the data in transit.

In embodiments, Receiver 404 uses embodiments of the dicryption processes for quantum cyber resilient digital asset protection with double-ratchet cryptography to protect data being received. Data is read in from either file system, terminal, or external stream service depending on the use case. Input can be read in discrete (once) or streaming mode for any of the three input types.

Figure 12:
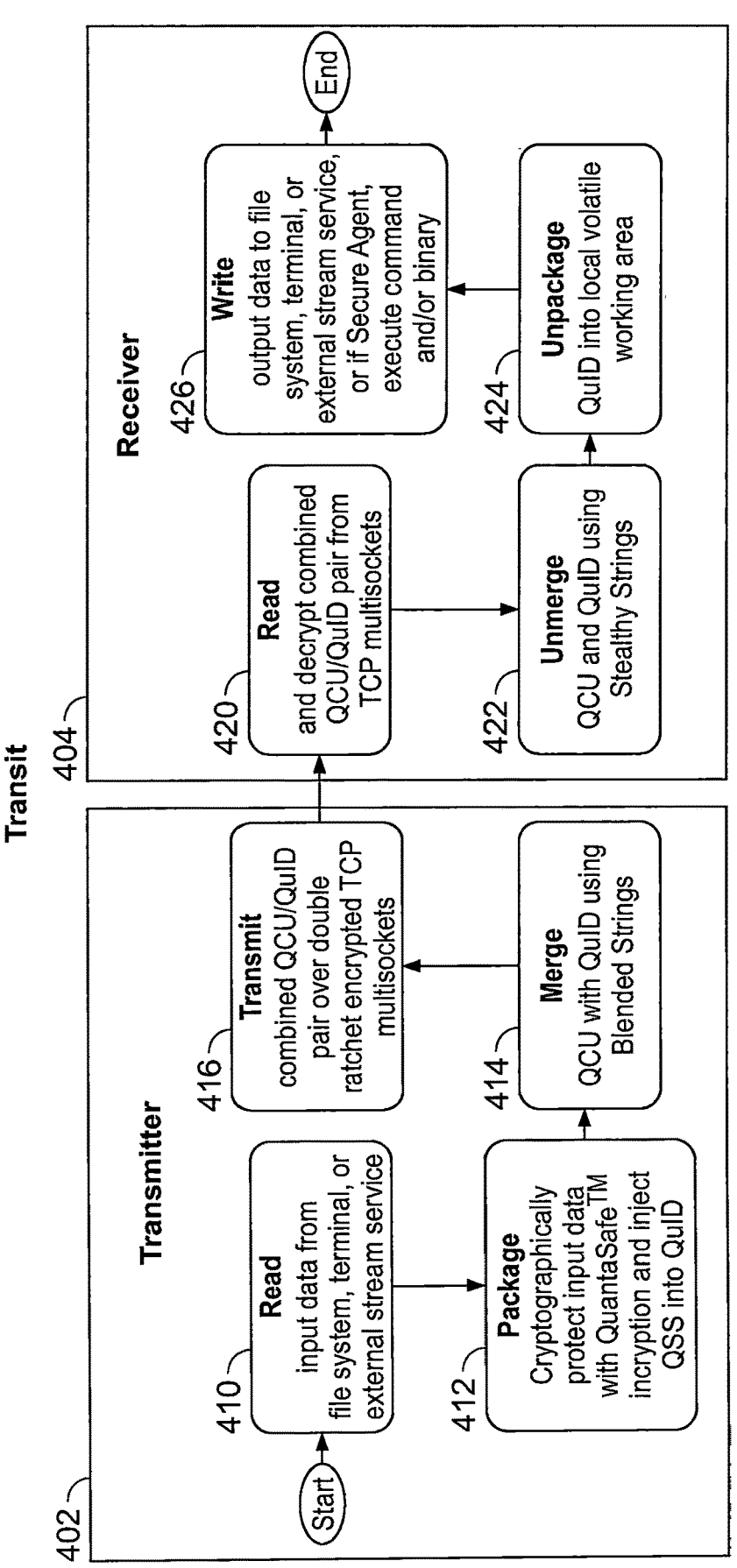
FIG. 12 is a process flow diagram of an embodiment of the Transit configuration embodiment shown in FIG. 11.

As shown in FIG. 12 for Transmitter 402, Read 410 accesses a set of digital data assets 102 and Package 412 is to produce a QCU 120 and incrypt the QuID 124. At the end of packaging, a QSS 118 is "sprinkled" throughout the QuID 124 to corrupt it and prevent unpackaging without knowledge of the value of the QSS 124 and how to find and extract it from the QuID 124. In some embodiments, both QCU 120 and QuID 124 are independently encrypted using AES256. In various embodiments, Merge 414 merges QCU 120 and QuID 124 together using a Blended Strings functionality to produce a single data object. In embodiments, the single data object may be encrypted a final time. In embodiments, Transmit 416 transmits the encrypted merge result via double-ratchet TCP communications with multi socket capability to allow for adjustable bandwidth. As long as all nodes in a group have the same QSS, a single transmitter can transmit to 1-n receivers.

As shown in FIG. 12 for Receiver 404, when data is received, it is unmerged, unpackaged, then written to a file system, printed or displayed on an output device, and/or forwarded to an external stream service. At Read 420, data is read in from the TCP multi-socket connection to the transmitter. At Unmerge 422, data is unmerged using a Blended Strings capability to separate the QCU 120 from the QuID 124. The QCU 120 and QuID 124 are independently decrypted and stored in volatile program memory. At Unpackage, 424 the QSS 118 is extracted from the QuID 124 and checked against the injected QSS 118 used for the Transmitter 402. The QCU 120 is used to dicrypt the QuID 124 unless a QSS mismatch is detected. At Write 426, the unpackaged sensitive digital assets 102 can be written to a file system, printed to or displayed on a terminal or display, or forwarded to the external stream service depending on use case. If the receiver is 404 is operating in an Agent mode, the received data may be one or both of a terminal command and/or a binary to execute on/by the receiver system.

Storage

Figure 13:
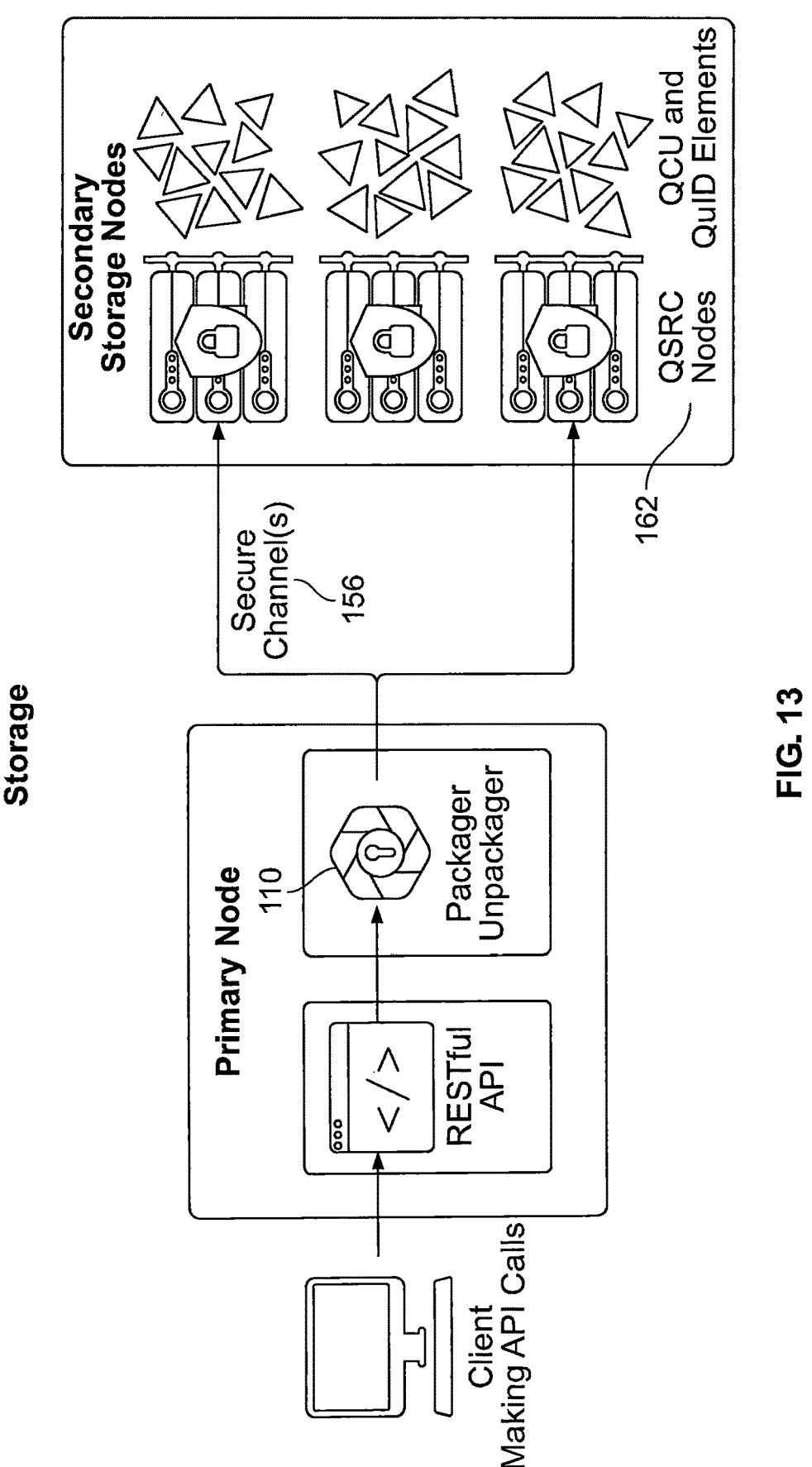
FIG. 13 is a schematic diagram of an embodiment of a Secured Storage configuration of the quantum cyber resilient digital asset protection system.

FIG. 13 is a schematic diagram of an embodiment of a Secured Storage configuration 144 embodiment of the digital asset protection system 100 to provide quantum cyber resilience of dynamic digital assets in non-volatile memory in a presumably secure facility where the digital assets are frequently or continually updated or changes (e.g., networked server storage or RAID servers).

The Storage product configuration 144 uses a RAID 10 group of nodes to protect data at cold rest. The core operations provided by secure storage are distributing data to the network, retrieving data back from the network, and purging data from the network. In the Storage embodiment, data objects are incrypted and broken into pieces that are distributed across nodes in the network. This approach provides physical separation between the QEs and associated QCUs. The packaging and unpackaging operations are performed by a primary controller node that is connected to all storage nodes in the Network. Each storage node runs a server component that handles requests from the controller node. Storage 144 also provides data redundancy by organizing storage nodes into a set of RAID 10 stripes with multiple mirror nodes per stripe. In some embodiments, an additional service is deployed in front of the Storage network so that clients can manage their data by interfacing directly with a RESTful API.

In embodiments, Storage 144 supports Distribute, Retrieve, and Purge operations. A separate process flow for each of these operations is shown in the referenced figures.

Distribute

Figure 14A:
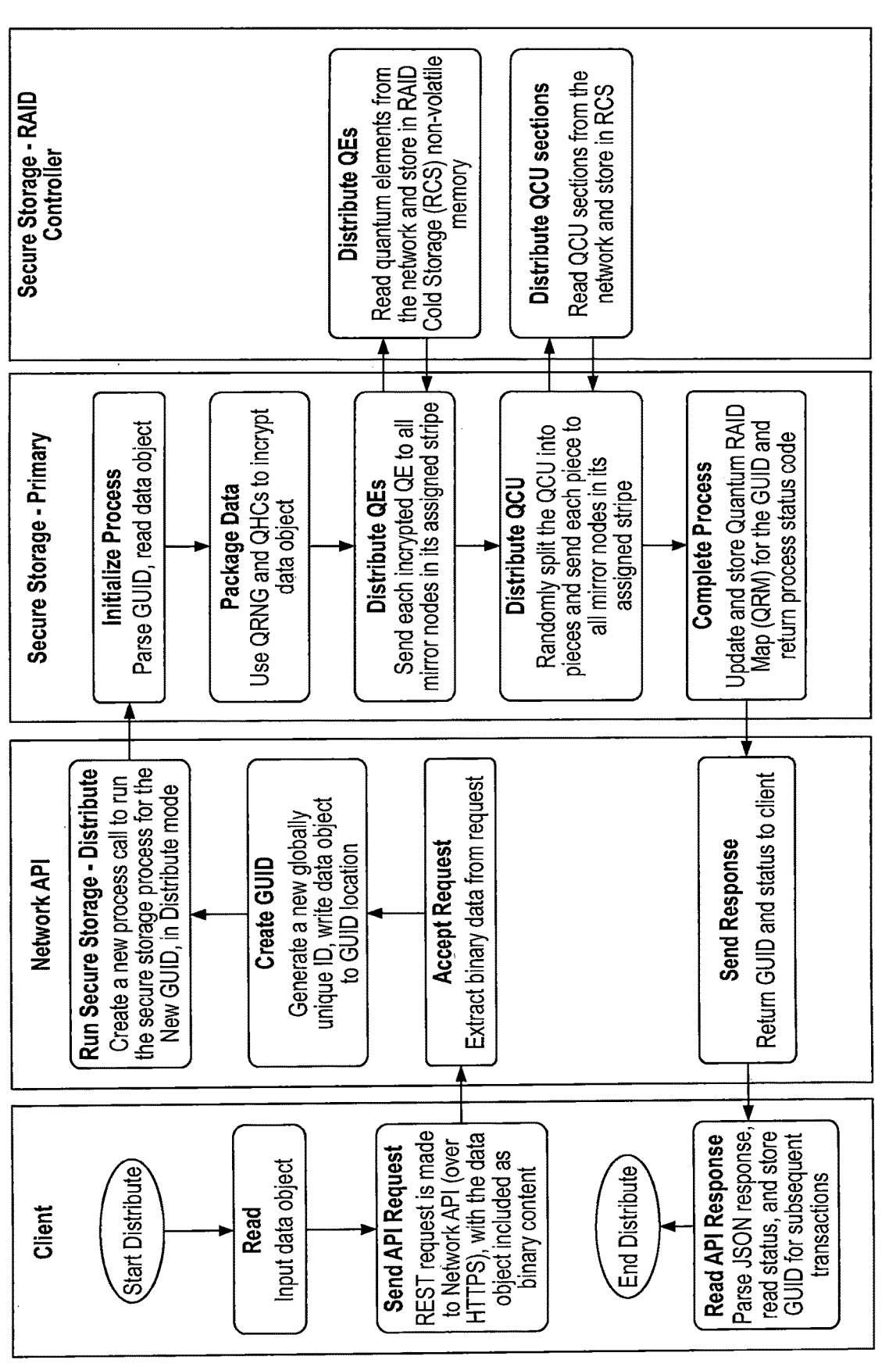
FIG. 14A is a process flow diagram of a Distribute process of an embodiment of the Storage configuration embodiment shown in FIG. 13.

FIG. 14A is a process flow diagram of a Distribute process of an embodiment of the Storage configuration embodiment shown in FIG. 13. The Distribute operation allows clients to store data objects into the secure network. The flow of this operation through the components of the system is described below.

Client

Initially, a client begins with a data object they would like to save in the Storage network. To accomplish this, a RESTful API request is made to the Network API component. The user facing client endpoint is called /package/ and it supports both GET and POST requests. The binary content of the data object is passed as the body of the API request. After making the API request, the client is responsible for reading the generated GUID from the response and storing it for later use in unpackaging and purge requests.

Network API Service

After receiving the request to package a new data object, API service generates a new globally unique identifier (GUID) value for the data. This string will be used to identify and track the data object in its incrypted form. Next, the API writes the data to a GUID-specific location so that it can be processed by the Storage controller. In most cases, the Network API Service will be executed on the same server as the Storage controller, but it is not required. To complete the request, the Network API service updates a GUID-specific configuration file and uses it to invoke a new Storage controller process. The value of the GUID is passed to the process as a command line argument. The Network API waits for this process to complete and reads the exit code from the process. Lastly, a response is sent to the client that indicates the status of the operation (success/fail), based on the exit code.

Storage—Primary

When the Storage controller application is executed, it is initialized from the GUID command line argument as well as a configuration file with additional configuration information for the Storage system. The first step is to read the data object from the GUID-specific directory and package it into an incrypted form. This step uses a QRNG and QHCs to protect the data and results in a set of QEs 122, as well as a QCU 120. After packaging, the QEs 122 are distributed to the Storage network. An initial count operation is performed to pre-compute the number of QEs 122 that will go to each stripe of the RAID network. After each storage node knows how many QEs 122 are expected, they are distributed. A copy of the files designated for each stripe is sent to each mirror node in the stripe. After the files have been distributed, an acknowledgment is sent that verifies the operation succeeded. Once the QEs 122 have been distributed, the encrypted QCU 120 is divided into randomly sized sections and distributed to the Storage network. Again, the pieces of the QCU 120 will be sent to different stripes in a round robin fashion, and all mirror nodes will receive the pieces intended for the stripe.

After the distribution process completes, the controller node writes the Quantum RAID Map (QRM) to a GUID-specific location on disk. This file stores information about which Storage nodes belong to which stripes along with the ordering of QCU pieces that allow it to be reconstructed for subsequent operations. Assuming that the received file counts for QEs and QCU sections match the expected values and the QRM was successfully created, the process returns with an exit code of 0. Otherwise, a non-zero exit code is returned.

Storage—RAID Node

Each node in the Storage network is running a RAID controller binary (qsrc) that must be started before the system is operational. These binaries act as the server component for communication with the controller node. Therefore, they remain running at all times to listen for connection requests and service those requests when appropriate. For the Distribute operation, the storage nodes will be initialized with the number of files being sent. Then, as the controller node sends QEs and QCU pieces, the count of received files is tracked. The content for each received file is written into a GUID-specific location inside of the RAID Cold Storage (RCS) directory. After the file transmission has completed, the RAID controller responds with a message that indicates whether the distribution has succeeded.

Retrieve

Figure 14B:
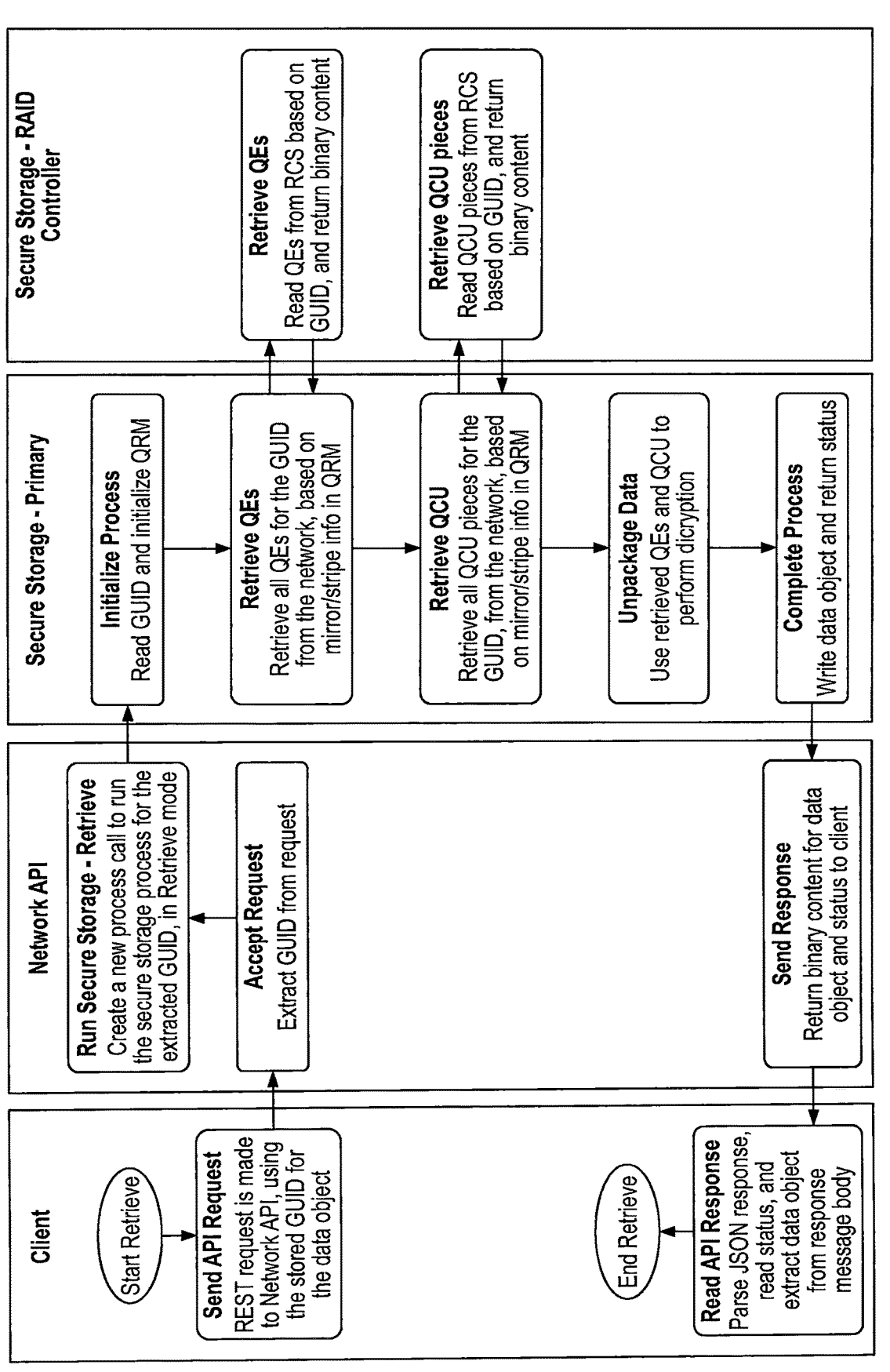
FIG. 14B is a process flow diagram of a Retrieve process of an embodiment of the Storage configuration embodiment shown in FIG. 13.

FIG. 14B is a process flow diagram of a Retrieve process of an embodiment of the Storage configuration embodiment shown in FIG. 13. The Retrieve operation is used by clients to get previously stored data objects out of the Storage network. The steps of the operation are below.

Client

To recover a previously stored data object, the user sends a RESTful API request to the Network API component that triggers the Retrieve process flow. The signature for the client endpoint is /unpackage/<GUID>. Both GET and POST requests are supported. As noted, the GUID extracted from a previous /package request must be provided. The response from the Network API Service will contain the binary content of the data object in the HTTP response body.
Network API Service Upon receiving the /unpackager request, the Network API service extracts the GUID and uses it to create a GUID-specific configuration file for the Storage controller process. Like the Distribute operation, the API service invokes the process, passes the GUID as a command-line option and waits for it to complete. Before sending the client response, the exit code is checked to determine if the Retrieve operation was successful.
Storage—Primary Node After the Storage controller process is started, an initialization step takes place based on the provided configuration file and GUID value read from the command-line. In order to complete the Retrieve operation, the QRM file for the specified GUID is loaded. This provides the necessary information about how the nodes in the Storage network are organized into stripe groups. Next, the QEs 122 and QCU 120 pieces are requested from the Storage network. During this process, the files are requested from the first available mirror in each stripe group. Requests to additional mirror nodes are not required unless this first request fails. These Retrieve requests are made over a TCP connection to the RAID controllers running on the storage nodes. After the QEs are downloaded, they are saved into memory for subsequent processing. An additional step is required to construct the full QCU from the downloaded pieces, based on the ordering stored in the QRM.

Figure 14C:
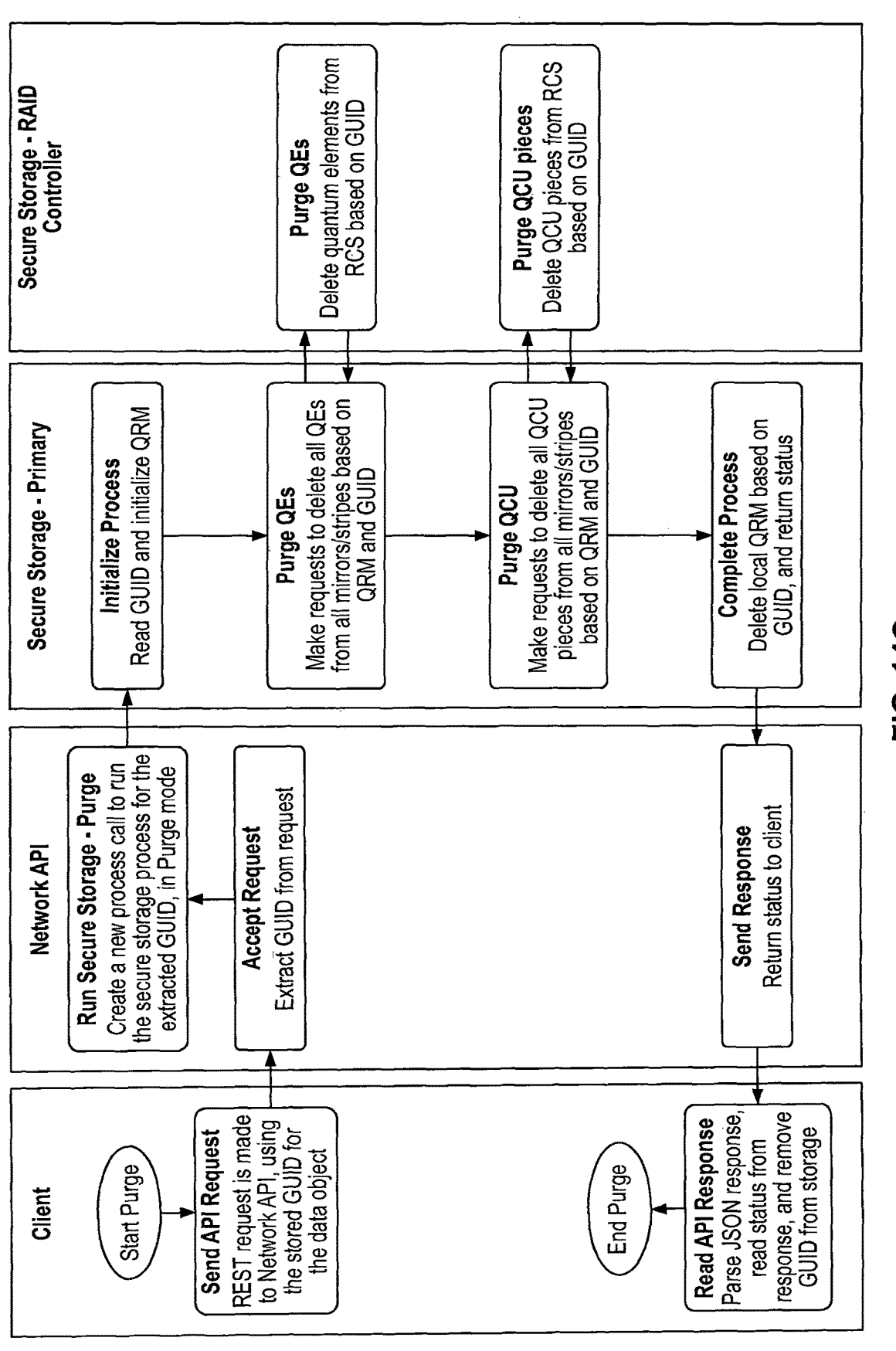
FIG. 14C is a process flow diagram of a Purge process of an embodiment of the Storage configuration embodiment shown in FIG. 13.
Figure 15:
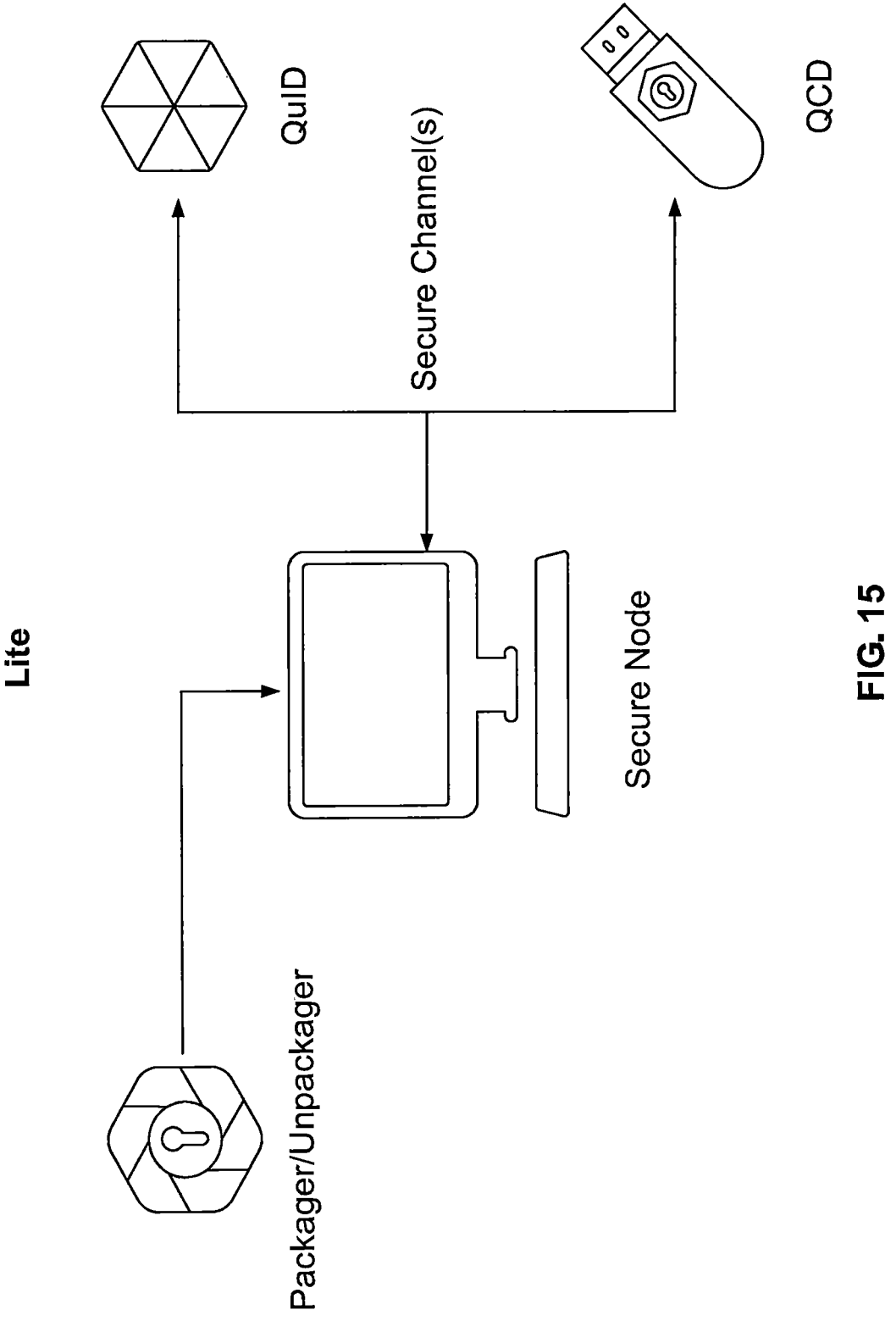
FIG. 15 is a schematic diagram of an embodiment of a Secured Lite configuration of the quantum cyber resilient digital asset protection system.

After successfully retrieving the QEs 122 and QCU 120 for the specified GUID, they will be stored in memory. At this point, the controller node can unpackage the original data object to be returned to the user. This dicryption step uses the details stored in the QCU 120 to initialize the correct set of QHCs 108 into a cipher stack that is executed in reverse order and uses the incrypted QEs 122 as the input. The result of this operation is that the original data object is recovered and written to a GUID-specific directory. After the data object has been unpackaged and written, the controller node process will exit, again using the return code to indicate the success or failure of the operation.
Storage—RAID Node The RAID controller binaries are used to Retrieve the QEs 122 and QCU 120 pieces out of the GUID-specific directory inside the RCS area on the storage nodes. Due to the structure of the RCS, the controller node can simply pass the GUID to request all files for a Retrieve operation. The RAID controller can use this GUID to begin transmitting all files for the GUID back to the controller node without needing a separate request for each individual file. As noted before, this step is executed on the first available mirror node for each stripe group. Dedicated message types are used to communicate success and error conditions back to the controller node.
Purge FIG. 14C is a process flow diagram of a Purge process of an embodiment of the Storage configuration embodiment shown in FIG. 13. The Purge operation is used to delete data objects from the Storage network. The steps needed to complete this operation are described below.
Client Like the Retrieve operation, the client can submit a GET or POST request to the Network API Service using the GUID associated with a data object that has previously been stored in the network. The client endpoint is /purge/<GUID>. After the Purge operation is completed, the GUID will no longer be associated with a valid data object in the Storage network. Therefore, after making the API request and parsing the response to verify that the operation was successful, the client is responsible for updating their records to remove the GUID from their application storage or marking it as unavailable.
Network API Service When the Network API Service receives a Purge request, the GUID will be passed as a path parameter. This value is extracted and used to initialize a configuration file for invoking the Storage controller binary. As before, the GUID value is passed to this process as a command-line argument. After the process is started, the Network API waits for it to terminate and uses the exit code to determine the correct status code to use when sending the REST response back to the client.
Storage—Primary After the Storage controller application is started and initialized with the GUID from the command-line, the QRM file is loaded from a GUID-specific storage area. After these steps are completed, a Purge request is made to all RAID controllers in the Storage network. By making this request to all nodes, the data object is permanently removed from the network, including the duplicated copies that were stored across mirror nodes in the same stripe group. After receiving confirmation from all mirror nodes that the requested Purge operation was successful, the controller node will delete the QRM and associated directory for the GUID from its storage before the application process completes and an appropriate exit code is returned.
Storage—RAID Node When a Purge request is received by a RAID controller, the entire GUID-specific directory within that node's RCS directory is removed. This effectively removes all QEs and QCU pieces from the server. Afterwards, a response message is sent back to the controller node to indicate if the operation was successful.
Lite FIG. 15 is a schematic diagram of an embodiment of a Secured Lite configuration 146 embodiment of the digital asset protection system 100 to provide quantum cyber resilience of selected digital assets in custom computer system environment where only user-selected higher-value digital assets need quantum cyber resilience protection. Lite is used for protecting digital assets with an incryption process in a straightforward and flexible way. Lite uses a Packager/Unpackager pair that is combined into a single binary. This binary will typically be installed on the same device as the digital assets to be protected. The Lite functionality can be invoked by running the process directly from a command line so it is straightforward to integrate with other applications using custom scripts or library functions. Lite can also accept runtime parameters from an optional configuration file.

Figure 16A:
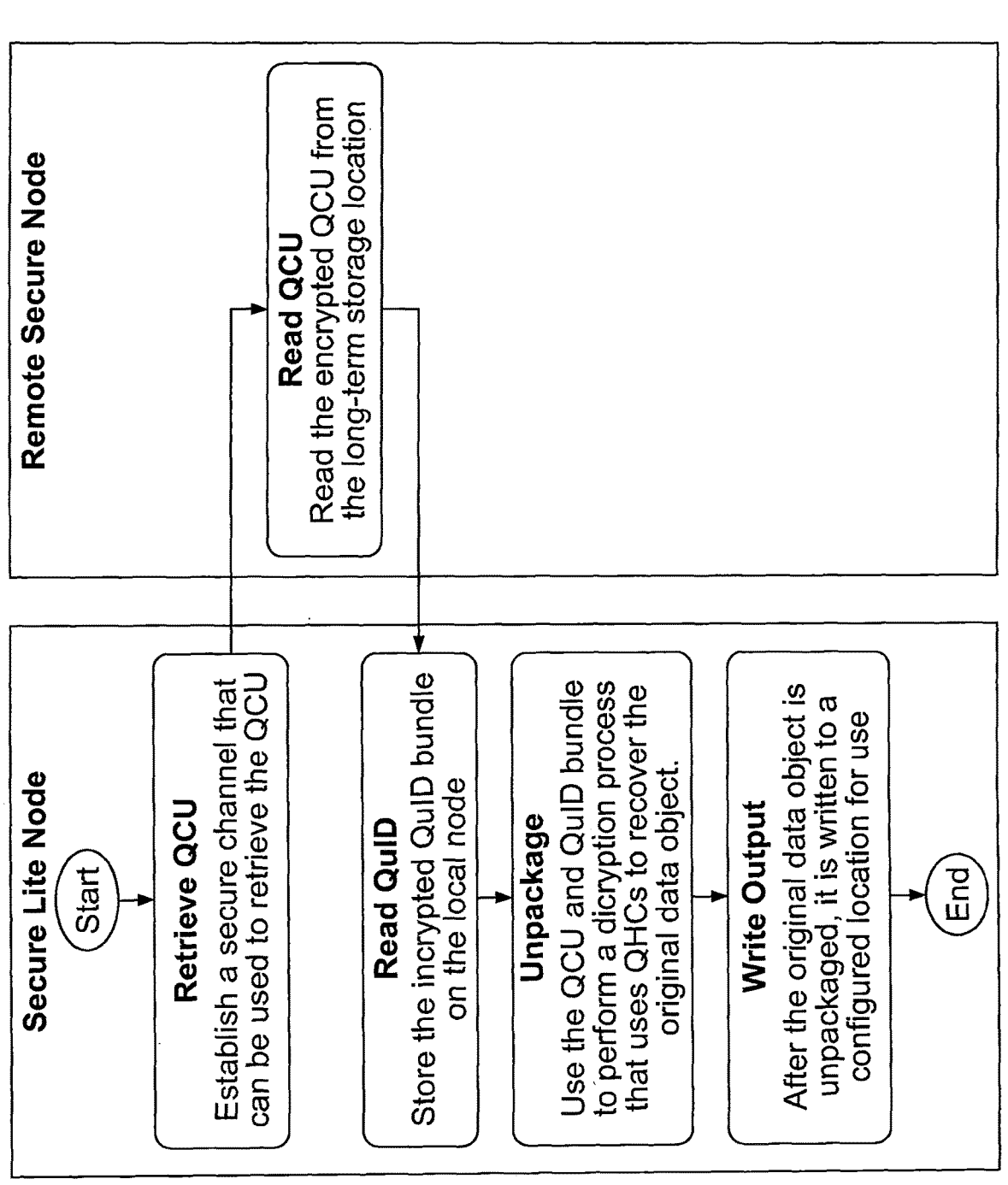
FIG. 16A is a process flow diagram of the Package process of an embodiment of the Lite configuration embodiment shown in FIG. 15.

FIGS. 16A and 16B are process flow diagrams of an embodiment of the Lite configuration embodiment. FIG. 16A describes an embodiment of Packager 112 for the Lite configuration embodiment. FIG. 16B describes an embodiment of unPackager 114 for the Lite configuration embodiment.
Package To package digital assets, Lite can read data from the filesystem, an external stream service or the standard input stream. Once the data object(s) have been loaded, the package functionality is invoked, which performs the incryption process that generates the QCU and QuID bundle. This protection step is achieved by creating a randomly generated stack of QHCs that process the data object to produce QE files that are combined into a QuID bundle. The process uses a QRNG to generate the QHC stack and the associated protection parameters.

After packaging completes, the user is responsible for securely transmitting the QCU to a secure location for storage. In many scenarios, this secure location will be a secure USB drive that Lite can write to directly. However, in other systems, the QCU could be stored on a separate machine or cloud storage. In practice, this additional QCU transmission step will often be automated using custom scripts.

Unpackage

Before unpackaging, the QCU must be available to the Lite process. In a typical use case, this would require the user to plug in a secure key containing the QCU. In other scenarios, a separate process would need to be run that retrieves the QCU from a networked storage device. Once the QCU is retrieved, the Lite unpackaging can occur. First, the QCU is decrypted and the details of the QHC stack are extracted from it. Next, the QuID bundle is also decrypted and extracted to recover a set of QEs. Lastly, Lite will reconstruct the original QHC stack and execute it in the reverse order, using the QE files as the initial input. The final result of this dicryption process will be the original data object that is then available for the user.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, and locations, etc. have been described for use with disclosed embodiments, others besides those disclosed may be utilized without exceeding the scope of the claimed inventions.

Persons of ordinary skill in the relevant arts will recognize that the subject matter hereof may be composed of fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can be composed of a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A computer-implemented digital asset protection system configured to protect a set of original files of digital assets as quantum incrypted data that is quantum cyber resilient, the system comprising:

a random number generator configured to generate a random key; and a packager system isolated in a secure computing environment and securely connected to the random number generator, the packager system configured to protect the set of original files as quantum incrypted data by a set of protocols including:

fragment each file into fragments each being a quantum element;

inject each quantum element with a set of random noise seeded by the random number generator; and encrypt each quantum element using an encryption protocol and the random key;

such that there is a set of quantum elements for the set of original files in which each quantum element has a random size that exceeds a threshold size with a total number of quantum elements for each file exceeding a threshold number, the set of random noise for each quantum element is a set of random sizes of noise at a set of random locations in the quantum element whereby decryption of the quantum element would produce corrupted data if the set of random noise is not correctly removed before decryption, and each quantum element has an element name that is a random string of alphanumeric characters having a common length;

shuffle the set of quantum elements into a random order such that the set of quantum elements is configured to be stored in a non-volatile memory as a quantum incrypted data image for the set of original files;

create a quantum element map that includes for each quantum element the corresponding quantum element name together with the random order and random size of that quantum element and the set of random sizes and the set of random locations of the set of random noise in that quantum element;

create a quantum cryptography map including the quantum random key and a nonce value and for each file of the set of original files a set of element names of the quantum elements that correspond to each of the fragments of that file together with an original file name and a set of metadata for that file; and configure the quantum element map and the quantum cryptography map to be stored in a non-volatile memory as a quantum containment unit for the quantum incrypted data image.

2. The computer-implemented digital asset protection system of claim 1 wherein the random number generator is one of a software-based quantum random number generator, a hardware-based quantum random number generator, a random number generator, and a software-based pseudo random number generator that is physically within the secure computing environment or is connected to the secure computing environment by a secure network connected via using a double ratchet encryption and transmission control protocol.

3. The computer-implemented digital asset protection system of claim 1 wherein the set of protocols that includes fragment, inject and encrypt is performed in a protocol order selected from the set consisting of: (i) fragment then inject then encrypt, (ii) encrypt then fragment then inject, and (iii) encrypt then inject then fragment.

4. The computer-implemented digital asset protection system of claim 3 wherein the protocol order is variable for the set of original files, and wherein the quantum cryptography map includes the protocol order.

5. The computer-implemented digital asset protection system of claim 1 wherein the random size of a quantum element is not padded if a size of an original fragment of an original file is larger than the threshold size and is padded with a set of random noise to exceed the threshold size if the size of the original fragment of the original file is smaller than the threshold size.

6. The computer-implemented digital asset protection system of claim 1 wherein the threshold number of quantum elements is 32 and the threshold size of each quantum element is 256 bytes.

7. The computer-implemented digital asset protection system of claim 1 wherein the random size and the random string of each quantum element is one of a random value based on the random number generator, and wherein the set of random sizes at the set of random locations of the set of random noise are unique for each quantum element and each is one of a random value based on the random number generator, and wherein the random order is one of a random value based on the random number generator.

8. The computer-implemented digital asset protection system of claim 1 wherein the encryption algorithm is one of a set of quantum-resistant encryption algorithms approved by the National Institute of Standards and Technology.

9. The computer-implemented digital asset protection system of claim 1 wherein the set of original digital assets includes one or more of data, code, databases, training sets, weighting sets, text, ciphertext that is hardware and/or software encrypted data, digital content or digitally personal identifiable information, or any electronic or optical information in the form of a file, a record or an element as one of the set of digital assets that is at rest, in use or in transit.

10. The computer-implemented digital asset protection system of claim 1 wherein the set of protocols further comprises:

add a set of decoy files to the set of original files, each decoy file formed of a random amount of random noise, wherein the packager system is programmed to selectively apply the set of protocols to each decoy file based at least on a setting for the set of decoy files, whereby the packager system is configured to apply only the protocol to fragment each decoy file into quantum elements or to selectively apply up to all of the protocols of the set of protocols to each decoy file, wherein the quantum cryptography map further includes an indication for each file of the set of original files of whether the file is a decoy file and an indication of what protocols of the set of protocols to apply to a decoy file.

11. The computer-implemented digital asset protection system of claim 10 wherein the packager system is programmed to variably configure the quantum incrypted data image based at least on a setting for a level of incryption, whereby the packager system determines a different number of decoy files to add as the set of decoy files based on the setting for the level of incryption and a total number of original files in the original set of files.

12. A computer-implemented digital asset protection system configured to protect a set of original files of digital assets as quantum incrypted data that is quantum cyber resilient when the set of original files is transmitted from a first computing node operably connected by a network to a second computing node, the system comprising:

a packager system operably configured to be stored and executed from a volatile memory of a first computing node and operably connected to a random number generator configured to generate a random key, the packager system being configured to package the set of original files by:

using a set of quantum hybrid ciphers seeded by the random key and processed in a pseudo random cipher order to incrypt a set of quantum elements for the set of original files in which each quantum element has a random size that exceeds a threshold size and has an anonymized quantum element name and in which a total number of quantum elements for the set of original files exceeds a threshold number;

using the random key to package the set of quantum elements in a random element order as a quantum incrypted data;

creating a quantum containment unit that includes:

the random key;

the pseudo random cipher order of the plurality of quantum hybrid ciphers;

for each file of the set of original files a set of quantum element names of the quantum elements for that file; and for each quantum element the quantum element name and a location of the quantum element in the quantum encrypted data based on the random element order of the set of quantum elements; and operably transmit the quantum incrypted data and the quantum containment unit to the second computing node; and an unpackager system operably configured to be stored and executed from a volatile memory of the second computing node and that includes a set of quantum random ciphers and is configured to operably receive the quantum containment unit and the quantum incrypted data in the volatile memory of the second computing node, and to unpackage the original set of files by:

using the quantum containment unit to:

unpackage the quantum elements from the quantum incrypted data;

dicrypt each of the quantum elements processed in the pseudo random cipher order;

restore the set of quantum elements by reordering the random element order of the quantum elements for each original file; and restore the original file name for each original file.

13. The computer-implemented digital asset protection system of claim 12 wherein the random number generator in one of a software-based quantum random number generator, a hardware-based quantum random number generator, a random number generator, and a software-based pseudo random number generator.

14. A computer-implemented digital asset protection system configured to be executed by a networked computer system having two or more nodes to protect a set of original files of digital assets, the digital asset protection system comprising:

a packager system executing on a first node and operably configured to use a set of random seeds and a set of hybrid cryptography ciphers that includes at least one standard cipher and a plurality of non-standard ciphers to incrypt the set of original files as incrypted data in a set of ciphertexts with each ciphertext having a corresponding cryptex that includes information used to determine a dynamic cipher stack, a set of cipher keys, and a set of meta data unique to that ciphertext; and an unpackager system executing on a second node and operably configured to dicrypt the incrypted data of each ciphertext in the set of ciphertexts using the corresponding cryptex to restore the set of original files, wherein the set of ciphertexts and the corresponding cryptexes incrypted by the first node are operably communicated over the networked computer system to the second node as incrypted data that is quantum cyber resilient as data in transit representing the set of original files of digital assets.

15. The computer-implemented digital asset protection system of claim 14, wherein the packager system further includes a protocol of adding a set of decoy files to the set of original files, each decoy file formed of a random amount of random noise, and wherein the cryptex includes an indication for each file of the set of original files of whether the file is a decoy file.

16. The computer-implemented digital asset protection system of 14, wherein the set of ciphertexts includes one or more quantum incrypted data ciphertexts, and the corresponding cryptex for each ciphertext is a quantum containment unit, the dynamic cipher stack includes at least one standard cipher as a first cipher or a last cipher in the cipher stack and a pseudo randomized number, selection, and order of four or more non-standard ciphers in the cipher stack, the set of random seeds includes one or more random number seeds generated by one of a standard pseudo-random number generator source, a random number generator source, or a quantum random number generator source, and the set of cipher keys includes one or more keys and/or nonces generated for each of the set of cipher keys.

17. The computer-implemented digital asset protection system of claim 14, wherein the packager system incrypts each ciphertext of incrypted data as a set of pieces each having an obfuscated piece name and the set of pieces arranged in a random element order based on the set of random seeds with the random element order and the obfuscated piece name stored as meta data in the corresponding cryptex, and wherein the unpackager system dicrypts each ciphertext using the corresponding cryptex by accessing the set of pieces based on the obfuscated pieces names and reordering the set of pieces arranged in the random element order to restore an original order to the set of pieces and then using the dynamic cipher stack and the set of cipher keys and the meta data in the corresponding cryptex to restore the original set of files with an original set of file names for each original file from the set of meta data.

18. The computer-implemented digital asset protection system of claim 14, wherein the packager system further includes a protocol of injecting random noise generated from the set of random seeds into each piece of the set of pieces by determining a set of random locations in the piece based on the set of random seeds and injecting random noise at each random location of the set of random locations, and wherein the cryptex includes information representing the set of random locations.

19. The computer-implemented digital asset protection system of claim 14, wherein the digital asset protection system is a streaming communication system for data in transit having a transmitter node in the first node configured with the packager system to operate in a low-latency mode that blends and salts the set of ciphertexts and the corresponding set of cryptexes with a symmetric secret into packets of a data stream to be communicated over an unsecure channel to a receiver node in the second node which has prior access to the symmetric secret and is configured with an unpackager system to reconstitute the data stream as the set of ciphertexts using the corresponding set of cryptexes that are unsalted with the symmetric secret before the data in transit is restored by dicryption.

20. The computer-implemented digital asset protection system of claim 14, wherein the digital asset protection system is a data transfer system for data in transit having a transmitter node in the first node configured with the packager system configured to operate in a normal mode that blends and salts the set of ciphertexts and the corresponding set of cryptexes with a symmetric secret into packets of a bulk data transfer to be communicated over an unsecure channel to a receiver node in the second node which has prior access to the symmetric secret and is configured with an unpackager system to reconstitute the bulk data transfer as the set of ciphertexts using the corresponding set of cryptexes that are unsalted with the symmetric secret before the data in transit is restored by dicryption.

* * * * *